United States Patent [19]

Ikegawa et al.

[11] Patent Number: 5,422,238

[45] Date of Patent: * Jun. 6, 1995

[54] SILVER HALIDE PHOTOGRAPHIC MATERIAL

[75] Inventors: Akihiko Ikegawa; Masayuki Kuramitsu; Masaki Okazaki, all of Kanagawa, Japan

[73] Assignee: Fuji Photo Film Co., Ltd., Japan

[*] Notice: The portion of the term of this patent subsequent to Mar. 1, 2011 has been disclaimed.

[21] Appl. No.: 165,540

[22] Filed: Dec. 13, 1993

Related U.S. Application Data

[63] Continuation of Ser. No. 922,221, Jul. 31, 1992, abandoned.

[30] Foreign Application Priority Data

Aug. 2, 1991 [JP] Japan .................. 3-216472
Jan. 14, 1992 [JP] Japan .................. 4-023324
Jan. 14, 1992 [JP] Japan .................. 4-023422

[51] Int. Cl.[6] .................. G03C 1/14; G03C 1/16; G03C 1/18; G03C 1/20
[52] U.S. Cl. .................. 430/583; 430/584; 430/588
[58] Field of Search .............. 430/574, 576, 583, 584, 430/588, 522

[56] References Cited

U.S. PATENT DOCUMENTS

| | | | |
|---|---|---|---|
| 3,264,110 | 8/1966 | Depoorter | 430/584 |
| 3,282,933 | 11/1966 | Nys et al. | 430/584 |
| 3,615,634 | 10/1971 | Gotze et al. | 430/574 |
| 4,118,228 | 10/1978 | Corluy et al. | 430/588 |
| 4,130,429 | 12/1978 | Van Doorselaer | 430/966 |
| 4,524,128 | 6/1985 | Edwards et al. | 430/584 |
| 4,935,337 | 6/1990 | Kuwashima et al. | 430/584 |

FOREIGN PATENT DOCUMENTS

1223289 2/1960 France.
980234 1/1965 United Kingdom .................. 430/584

OTHER PUBLICATIONS

Research Disclosure, Dec. 1978, vol. 176, No. 43, pp. 22–31. 17643, 'Photographic silver halide emulsions, preparations, addenda, processing and systems'.

*Primary Examiner*—Janet C. Baxter
*Attorney, Agent, or Firm*—Sughrue, Mion, Zinn, Macpeak & Seas

[57] ABSTRACT

A novel silver halide photographic material comprising at least one methine compound represented by the following general formula (I):

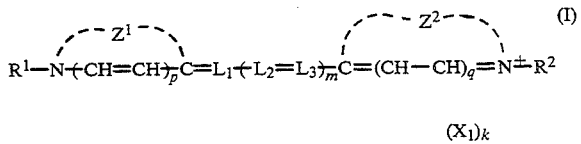

wherein $R^1$ represents $-(CH_2)_r-CONHSO_2-R^3$, $-(CH_2)_s-SO_2NHCO-R^4$, $-(CH_2)_t-CONHCO-R^5$ or $-(CH_2)_u-SO_2NHSO_2-R^6$ in which $R^3$, $R^4$, $R^5$ and $R^6$ each represents an alkyl group, alkoxy group or amino group, r, s, t and u each represents an integer 1 to 5; and $R^2$ represents has the same meaning as $R^1$ or represents an alkyl group; $Z^1$ and $Z^2$ each represents a nonmetallic atom group required to form a 5- or 6-membered heterocyclic group; p and q each represents an integer 0 or 1; $L_1$, $L_2$ and $L_3$ each represents a methine group; m represents an integer 0 to 2; X represents an anion; and k represents an integer required to adjust the charge in the molecule to 0. The silver halide photographic material may comprise at least one methine compound represented by the general formula (I) and at least one water-soluble dye.

10 Claims, No Drawings

SILVER HALIDE PHOTOGRAPHIC MATERIAL

This is a continuation of application Ser. No. 07/922,221 filed Jul. 31, 1992, now abandoned.

FIELD OF THE INVENTION

The present invention relates to a silver halide photographic material which provides improvements in both the inhibition of color remaining during development and the sensitivity.

BACKGROUND OF THE INVENTION

In recent years, the expedition of development process and the tendency to add a large amount of sensitizing dyes have worsened the problem of some of sensitizing dyes contained in a silver halide photographic material being left uneluted during development and remaining colors in the photographic material (so-called color remaining).

Heretofore, as sensitizing dyes causing little color remaining there have been proposed those containing hydrophilic substituents such as sulfamoyl group and carbamoyl group (as disclosed in JP-A-1-147451, JP-A-61-294429, and JP-A-61-77843 (the term "JP-A" as used herein means an "unexamined published Japanese patent application"), and JP-B-45-32749 (the term "JP-B" as used herein means an "examined Japanese patent publication")). However, since the adsorption of sensitizing dyes normally falls with the increasing hydrophilicity, all these proposals leave much to be desired in sensitivity as well as color remaining. Further, sensitizing dyes as disclosed in U.S. Pat. No. 3,282,933 and European Patent 451816A1 appreciably excert an effect of eliminating color remaining but leave much to be desired in the provision of sufficient sensitivity as well.

SUMMARY OF THE INVENTION

It is therefore an object of the present invention to provide a silver halide photographic material which provides improvements in both the inhibition of color remaining during development and the sensitivity.

The above and other objects of the present invention will become more apparent from the following detailed description and examples.

An object of the present invention is to provide a silver halide photographic material comprising at least one methine compound represented by the following general formula (I):

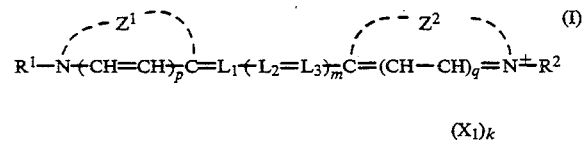

wherein $R^1$ represents $-(CH_2)_r-CONHSO_2-R^3$, $-(CH_2)_s-SO_2NHCO-R^4$, $-(CH_2)_t-CONHCO-R^5$ or $-(CH_2)_u-SO_2NHSO_2-R^6$ in which $R^3$, $R^4$, $R^5$ and $R^6$ each represents an alkyl group, alkoxy group or amino group, r, s, t and u each represents an integer 1 to 5, and $R^2$ represents has the same meaning as $R^1$ or represents an alkyl group; $Z^1$ and $Z^2$ each represents a nonmetallic atom group required to form a 5- or 6-membered heterocyclic group; p and q each represents an integer 0 or 1; $L_1$, $L_2$ and $L_3$ each represents a methine group; m represents an integer 0 to 2; X represents an anion; and k represents an integer required to adjust the charge in the molecule to 0.

Another object of the present invention is to provide a silver halide photographic material comprising at least one methine compound represented by the general formula (I) and at least one water-soluble dye.

DETAILED DESCRIPTION OF THE INVENTION

The methine compound represented by the general formula (I) and the water-soluble dye will be further described hereinafter.

The alkyl group represented by $R^3$, $R^4$, $R^5$ or $R^6$ may be substituted and preferably contains 4 or less carbon atoms. Particularly preferred among such alkyl groups are methyl, ethyl, hydroxyalkyl and aminoethyl groups. The alkoxy group represented by $R^3$, $R^4$, $R^5$ or $R^6$ may be substituted and preferably contains 4 or less carbon atoms. Particularly preferred among such alkoxy groups are methoxy, ethoxy, methoxyethoxy and hydroxyethoxy groups. The amino group represented by $R^3$, $R^4$, $R^5$ or $R^6$ may be substituted by alkyl group, hydroxyalkyl group, alkoxyalkyl group or the like which may together form a ring and preferably contains 8 or less carbon atoms. Particularly preferred among such amino groups are methylamino, dimethylamino, diethylamino, hydroxyethylamino, morpholino and pyrrolidino groups. The hydrogen atom connected to the nitrogen atom adjacent to the carbonyl group or sulfonyl group in $R^1$ is dissociative. Accordingly, $R^1$ may take the form of $-(CH_2)_r-CON^--SO_2-R^3$, $-(CH_2)_s-SO_2N^--CO-R^4$, $-(CH_2)_t-CON^--CO-R^5$ or $-(CH_2)_u-SO_2N^--SO_2-R^6$ in the presence of a base or the like. The alkyl group represented by $R^2$ may be substituted and preferably contains 5 or less carbon atoms. Particularly preferred among such alkyl groups are 2-sulfoethyl, 3-sulfopropyl, 4-sulfobutyl and 3-sulfobutyl groups. The suffixes r, s, t and u each preferably is an integer 1 to 3.

Examples of 5- or 6-membered heterocyclic nucleus represented by $Z^1$ or $Z^2$ include thiazole nucleus [for example, thiazole nucleus such as thiazole, 4-methylthiazole, 4-phenylthiazole, 4,5-dimethylthiazole and 4,5-diphenylthiazole, benzothiazole nucleus such as benzothiazole, 4-chlorobenzothiazole, 5-chlorobenzothiazole, 6-chlorobenzothiazole, 5-nitrobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-ethoxycarbonylbenzothiazole, 5-carboxybenzothiazole, 5-phenethylbenzothiazole, 5-fluorobenzothiazole, 5-chloro-6-methylbenzothiazole, 5,6-dimethylbenzothiazole, 5,6-dimethoxybenzothiazole, 5-hydroxy-6-methylbenzothiazote, tetrahydroxybenzothiazole and 4-phenylbenzothiazole, and naphthothiazole nucleus such as naphtho[2,1-d]thiazole, naphtho[1,2-d]thiazole, naphtho[2,3-d]thiazole, 5-methoxynaphtho[1,2-d]thiazole, 7-ethoxynaphtho[2,1d]thiazole, 8-methoxynaphtho[2,1-d]thiazole and 5methoxy[2,3-d]thiazole], thiazoline nucleus such as thiazoline, 4-methylthiazoline and 4-nitrothiazoline, oxazole nucleus [for example, oxazole nucleus such as oxazole, 4-methyloxazole, 4-nitroxazole, 5-methyloxazole, 4-phenyloxazole, 4,5-diphenyloxazole and 4ethyloxazole, benzoxazole nucleus such as benzoxazole, 5-chlorobenzoxazole, 5-methylbenzoxazole, 5-bromobenzoxazole, 5-fluorobenzoxazole, 5-phenylbenzoxazole, 5methoxybenzoxazole, 5-nitrobenzoxazole, 5-trifluoromethylbenzoxazole, 5-hydroxybenzoxazole, 5-carboxybenzoxazole, 6-methylbenzoxazole, 6-chlorobenzoxazole, 6-nitrobenzoxazole, 6-methoxybenzoxazole, 6-hydroxybenzoxazole, 5,6-dimethylbenzoxazole, 4,6-dimethylbenzoxazole and 5-ethoxybenzoxazole, and naphthoxazole nucleus such as naphtho[2,1-d]oxazole, naphtho[1,2-d]oxazole, naphtho[2,3-d]oxazole and 5-nitronaphtho[2,1-d]oxazole], oxazoline nucleus such as 4,4-dimethyloxazoline, selenazole nucleus [for example, selenazole nucleus such as 4-methylselenazole, 4-nitroselenazole and 4-phenylselenazole, benzoselenazole nucleus such as benzoselenazole, 5-chlorobenzoselenazole, 5-nitrobenzoselenazole, 5-methoxybenzoselenazole, 5-hydroxybenzoselenazole, 6-nitrobenzoselenazole, 5-chloro-6-nitrobenzoselenazole and 5,6-dimethylbenzoselenazole, and naphthoselenazole nucleus such as naphtho[2,1-d]selenazole and naphtho[1,2-d]selenazole], selenazoline nucleus such as selenazoline and 4-methylselenazoline, tellurazole nucleus [for example, tellurazole nucleus such as tellurazole, 4-methyltellurazole and 4-phenyltellurazole, benzotellurazole nucleus such as benzotellurazole, 5-chlorobenzotellurazoloe, 5-methylbenzotellurazole, 5,6-dimethylbenzotellurazole and 6-methoxybenzotellurazole, and naphthotellurazole nucleus such as naphtho[2,1-d]tellurazole and naphtho[1,2-d]tellurazole], tellurazoline nucleus such as tellurazoline and 4-methyltellurazoline, 3,3-dialkylindolenine nucleus such as 3,3-dimethylindolenine, 3,3-diethylindolenine, 3,3-dimethyl-5-cyanoindolenine, 3,3-dimethyl-6-nitroindolenine, 3,3-dimethyl-5-nitroindolenine, 3,3-dimethyl-5-methoxyindolenine, 3,3,5-trimethylindolenine and 3,3-dimethyl-5-chloroindolenine, imidazole nucleus [for example, imidazole nucleus such as 1-alkylimidazole, 1-alkyl-4-phenylimidazole and 1-arylimidazole, benzoimidazole nucleus such as 1-alkylbenzoimidazole, 1-alkyl-5-chlorobenzoimidazole, 1-alkyl-5,6-dichlorobenzoimidazole, 1-alkyl-5-methoxybenzoimidazole, 1-alkyl-5-cyanobenzoimidazole, 1-alkyl-5-fluorobenzoimidazole, 1-alkyl-5-trifluoromethylbenzoimidazole, 1-alkyl-6-chloro-5-cyanobenzoimidazole, 1-alkyl-6-chloro- 5-trifluoromethylbenzoimidazole (the alkyl group contained in these benzoimidazole groups is preferably a $C_{1-8}$ alkyl group such as unsubstituted alkyl group, e.g., methyl, ethyl, propyl, isopropyl and butyl, and hydroxyalkyl group, e.g., 2-hydroxyethyl and 3-hydroxypropyl, and particularly preferred among these alkyl groups are methyl and ethyl groups), 1-allyl-5,6-dichlorobenzoimidazole, 1-allyl-5-chlorobenzoimidazole, 1-arylbenzoimidazole, 1-aryl-5-chlorobenzoimidazole, 1-aryl-5,6-dichlorobenzoimidazole, 1-aryl-5-methoxybenzoimidazole and 1-aryl-5-cyanobenzoimidazole (the aryl group contained in these benzoimidazole groups represents phenyl, halogen (e.g., chloro)-substituted phenyl, alkyl (e.g., methyl)-substituted phenyl or alkoxy (e.g., methoxy)-substituted phenyl), and naphthoimidazole nucleus such as alkylnaphtho[1,2-d]imidazole and 1-arylnaphtho[2,1-d]imidazole (the alkyl group and aryl group are as defined above), pyridine nucleus such as 2-pyridine, 4-pyridine, 5-methyl-2-pyridine and 3-methyl-4-pyridine, quinoline nucleus [for example, quinoline nucleus such as 2-quinoline, 3-methyl-2-quinoline, 5-ethyl-2-quinoline, 6-methyl-2-quinoline, 6-nitro-2-quinoline, 8-fluoro-2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro-4-quinoline, 8-methyl-4-quinoline, 8-methoxy-4-quinoline, 6-methyl-4-quinoline, 6-chloro-4-quinoline, and 6-methoxy-4-quinoline and isoquinoline nucleus such as 6-nitro-1-isoquinoline, 3,4-dihydro-1-isoquinoline and 6-nitro-3-isoquinoline], imidazo [4,5-b ]quinoxaline nucleus such as 1,3diethylimidazo[4,5-b]quinoxaline and 6-chloro-1,3-diallylimidazo [4,5-b ]quinoxaline, oxadiazole nucleus, thiadiazole nucleus, tetrazole nucleus, and pyrimidine nucleus.

Preferred among these heterocyclic nucleus are thiazole nucleus, benzothiazole nucleus, naphthothiazole nucleus, oxazole nucleus, benzoxazole nucleus, naphthoxazole nucleus, benzoselenazole nucleus, benzoimidazole nucleus, naphthoimidazole nucleus, and quinoline nucleus. Particularly preferred among these heterocyclic nucleus are benzothiazole nucleus and benzoselenazole nucleus.

The methine group represented by $L_1$, $L_2$ or $L_3$ may be substituted by substituents. Examples of such substituents include alkyl group which may be substituted (e.g., methyl, ethyl, 2-carboxyethyl), aryl group which may be substituted (e.g., phenyl, o-carboxyphenyl), halogen atom (e.g., chlorine, bromine), alkoxy group (e.g., methoxy, ethoxy), and alkylthio group (e.g., methylthio, ethylthio). The methine group may form a ring with other methine groups or auxochromes. Examples of the anion represented by $X_1$ include inorganic and organic acid anions such as chloride, bromide, iodide, p-toluenesulfonate, naphthalenedisulfonate, methanesulfonate, methylsulfonate, ethylsulfate and perchlorate.

The suffix m is preferably 0 or 1.

Specific examples of the methine compound represented by the general formula (I) will be given below, but the present invention should not be construed as being limited thereto.

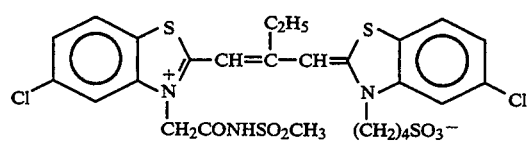

I-1

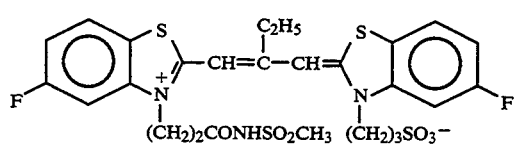

I-2

-continued
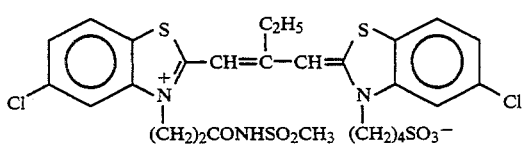
I-3
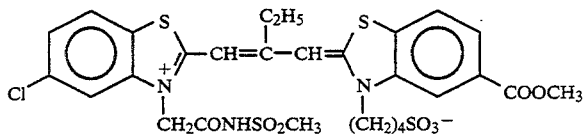
I-4
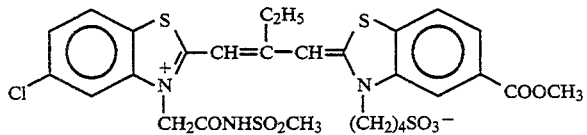
I-5
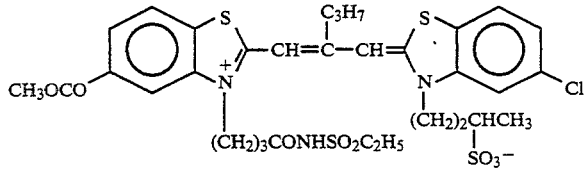
I-6
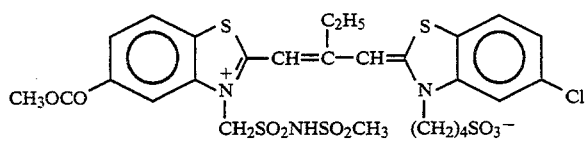
I-7
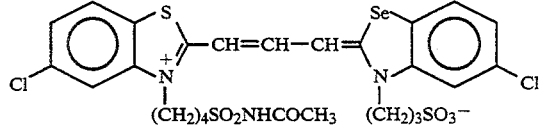
I-8
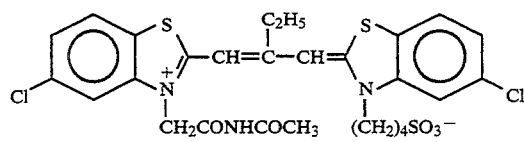
I-9
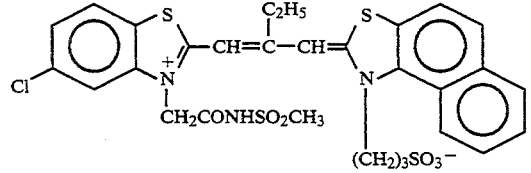
I-10
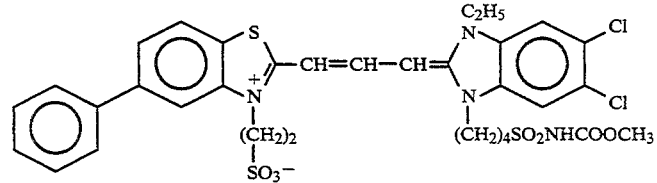
I-11
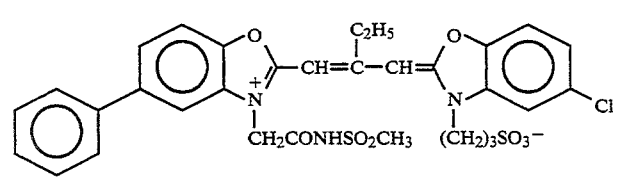
I-12

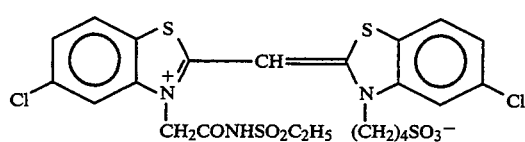
I-13
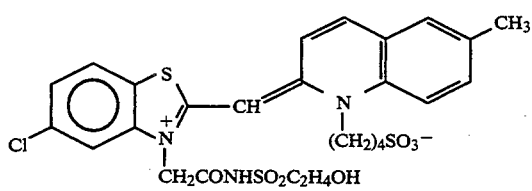
I-14
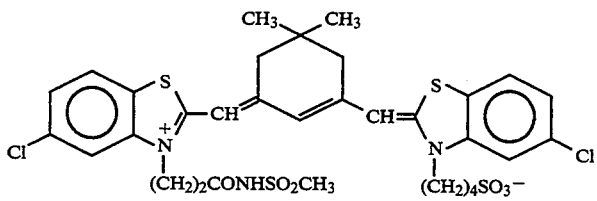
I-15
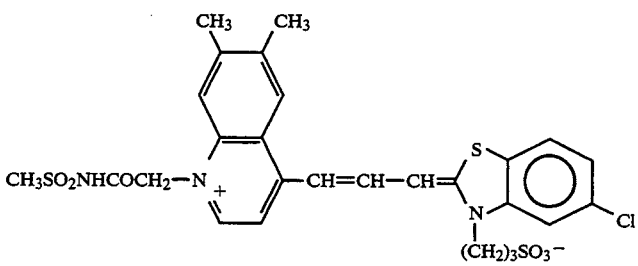
I-16
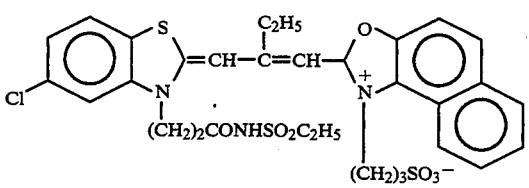
I-17
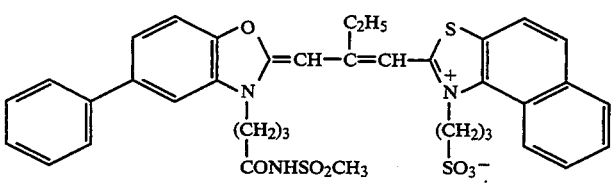
I-18
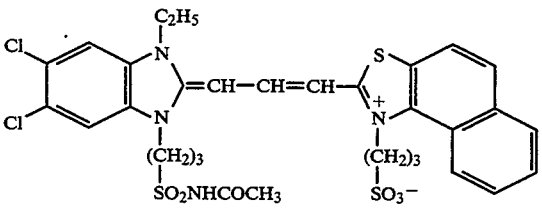
I-19
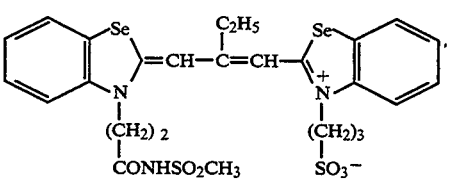
I-20

-continued
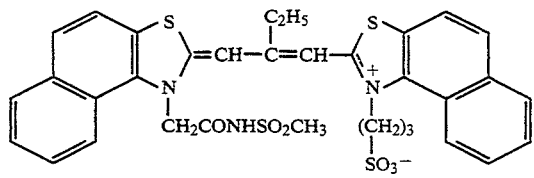
I-21
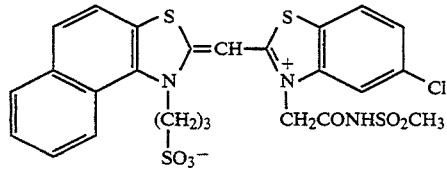
I-22
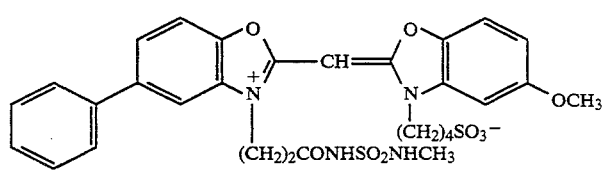
I-23
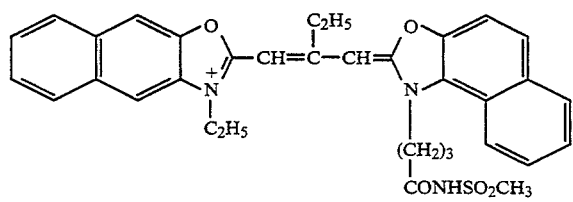
I-24
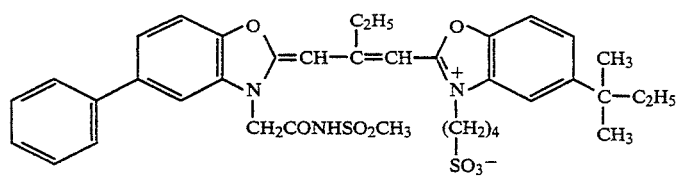
I-25
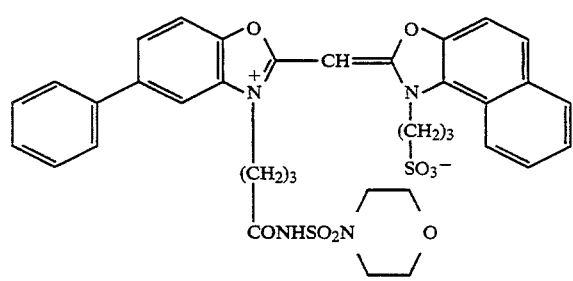
I-26
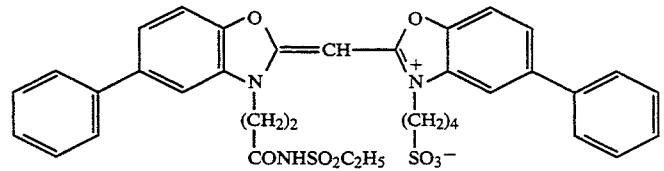
I-27
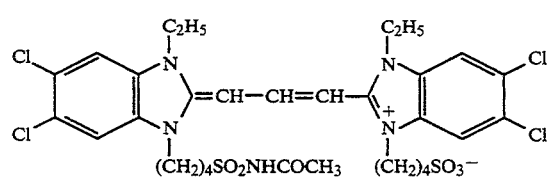
I-28

-continued

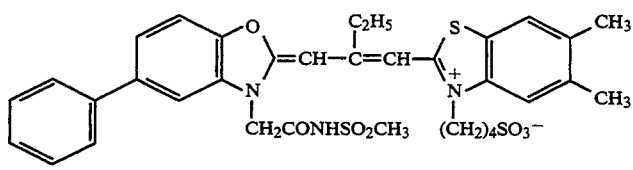
I-29

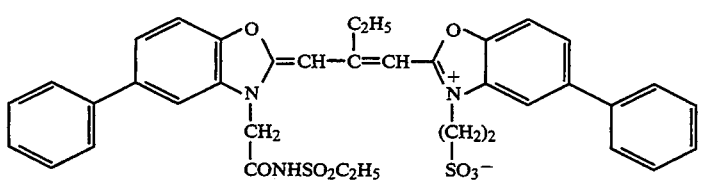
I-30

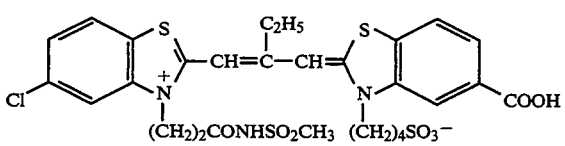
I-31

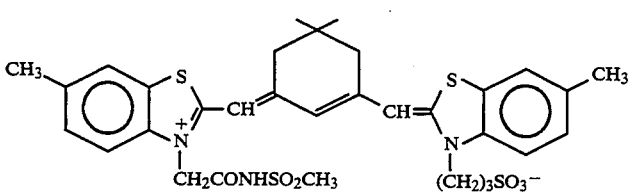
I-32

The synthesis of the methine compound represented by the general formula (I) can be accomplished by the following synthesis methods:

SYNTHESIS EXAMPLE 1

(Synthesis of 5-chloro-3-methanesulfonylaminocarbonylmethyl-2-methylbenzothiazolium=bromide)

50 g of N-(bromoacetyl)methanesulfonamide obtained by the synthesis method described in U.S. Pat. No. 3,282,933, 36.6 g of 5-chloro-2-methylbenzothiazole and 4 ml of methyl ethyl ketone were stirred at a temperature of 105° C. over an oil bath for 5 hours. To the reaction solution was added 200 ml of acetone. The reaction solution was refluxed for 1 hour, and then cooled with water. After 1 hour, the resulting crystal was filtered with suction, washed with 100 ml of acetone, and then dried to obtain 59.6 g of the target compound (yield: 74.7%).

(Synthesis of Exemplary Compound I-1)

To 38.06 g of 5-chloro-3-methanesulfonylaminocarbonylmethyl-2-methylbenzothiazolium=bromide and 40.46 g of 4-{5-chloro-2-(ethoxy-1-butenyl)-3-benzothiazolio}butanesulfonate was added 477 ml of methanol with stirring. To the solution was added dropwise 40.1 ml of triethylamine at room temperature. The mixture was then stirred for 1 hour. To the reaction solution was added 82 ml of acetic acid. The reaction mixture was stirred for 20 minutes, and then cooled with water. After 1 hour, the resulting crystal was filtered with suction, washed with 150 ml of methanol, and then dried to obtain 48.7 g of a crude crystal of Exemplary Compound I-1.

The crude crystal was then dissolved in 600 ml of methanol and 30 ml of triethylamine. Insoluble matters were filtered off with suction. The filtrate was washed with 300 ml of methanol, and then concentrated at ordinary pressure to distill off 400 ml of the solvents. To the residue was added 40 ml of acetic acid at a temperature of 55° C. The mixture was stirred for 20 minutes, and then cooled with water. After 1 hour, the resulting crystal was filtered with suction, washed with 250 ml of methanol, and then dried to obtain 36.2 g (yield: 56.1%) of Exemplary Compound I-1.

λmax(MeOH): 554 nm ($\epsilon 1.14 \times 10^5$)

m.p.>300° C.

SYNTHESIS EXAMPLE 2

(Synthesis of 5-chloro-3-methanesulfonylaminocarbonyl-methyl-2-methylbenzothiazolium=bromide)

46 g of N-(β-bromopropionyl)methanesulfonamide obtained by the synthesis method described in U.S. Pat. No. 3,282,933 and 20 g of 5-chloro-2-methylbenzothiazole were mixed at a temperature of 115° C. over an oil bath for 60 hours. To the reaction solution was added 200 ml of ethyl acetate. The resulting crystal was then filtered to obtain 40.8 g of the target compound (yield: 82%).

(Synthesis of Exemplary Compound I-3)

2.1 g of 5-chloro-3-methanesulfonylaminocarbonyl-methyl-2-methylbenzothiazolium=bromide and 2.4 g of 4-{5-chloro-2-(ethoxy-1-butenyl)-3-benzothiazolio}butane-sulfonate were dissolved in 20 ml of benzyl alcohol. To the solution was added 2 ml of triethylamine at room temperature. The mixture was then stirred for 1 hour. Insoluble matters were removed by filtration from the reaction solution. To the filtrate were added 100 ml of ethyl acetate and 10 ml of glacial acetic acid. The mixture was stirred for 10 minutes. The resulting crystal was dissolved in a mixture of methanol and triethylamine. Insoluble matters were removed by filtration from the solution. To the filtrate was added 10 ml of glacial acetic acid. Methanol was then distilled off at ordinary pressure to one third of the original volume. The reaction solution was then cooled with water. The resulting crystal was filtered off to obtain 0.6 g (yield: 17.4%) of Exemplary Compound I-3.

$\lambda max(MeOH)$: 553 nm ($\epsilon.1.33 \times 10^5$)

m.p. >300° C.

The physical properties of methine compounds of the present invention prepared by similar synthesis methods will be given below.

| Exemplary Compound | $\lambda max(MeOH)$ (nm) | m.p. |
|---|---|---|
| I-2 | 550($\epsilon$1.20 × 10$^5$) | >300° C. |
| I-4 | 551($\epsilon$1.21 × 10$^5$) | >300° C. |
| I-5 | 551($\epsilon$1.13 × 10$^5$) | >300° C. |
| I-6 | 551($\epsilon$1.30 × 10$^5$) | >300° C. |
| I-7 | 551($\epsilon$1.19 × 10$^5$) | >300° C. |
| I-8 | 560($\epsilon$1.22 × 10$^5$) | >300° C. |
| I-9 | 552($\epsilon$1.30 × 10$^5$) | >300° C. |
| I-10 | 538($\epsilon$4.51 × 10$^5$) | >300° C. |
| I-11 | 503($\epsilon$1.37 × 10$^5$) | >300° C. |
| I-12 | 500($\epsilon$1.42 × 10$^5$) | >300° C. |

The term "water-soluble dye" as used herein means a "dye soluble in water in an amount of 0.5% or more, preferably 1% or more based on the weight of water at 25° C".

Examples of such a dye include oxonol dyes containing pyrazolone or barbituric acid nucleus as disclosed in British Patents 506,385, 1,177,429, 1,311,884, 1,338,799, 1,385,371, 1,467,214, 1,433,102, and 1,553,516, JP-A-48-85,130, JP-A-49-114,420, JP-A-52-117,123, JP-A-52-92,716, JP-A-55-161,233, and JP-A-59- 111,640, JP-B-39-22,069, JP-B-43-13,168, and JP-B-62-273,527, and U.S. Pat. Nos. 3,247,127, 3,469,985, and 4,078,933, other oxonol dyes as disclosed in U.S. Pat. Nos. 2,533,472, and 3,379,533, and British Patent 1,278,621, azo dyes as disclosed in British Patents 575,691, 680,631, 599,623, 786,907, 907,125, and 1,045,609, U.S. Pat. No. 4,255,326, and JP-A-59-211,043, azomethine dyes as disclosed in JP-A-50-100,116, and JP-A-54-118,247, and British Patents 2,014,598, and 750,031, anthraquinone dyes as disclosed in U.S. Pat. No. 2,865,752, arylidene dyes as disclosed in U.S. Pat. Nos. 2,538,009, 2,688,541, 2,538,008, and 4,923,788, British Patents 584,609, and 1,210,252, JP-A-50-40,625, JP-A-51-3,623, JP-A-51-10,927, and JP-A-54-118,247, and JP-B-48-3,286, JP-B-59-37,303, and JP-B-63-197,943, styryl dyes as disclosed in JP-B-28-3,082, JP-B-44-16,594, and JP-B-59-28,898, triarylmethane dyes as disclosed in British Patents 446,583, and 1,335,422, and JP-A-59-228,250, merocyanine dyes as disclosed in British Patents 1,075,653, 1,153,341, 1,284,730, 1,475,228, and 1,542,807, and cyanine dyes as disclosed in U.S. Pat. Nos. 2,843,486, 3,294,539, and 4,900,653.

Among these dyes, dyes which can be particularly preferably used in the present invention are those represented by the following general formulae (II), (III), (IV), (V), (VI) and (VII):

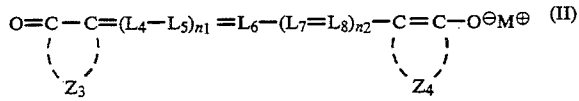

wherein $Z_3$ and $Z_4$ may be the same or different and each represents a nonmetallic atom group required to form a heterocyclic ring; $L_4$, $L_5$, $L_6$, $L_7$, and $L_8$ each represents a methine group; $n_1$ and $n_2$ each represents an integer 0 or 1; and M$^+$ represents a hydrogen atom or other monovalent cation.

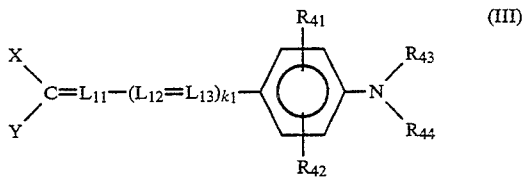

wherein X and Y may be the same or different or may be connected to each other to form a ring and each represents an electrophilic group; $R_{41}$ and $R_{42}$ may be the same or different and each represents a hydrogen atom, halogen atom, alkyl group, alkoxy group, hydroxyl group, carboxyl group, substituted amino group, carbamoyl group, sulfamoyl group, alkoxycarbonyl group or sulfo group; $R_{43}$ and $R_{44}$ may be the same or different or may be connected to each other to form a 5- or 6-membered ring and each represents a hydrogen atom, alkyl group, alkenyl group, aryl group, acyl group or sulfonyl group; $R_{41}$ and $R_{43}$ or $R_{42}$ and $R_{44}$ may be connected to each other to form a 5- or 6-membered ring; $L_{11}$, $L_{12}$ and $L_{13}$ each represents a methine group; and $k_1$ represents an integer 0 or 1, with the proviso that at least one of X, Y, $R_{41}$, $R_{42}$, $R_{43}$ and $R_{44}$ contains a sulfo group or carboxyl group as a substituent.

wherein Ar$_1$ and Ar$_2$ may be the same or different and each represents an aryl group or heterocyclic group.

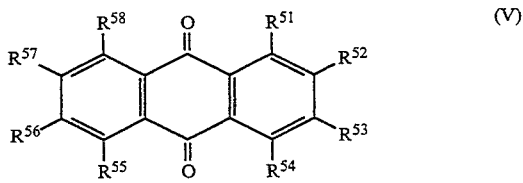

wherein $R^{51}$, $R^{54}$, $R^{55}$ and $R^{58}$ may be the same or different and each represents a hydrogen atom, hydroxyl group, alkoxy group, aryloxy group, carbamoyl group or amino group (—NR'R" in which R' and R" may be the same or different and each represents a hydrogen atom or alkyl or aryl group containing at least one sulfonic or carboxyl group); and $R^{52}$, $R^{53}$, $R^{56}$ and $R^{57}$ may be the same or different and each represents a hydrogen atom, sulfonic group, carboxyl group or alkyl or aryl group containing at least one sulfonic or carboxyl group.

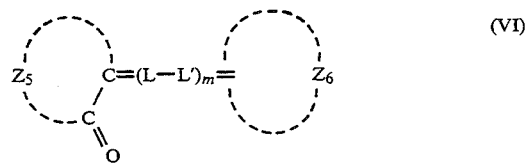

wherein L and L' each represents a substituted or unsubstituted methine group or nitrogen atom; m represents an integer 0 to 3; Z$_5$ represents a nonmetallic metal atom required to form a pyrazolone nucleus, hydroxypyridone nucleus, barbituric acid nucleus, thiobarbituric acid nucleus, dimedone nucleus, indane-1,3-dione nucleus, rhodanine nucleus, thiohydantoin nucleus, oxazolidine-4-one-2-thione nucleus, homophthalimide nucleus, pyrimidine-2,4-dione nucleus or 1,2,3,4-tetrahydroquinoline-2,4-dione nucleus; $Z_6$ represents a nonmetallic metal atom required to form an oxazole nucleus, benzoxazole nucleus, naphthoxazole nucleus, thiazole nucleus, benzothiazole nucleus, naphthothiazole nucleus, benzoselenazole nucleus, pyridine nucleus, quinoline nucleus, benzoimidazole nucleus, naphthoimidazole nucleus, imidazoquinoxaline nucleus, indolenine nucleus, isooxazole nucleus, benzoisooxazole nucleus, naphthoisooxazole nucleus or acrydine nucleus; and $z^5$ and $Z^6$ may further contain substituents.

General Formula (VII)

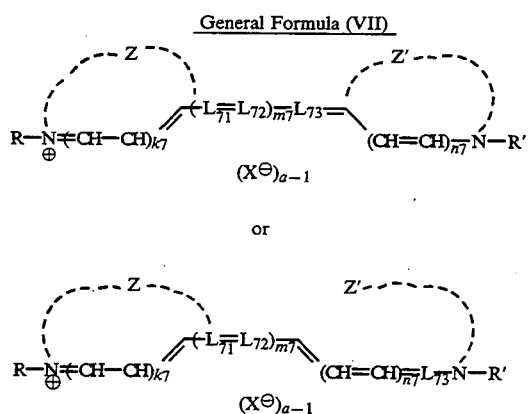

wherein R and R' may be the same or different and each represents a substituted or unsubstituted alkyl group; $L_{71}$, $L_{72}$ and $L_{73}$ may be the same or different and each represents a substituted or unsubstituted methine group; $m_7$ represents an integer 0 to 3; Z and Z' may be the same or different and each represents a nonmetallic atom group required to form a substituted or unsubstituted heterocyclic 5- or 6-membered ring; $k_7$ and $n_7$ each represents an integer 0 or 1; X⁻ represents an anion; and a represents an integer 1 or 2, with the proviso that if the compound forms an intramolecular salt, a is 1.

These dyes will be further described hereinafter.

In the general formula (II), the heterocyclic ring formed by the nonmetallic atom group represented by $Z_3$ or $Z_4$ is preferably 5- or 6-membered and may be a monocyclic or condensed ring. Examples of such a heterocyclic ring include 5-pyrazolone, 6-hydroxypyridone, pyrazolo[3,4-b]pyridine-3,6-dione, barbituric acid, pyrazolinedione, thiobarbituric acid, rhodanine, imidazopyridine, pyrazolopyrimidine, pyrrolidone, and pyrazoloimidazole.

The methine group represented by $L_4$, $L_5$, $L_6$, $L_7$ or $L_8$ may contain substituents such as methyl, ethyl, phenyl, chlorine atom, sulfoethyl, carboxyethyl, dimethylamino and cyano. These substituents may be connected to each other to form a 5- or 6-membered ring such as cyclohexene, cyclopentene and 5,5-dimethylcyclohexene.

Examples of monovalent cations other than hydrogen atom represented by M⁺ include Na⁺, K⁺, HN⁺(C₂H₅)₃, C₆H₅NH⁺, and Li⁺.

Particularly preferred among the dyes represented by the general formula (II) are those represented by the following general formulae (II-a), (II-b), (II-c), (II-d) and (II-e):

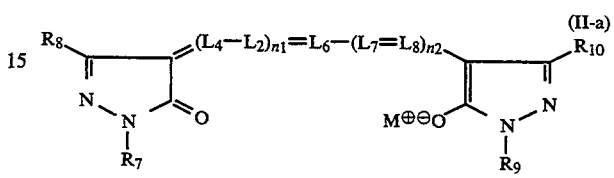

wherein $R_7$ and $R_9$ each represents an aliphatic group, aromatic group or heterocyclic group; $R_8$ and $R_{10}$ each represents an aliphatic group, aromatic group, —$OR_{11}$, —$COOR_{11}$, —$NR_{11}R_{12}$, —$CONR_{11}R_{12}$, —$NR_{11}CONR_{11}R_{12}$, —$SO_2R_{13}$, —$COR_{13}$, —$NR_{12}COR_{13}$, —$NR_{12}SO_2R_{13}$, cyano group (in which $R_{11}$ and $R_{12}$ each represents a hydrogen atom, aliphatic group or aromatic group, $R_{13}$ represents an aliphatic group or aromatic group, and $R_{11}$ and $R_{12}$ or $R_{12}$ and $R_{13}$ may be connected to each other to form a 5- or 6-membered ring); and $L_4$, $L_5$, $L_6$, $L_7$, $L_8$, $n_1$, $n_2$, and M⁺ are as defined in the general formula (I).

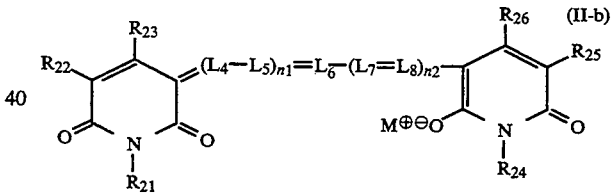

wherein $R_{21}$ and $R_{24}$ each represents a hydrogen atom, aliphatic group, aromatic group, heterocyclic group, —$NR_{27}R_{28}$, —$NR_{27}CONR_{27}R_{28}$, —$NR_{28}COR_{29}$ or —$NR_{28}SO_2R_{29}$; $R_{22}$ and $R_{25}$ each represents a hydrogen atom, aliphatic group, aromatic group, heterocyclic group, cyano group, sulfonic group, —$NR_{27}R_{28}$, —$NR_{28}COR_{29}$, —$NR_{28}SO_2R_{29}$, —$NR_{27}CONR_{27}R_{28}$, —$COOR_{27}$, —$CONR_{27}R_{28}$, —$COR_{29}$, —$SO_2R_{29}$ or —$SO_2NR_{27}R_{28}$; $R_{23}$ and $R_{26}$ each represents a hydrogen atom, aliphatic group, aromatic group, heterocyclic group, —$OR_{27}$, —$COOR_{27}$, —$COR_{29}$, —$CONR_{27}R_{28}$, —$NR_{27}R_{28}$, —$NR_{28}COR_{29}$, —$NR_{28}SO_2R_{29}$, —$NR_{27}CONR_{27}R_{28}$, —$SO_2R_{29}$, —$SO_2NR_{27}R_{28}$, —$OR_{27}$ or cyano group (in which $R_{27}$ and $R_{28}$ each represents a hydrogen atom, aliphatic group or aromatic group, $R_{29}$ represents an aliphatic or aromatic group, and $R_{27}$ and $R_{28}$ or $R_{28}$ and $R_{29}$ may be connected to each other to form a 5- or 6-membered ring); and $L_4$, $L_5$, $L_6$, $L_7$, $L_8$, $n_1$, $n_2$, and M⁺ are as defined in the general formula (II).

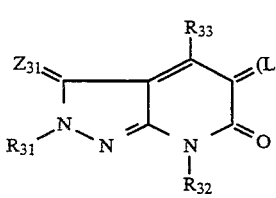 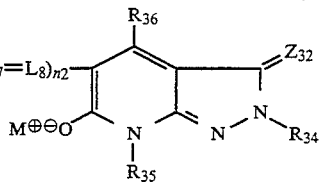

(II-c)

wherein $R_{31}$ and $R_{34}$ each represents an aliphatic, aromatic or heterocyclic group; $R_{32}$ and $R_{35}$ each represents a hydrogen atom, aliphatic group, aromatic group, heterocyclic group, $COR_{39}$ or $SO_2R_{39}$; $R_{33}$ and $R_{36}$ each represents a hydrogen atom, cyano group, alkyl group, aryl group, $-COOR_{37}$, $-OR_{37}$, $-NR_{37}R_{38}$, $-N(R_{38})COR_{39}$, $-N(R_{38})SO_2R_{39}$, $-CONR_{37}R_{38}$ or $-N(R_{37})CONR_{37}R_{38}$ ( in which $R_{39}$ represents an aliphatic group or aromatic group, and $R_{37}$ and $R_{38}$ each represents a hydrogen atom, aliphatic group or aromatic group); $Z_{31}$ represents an oxygen atom or $NR_{45}$; $Z_{32}$ represents an oxygen atom or $NR_{46}$ (in which $R_{45}$ and $R_{46}$ each represents a nonmetallic atom group required to form a 5- or 6-membered ring with $R_{31}$ or $R_{34}$, respectively); and $L_4$, $L_5$, $L_6$, $L_7$, $L_8$, $n_1$, $n_2$, and $M^+$ are as defined in the general formula (II), with the proviso that at least one of $R_{31}$, $R_{32}$, $R_{33}$, $R_{34}$, $R_{35}$, $R_{36}$, $L_4$, $L_5$, $L_6$, $L_7$, and $L_8$ represents a group containing at least one carboxylic or sulfonic group.

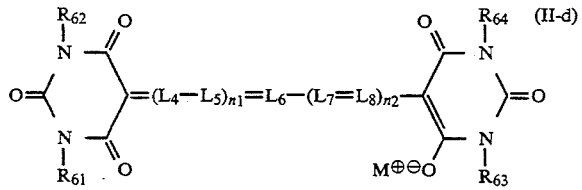

(II-d)

wherein $R_{61}$, $R_{62}$, $R_{63}$, and $R_{64}$ each represents a hydrogen atom, aliphatic group, aromatic group or heterocyclic group; and $L_4$, $L_5$, $L_6$, $L_7$, $L_8$, $n_1$, $n_2$, and $M^+$ are as defined in the general formula (II).

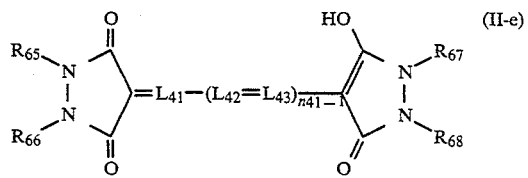

(II-e)

wherein $R_{65}$, $R_{66}$, $R_{67}$, and $R_{68}$ each represents an aliphatic group, aromatic group or heterocyclic group; $L_{41}$, $L_{42}$ and $L_{43}$ each represents a methine group; and $n_{41}$ represents an integer 1 to 3, with the proviso that any of $R_{65}$, $R_{66}$, $R_{67}$, and $R_{68}$ contains carboxyl groups or sulfo groups, the number of which totaling 2 or more.

The general formula (II-a) will be further described hereinafter.

The aliphatic group represented by $R_7$, $R_8$, $R_9$, $R_{10}$, $R_{11}$, $R_{12}$ or $R_{13}$ may be a straight-chain, branched or cyclic alkyl, aralkyl or alkenyl group. Examples of such an aliphatic group include methyl, ethyl, n-butyl, benzyl, 2-sulfoethyl, 4-sulfobutyl, 2-sulfobenzyl, 2-carboxyethyl, carboxymethyl, trifluoromethyl, dimethylaminoethyl, and 2-hydroxyethyl.

Examples of the aromatic group represented by $R_7$, $R_8$, $R_9$, $R_{10}$, $R_{11}$, $R_{12}$ or $R_{13}$ include phenyl, naphthyl, 4-sulfophenyl, 3-sulfophenyl, 2,5-disulfophenyl, 4-carboxyphenyl, and 5,7-disulfo-3-naphthyl.

The heterocyclic group represented by $R_7$ or $R_9$ represents a 5- or 6-membered nitrogen-containing heterocyclic group (including condensed ring) such as 5-sulfopyridine-2-yl and 5-sulfobenzothiazole-2-yl.

Examples of the 5- or 6-membered ring formed by the connection of $R_{11}$ to $R_{12}$ or $R_{12}$ to $R_{13}$ include pyrrolidine ring, piperidine ring, pyrrolidone ring, and morpholine ring.

Examples of the dye represented by the general formula (II-a) will be given below, but the present invention should not be construed as being limited thereto.

| No. | $R_7, R_9$ | $R_8, R_{10}$ | $=(L_4-L_5)_{n1}=L_6-(L_7=L_8)_{n2}-$ | $M^{\oplus}$ |
|---|---|---|---|---|
| a-1 | -⟨phenyl⟩-SO$_3$K | $-CH_3$ | $=CH-$ | H |
| a-2 | -⟨phenyl⟩-SO$_3$K | $-CONHC_3H_7^{(n)}$ | $=CH-$ | H |

-continued

| No. | $R_8$, $R_{10}$ | $=(L_4-L_5)_{n1}=L_6-(L_7=L_8)_{n2}-$ | $M^{\oplus}$ |
|---|---|---|---|
| a-3 | 2,5-di($SO_3Na$)-4-methylphenyl | $=CH-CH=CH-$ | Na |
| a-4 | 2,5-di($SO_3Na$)-4-methylphenyl; $-OC_2H_5$ | $=CH-(CH=CH)_2-$ | Na |
| a-5 | $-CH_2CH_2SO_3K$; $-COOC_2H_5$ | $=CH-CH=CH-$ | H |
| a-6 | $-CH_2$-(2-$SO_3K$)phenyl; $-CONHC_4H_9^{(n)}$ | $=CH-CH=CH-$ | H |
| a-7 | $-CH_2CH_2SO_3K$; $-COOK$ | $=CH-(CH=CH)_2-$ | H |
| a-8 | 2,5-di($SO_3Na$)-4-methylphenyl; $-COCH_3$ | $=CH-(CH=CH)_2-$ | Na |
|  | $R_7$, $R_{10}$ |  |  |
| a-9 | 3-methyl-4-$SO_3Na$-phenyl; $-CF_3$ | $=CH-(CH=CH)_2-$ | H |
| a-10 | 4-methyl-2-$SO_3Na$-phenyl; $-NHCOCH_3$ | $=CH-CH=CH-$ | H |
| a-11 | 4-$SO_3K$-phenyl; $-COOC_2H_5$ | $=CH-(CH=CH)_2-$ | H |
| a-12 | 4-$SO_3K$-phenyl; $-COOC_2H_5$ | $=CH-CH=CH-$ | H |
| a-13 | 4-$SO_3K$-phenyl; $-NHCONHCH_3$ | $=CH-CH=CH-$ | H |
| a-14 | $-(CH_2)_4SO_3K$; $-OH$ | $=CH-$ | H |
| a-15 | 4-$(CH_2)_3SO_3K$-phenyl; $-COOC_2H_5$ | $=CH-CH=CH-$ | K |

-continued

| No. | $R_8$, $R_{10}$ | | $=(L_4-L_5)_{n1}=L_6-(L_7=L_8)_{n2}-$ | $M^\oplus$ |
|---|---|---|---|---|
| a-16 | $-CH_2CH_2-\langle C_6H_4\rangle-SO_3K$ | $-C_6H_5$ | $=CH-CH=CH-$ | H |
| a-17 | $-CH_2-\langle C_6H_4\rangle-SO_3Na$ | $-COOC_2H_5$ | $=CH(-CH=CH)_2-$ | Na |
| a-18 | $-CH_2-\langle C_6H_4(SO_3Na)\rangle$ | $-CONHCH_2CH_2OH$ | $=CH(-CH=CH)_2-$ | H |
| a-19 | $-\langle C_6H_4\rangle-SO_3K$ | $-CONHCH_2CH_2SO_3K$ | $=CH(-CH=CH)_2-$ | H |
| a-20 | $-(CH_2)_3SO_3K$ | $-CONHC_7H_{15}^{(n)}$ | $=CH-CH=CH-$ | H |
| a-21 | $-CH_2COOK$ | $-COOK$ | $=CH-CH=CH-$ | K |
| a-22 | $-CH_2CH_2SO_3K$ | $-N(CH_3)_2$ | $=CH(-CH=CH)_2-$ | H |
| a-23 | $-(CH_2)_3SO_3K$ | $-CN$ | $=CH(-CH=CH)_2-$ | H |
| a-24 | $-CH_2-\langle C_6H_3[O(CH_2)_4SO_3K]_2\rangle$ | $-CH_2Cl$ | $=CH(-CH=CH)_2-$ | H |
| a-25 | $-(CH_2)_2SO_3Na$ | $-OH$ | $=CH(-CH=CH)_2-$ | H |
| a-26 | $-\langle C_6H_4\rangle-SO_3Na$ | $-CH_3$ | $=CH-C(CH_3)=CH-$ | Na |
| a-27 | $-\langle C_6H_3(SO_3K)_2\rangle$ | $-COOC_2H_5$ | $=CH(-CH=CH)_2-$ | H |
| a-28 | $-\langle C_6H_4\rangle-SO_3K$ | $-CONHC_2H_5$ | $=CH-CH=CH-$ | H |
| a-29 | $-\langle C_6H_4\rangle-SO_3K$ | $-NHCOC_3H_7^{(i)}$ | $=CH-CH=CH-$ | H |
| a-30 | $-CH_2CH_2SO_3K$ | $-\langle C_6H_4\rangle-SO_3K$ | $=CH-CH=CH-$ | H |

-continued

| No. | R₈, R₁₀ | $=(L_4-L_5)_{n1}=L_6-(L_7=L_8)_{n2}-$ | M⊕ |
|---|---|---|---|
| a-31 | 4-carboxyphenyl (—C₆H₄—COOH) | —CH₃ | =CH+CH=CH$\xleftarrow{}_{2}$ | H |
| a-32 | 4-(SO₃K)phenyl | —ᵗC₄H₉ | =CH—CH=CH— | H |
| a-33 | 4-(SO₃K)phenyl | —CN | =CH+CH=CH$\xleftarrow{}_{2}$ | H |
| a-34 | H | —C₄H₉(n) | =CH— | H |
| a-35 | —CH₂—(2-SO₃K-phenyl) | —COOK | =CH+CH=CH$\xleftarrow{}_{2}$ | H |
| a-36 | —CH₂—(2-SO₃K-phenyl) | —COOK | =CH—CH=CH— | H |
| a-37 | —CH₂—(2-SO₃K-phenyl) | —CONHC₄H₉⁽ⁱ⁾ | =CH+CH=CH$\xleftarrow{}_{2}$ | H |
| a-38 | 4-(SO₃Na)phenyl | —NHSO₂CH₃ | =CH+CH=CH$\xleftarrow{}_{2}$ | H |
| a-39 | benzothiazol-2-yl with 5-SO₃K | —CN | =CH+CH=CH$\xleftarrow{}_{2}$ | H |
| a-40 | 4-(SO₃Na)phenyl | —OC₂H₅ | =CH+CH=CH$\xleftarrow{}_{2}$ | H |
| a-41 | 2,5-di(SO₃K)phenyl | —CN | =CH+CH=CH$\xleftarrow{}_{2}$ | H |

These dyes can be synthesized by the methods as disclosed in British Patents 506,385, 1,177,429, 1,338,799, 1,385,371, 1,467,214, 1,433,102, and 1,553,516, and JP-A-48-85130, JP-A-55-161233, JP-A-52-20330, JP-A-59-111640, and JP-A-62-273527.

The dye represented by the general formula (II-b) will be further described hereinafter.

Examples of the aliphatic group represented by $R_{21}$, $R_{22}$, $R_{23}$, $R_{24}$, $R_{25}$, $R_{26}$, $R_{27}$, $R_{28}$ or $R_{29}$ include methyl, ethyl, isopropyl, 2-chloroethyl, trifluoromethyl, benzyl, 2-sulfobenzyl, 4-sulfophenethyl, carboxymethyl, 2-carboxyethyl, 2-sulfoethyl, 2-hydroxyethyl, dimethylaminoethyl, and cyclopentyl.

Examples of the aromatic group represented by $R_{21}$, $R_{22}$, $R_{23}$, $R_{24}$, $R_{25}$, $R_{26}$, $R_{27}$, $R_{28}$ or $R_{29}$ include phenyl, naphthyl, 3-sulfophenyl, 4-sulfophenyl, 2,5-disulfophenyl, 4-(3-sulfopropyloxy)phenyl, 3-carboxyphenyl, and 2-carboxyphenyl.

Examples of the heterocyclic group represented by $R_{21}$, $R_{22}$, $R_{23}$, $R_{24}$, $R_{25}$ or $R_{26}$ include 2-pyridyl, morpholino, and 5-sulfobenzoimidazole-2-yl.

Examples of the 5- or 6-membered ring formed by the connection of $R_{27}$ to $R_{28}$ or $R_{28}$ to $R_{29}$ include piperidine ring, pyrrolidine ring, morpholine ring, and pyrrolidone ring.

Specific examples of the dye represented by the general formula (II-b) will be given below, but the present invention should not be construed as being limited thereto.

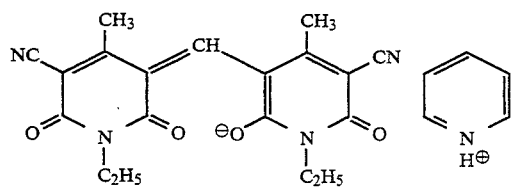
(b-1)

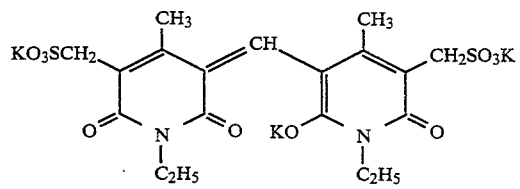
(b-2)

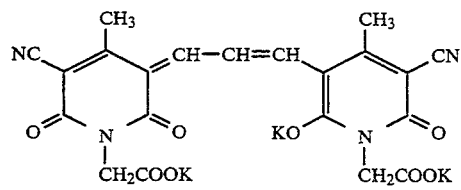
(b-3)

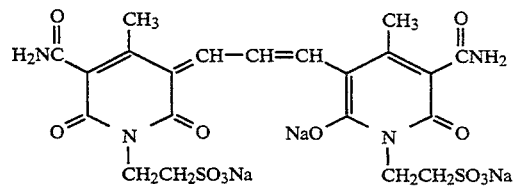
(b-4)

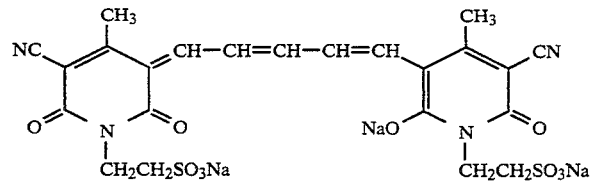
(b-5)

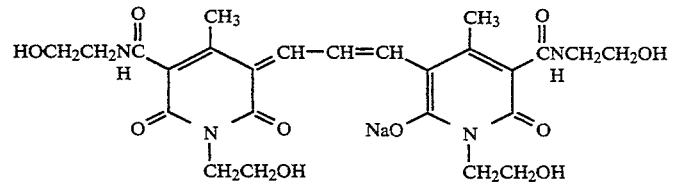
(b-6)

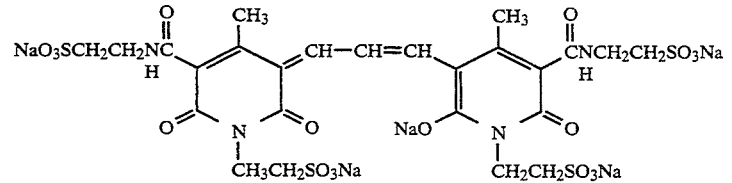
(b-7)

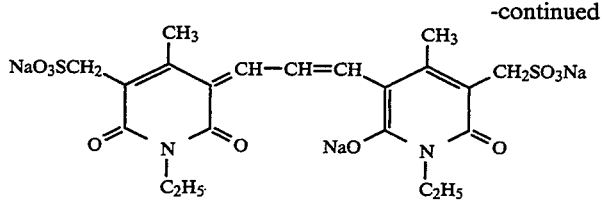
(b-8)

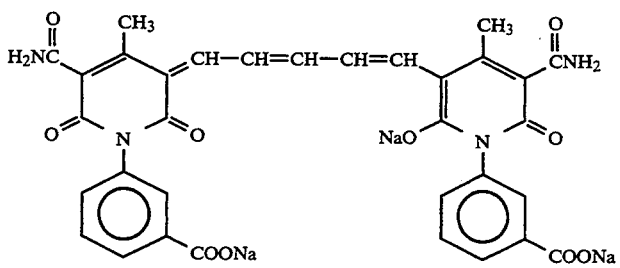
(b-9)

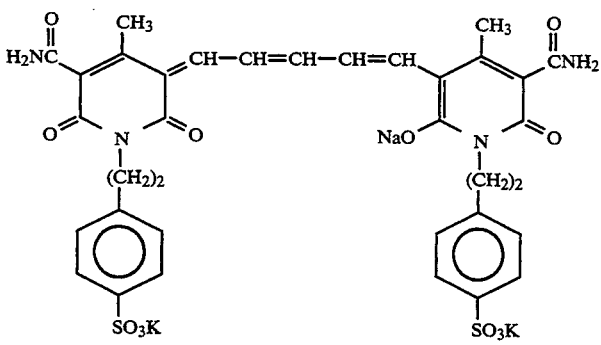
(b-10)

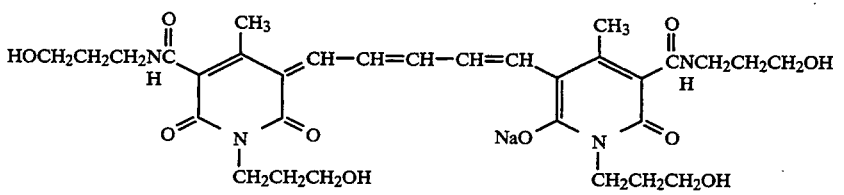
(b-11)

The dye represented by the general formula (II-b) can be synthesized by the methods as disclosed in British Patents 1,278,621, 1,512,863, and 1,579,899.

The general formula (II-c) will be further described hereinafter.

The aliphatic group represented by $R_{31}$, $R_{32}$, $R_{33}$, $R_{34}$, $R_{35}$, $R_{36}$, $R_{37}$, $R_{38}$ or $R_{39}$ may be a straight-chain, branched or cyclic alkyl, aralkyl or alkenyl group. Examples of such an aliphatic group include methyl, ethyl, n-butyl, benzyl, 2-sulfoethyl, 4-sulfobutyl, 2-sulfobenzyl, 2,4-disulfobenzyl, 2-carboxyethyl, carboxymethyl, 2-hydroxyethyl, dimethylaminoethyl, and trifluoromethyl.

Examples of the aromatic group represented by $R_{31}$, $R_{32}$, $R_{33}$, $R_{34}$, $R_{35}$, $R_{36}$, $R_{37}$, $R_{38}$ or $R_{39}$ include phenyl, naphthyl, 4-sulfophenyl, 2,5-disulfophenyl, 4-carboxyphenyl, 5,7-disulfo-3-naphthyl, 4-methoxyphenyl, and p-tolyl.

The heterocyclic group represented by $R_{31}$, $R_{32}$, $R_{34}$ or $R_{35}$ represents a 5- or 6-membered nitrogen-containing heterocyclic group (including condensed ring) such as 5-sulfopyridine-2-yl and 5-sulfobenzothiazole-2-yl.

If $Z_{31}$ represents $NR_{45}$ and $Z_{32}$ represents $NR_{46}$, examples of the 5-membered ring formed by the connection of $R_{45}$ to $R_{31}$ and $R_{46}$ to $R_{34}$ include imidazole ring, benzoimidazole ring, and triazole ring. These 5-membered rings may contain substituents such as carboxylic group, sulfonic group, hydroxyl group, halogen atom (e.g., F, Cl, Br), alkyl group (e.g., methyl, ethyl) and alkoxy group (e.g., methoxy, 4-sulfobutoxy).

Specific examples of the dye represented by the general formula (II-c) to be used in the present invention will be given below, but the present invention should not be construed as being limited thereto.

-continued

| Compound | R₃₁, R₃₄ | R₃₂, R₃₅ | R₃₃, R₃₆ | $\equiv L_4-L_5\frac{}{n1}L_6\equiv L_7=L_8\frac{}{n2}$ | Z₃₁, Z₃₂ | M⊕ |
|---|---|---|---|---|---|---|
| C-2 | -CH₂-C₆H₄(SO₃K) | -C₆H₅ | -COOK | =CH- | O | K |
| C-3 | -C₆H₄(SO₃Na) | -H | -OC₂H₅ | =CH- | O | H |
| C-4 | -(CH₂)₃SO₃H | -CH₂CH₂OH | -C₆H₄(SO₃H) | =CH-CH=CH- | O | H |
| C-5 | -(CH₂)₂SO₃K | -COCH₃ | -COOK | =CH-CH=CH- | O | H |
| C-6 | -C₆H₄(SO₃K) | -CH₃ | -COOC₂H₅ | =CH- | O | K |
| C-7 | -C₆H₄(SO₃K) | -CH₃ | -CH₃ | =CH-CH=CH- | O | H |
| C-8 | -C₆H₄(SO₃K) | -H | -COOK | =CH-CH=CH- | O | H |
| C-9 | -C₆H₄(SO₃K) | -CH₃ | -CH₃ | =CH-(CH=CH)₂- | O | H |
| C-10 | -CH₂CH₂COOH | -CH₂CH₂OH | -COOH | =CH-CH=CH- | O | H |
| C-11 | -CH₂CH₂SO₃K | -C₆H₅ | -CH₃ | =CH-CH=CH- | O | H |
| C-12 | -C₆H₄(COOH) | H | -CH₃ | =CH-CH=CH- | O | H |
| C-13 | -C₆H₃(SO₃Na)₂ | -CH₃ | -COONa | =CH-CH=CH- | O | Na |
| C-14 | -C₆H₄(SO₃K) | -CH₃ | -COOK | =CH-CH=CH- | O | K |

-continued

| Compound | $R_{31}, R_{34}$ | $R_{32}, R_{35}$ | $R_{33}, R_{36}$ | $\pm L_4-L_5\overline{)_{n1}}=L_6\pm L_7=L_8\overline{)_{n2}}-$ | $Z_{31}, Z_{32}$ | $M^\oplus$ |
|---|---|---|---|---|---|---|
| C-15 | 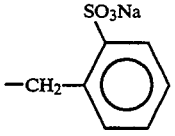 -CH₂-C₆H₄(SO₃Na) | —(CH₂)₂SO₃Na | —COONa | =CH—CH=CH— | O | H |
| C-16 | —CH₂CH₂SO₃K | —COCH₃ | —COOK | =CH—CH=CH— | O | H |
| C-17 | 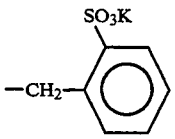 -CH₂-C₆H₄(SO₃K) | 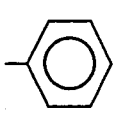 -C₆H₅ | —CH₃ | =CH—CH=CH— | O | K |
| C-18 | 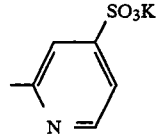 pyridyl-SO₃K | —H | —CH₃ | =CH—CH=CH— | O | H |
| C-19 | 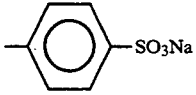 -C₆H₄-SO₃Na | —CH₂CH₂OH | —COONa | =CH—CH=CH— | O | Na |
| C-20 | 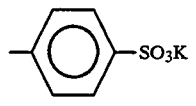 -C₆H₄-SO₃K | —CH₃ | —CONHCH₂CH₂OH | =CH—CH=CH— | O | K |
| C-21 | —(CH₂)₃SO₃K | —CH₂CH₂COOK | 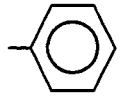 -C₆H₅ | =CH—CH=CH— | O | H |
| C-22 | 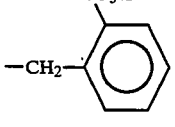 -CH₂-C₆H₄(SO₃K) | —CH₃ | —COOK | =CH—CH=CH— | O | K |
| C-23 | —CH₂CH₂SO₃K | —CH₃ | —COOK | =CH—CH=CH— | O | H |
| C-24 | 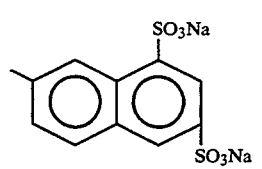 naphthyl-(SO₃Na)₂ | —CH₃ | —COONa | =CH—CH=CH— | O | H |
| C-25 | 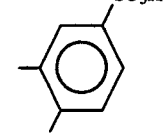 -C₆H₃(SO₃K)(SO₃K) | —CH₂CH₂OH | —CH₃ | =CH—CH=CH— | O | H |
| C-26 | 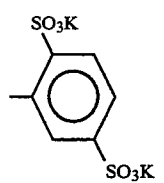 -C₆H₃(SO₃K)(SO₃K) | —CH₃ | —CH₃ | =CH$\pm$CH=CH$\overline{)_{2}}$ | O | K |

-continued

| Compound | $R_{31}, R_{34}$ | $R_{32}, R_{35}$ | $R_{33}, R_{36}$ | $=L_4-L_5\overline{)_{n1}}=L_6-(L_7=L_8\overline{)_{n2}}$ | $Z_{31}, Z_{32}$ | $M^{\oplus}$ |
|---|---|---|---|---|---|---|
| C-27 | -C₆H₄-SO₃Na | —CH₃ | —CN | =CH—CH=CH— | O | Na |
| C-28 | —CH₂-C₆H₃(CH₃)-SO₃K | —C₆H₅ | —CF₃ | =CH—CH=CH— | O | K |
| C-29 | -C₆H₄-SO₃Na | —(CH₂)₄SO₃Na | —CH₃ | =CH—CH=CH— | O | Na |
| C-30 | —CH₂-C₆H₃(SO₃Na)-SO₃Na | —CH₃ | —$^t$C₄H₉ | =CH—CH=CH— | O | Na |

The dye represented by the general formula (II-c) can be synthesized by the methods as disclosed in JP-B-39-22069, JP-B-43-3504, JP-B-52-38056, JP-B-54-38129, and JP-B-55-10059, JP-A-49-99620, and JP-A-59-16834, and U.S. Pat. No. 4,181,225.

The general formula (II-d) will be further described hereinafter.

The aliphatic group represented by $R_{31}$, $R_{32}$, $R_{33}$ or $R_{34}$ has the same meaning as the aliphatic group represented by $R_7$, $R_8$, $R_9$ or $R_{10}$ in the general formula (II-a).

The aromatic group represented by $R_{61}$, $R_{62}$, $R_{63}$ or $R_{64}$ has the same meaning as the aromatic group represented by $R_7$, $R_8$, $R_9$ or $R_{10}$ in the general formula (II-a).

The heterocyclic group represented by $R_{61}$, $R_{62}$, $R_{63}$ or $R_{64}$ has the same meaning as the heterocyclic group represented by $R_7$, $R_8$, $R_9$ or $R_{10}$ in the general formula (II-a).

Specific examples of the dye represented by the general formula (II-d) will be given below, but the present invention should not be construed as being limited thereto.

| No. | $R_{61}, R_{63}$ | $R_{62}, R_{64}$ | $=L_4-L_5\overline{)_{n1}}=L_6-(L_7=L_8)_{n2}$ | $M^{\oplus}$ |
|---|---|---|---|---|
| d-1 | —$^n$C₄H₉ | —CH₂COOK | =CH— | K |
| d-2 | —CH₂CH₂OH | —$^n$C₄H₉ | =CH—CH=CH— | H |
| d-3 | —CH₂CH₂SO₃K | —C₂H₅ | =CH—CH=CH— | H |
| d-4 | —CH₂CH₂COOK | —CH₂CH₂COOK | =CH—CH=CH— | H |
| d-5 | —CH₃ | —CH₃ | =CH—(CH=CH)₂ | H |
| d-6 | —$^n$C₄H₉ | —CH₂COOK | =CH—(CH=CH)₂ | H |
| d-7 | —C₆H₅ | —CH₂COOK | =CH—(CH=CH)₂ | H |
| d-8 | —CH₂CH₂SO₃K | —$^n$C₄H₉ | =CH— | H |
| d-9 | -C₆H₄-SO₃K | H | =CH—CH=CH— | H |
| d-10 | —(CH₂)₃SO₃Na | H | =CH—CH=CH— | H |
| d-11 | —C₆H₅ | —(CH₂)₂SO₃K | =CH— | H |
| d-12 | —C₆H₅ | —(CH₂)₂SO₃K | =CH—CH=CH— | H |
| d-13 | —C₆H₅ | —(CH₂)₂SO₃K | =CH—(CH=CH)₂ | H |
| d-14 | —CH₂COOC₂H₅ | —$^n$C₄H₉ | =CH—CH=CH— | H |

-continued

| No. | $R_{61}, R_{63}$ | $R_{62}, R_{64}$ | $+L_4=L_5\overline{)_{n1}}L_6-(L_7=L_8)_{n2}$ | $M^{\oplus}$ |
|---|---|---|---|---|
| d-15 | ![phenyl-SO3Na] | $-(CH_2)_2SO_3Na$ | $=CH-CH=CH-$ | H |
| d-16 | $-CH_3$ | $-(CH_2)_2SO_3K$ | $=CH-$ | H |
| d-17 | ![phenyl-OCH3] | $-(CH_2)_2SO_3K$ | $=CH-CH=CH-$ | H |
| d-18 | ![benzothiazole-SO3Na] | $-C_2H_5$ | $=CH-CH=CH-$ | H |
| d-19 | $-{}^nC_6H_{13}$ | $-(CH_2)_2SO_3K$ | $=CH-$ | H |
| d-20 | $-(CH_2)_3SO_3Na$ | H | $=CH-$ | H |

These dyes can be synthesized by the methods as disclosed in U.S. Pat. Nos. 3,247,127, 3,469,985, 3,653,905, and 4,078,933.

The general formula (II-e) will be further described hereinafter.

The substituents $R_{65}$, $R_{66}$, $R_{67}$, and $R_{68}$ contained in the dye represented by the general formula (II-e) each represents an alkyl group (such as methyl, ethyl, carboxymethyl, 2-carboxyethyl, 2-hydroxyethyl, methoxyethyl, 2-chloroethyl, benzyl, 2-sulfobenzyl and 4-sulfophenethyl), aryl group (such as phenyl, 4-sulfophenyl, 3-sulfophenyl, 2-sulfophenyl, 4-carboxyphenyl, 3carboxyphenyl and 4-hydroxyphenyl) or heterocyclic group (such as 2-pyridyl and 2-imidazolyl).

$L_{41}$, $L_{42}$ and $L_{43}$ each represents a methine group. These methine groups may be independently substituted by methyl, ethyl, phenyl, chlorine atom, sulfoethyl, carboxyethyl, etc.

The suffix $n_{41}$ represents an integer 1 to 3.

However, any of $R_{65}$, $R_{66}$, $R_{67}$, and $R_{68}$ contains at least one carboxyl group or sulfo group, the number of which totaling 2 or more. Further, these carboxyl groups or sulfo groups may form not only a free acid but also a salt (e.g., sodium salt, potassium salt, ammonium salt).

Specific examples of the dye represented by the general formula (II-e) to be used in the present invention will be given below, but the present invention should not be construed as being limited thereto.

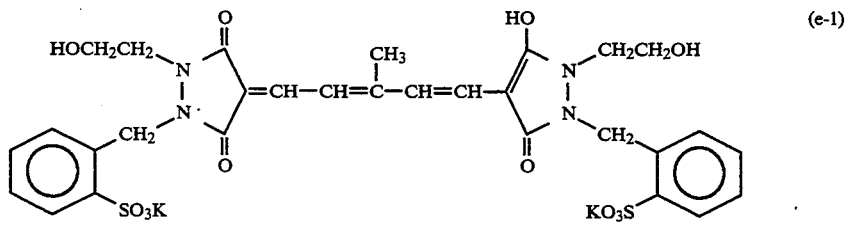

(e-1)

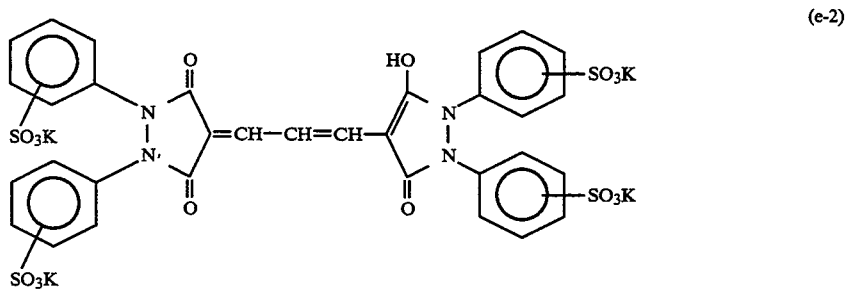

(e-2)

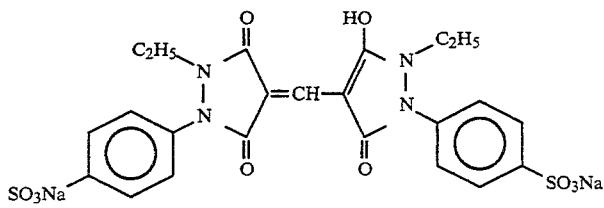 (e-3)

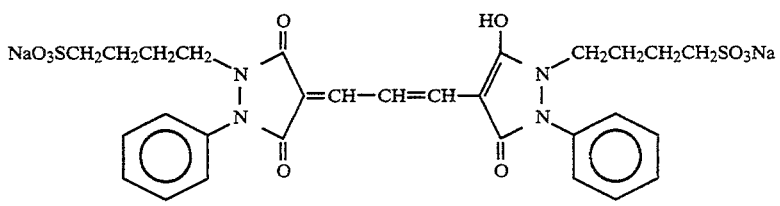 (e-4)

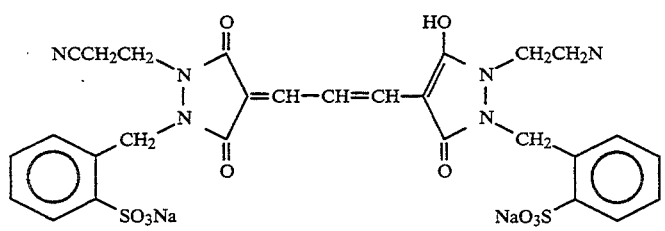 (e-5)

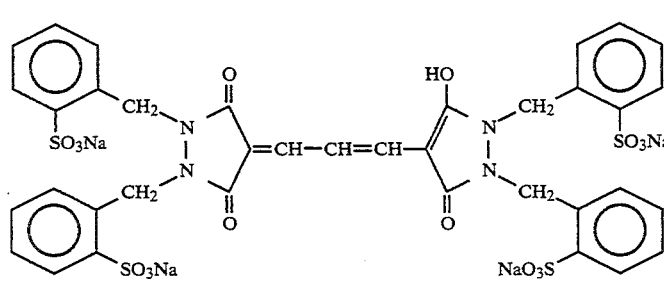 (e-6)

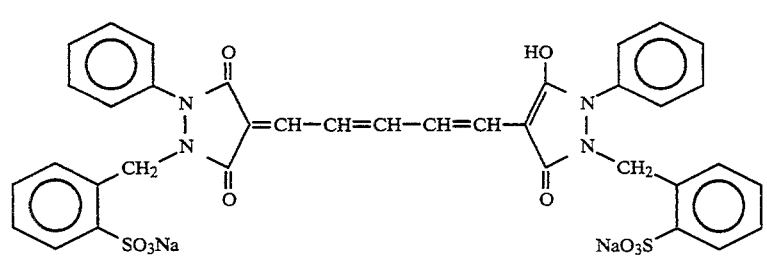 (e-7)

The compound represented by the general formula (II-e) can be synthesized by various synthesis methods. For example, this compound can be synthesized by condensing 1,2-di-substituted-3,5-pyrazolidinedione represented by the general formula (A) with a compound represented by the general formula (B-1), (B-2), (B-3), (B-4) or (B-5) in the presence of a base as shown in the following reaction formula.

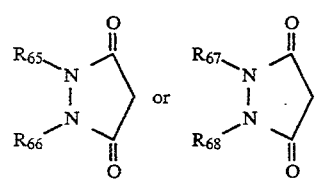 (A)

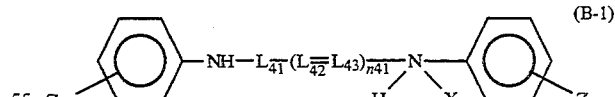 (B-1)

HO(OC$_2$H$_5$)$_3$ (B-2)

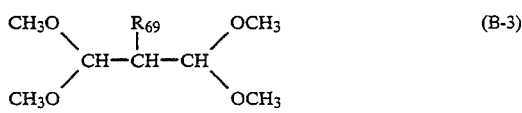 (B-3)

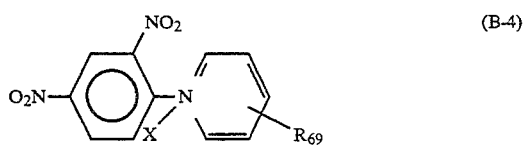 (B-4)

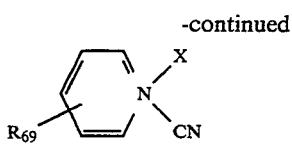

wherein $R_{65}$, $R_{66}$, $R_{67}$, $R_{68}$, $L_{41}$, $L_{42}$, $L_{43}$, and $n_{41}$ are as defined above; $Z_{41}$ represents a hydrogen atom, nitro group or halogen atom (e.g., chlorine, bromine); $R_{69}$ represents a hydrogen atom, alkyl group (e.g., methyl, ethyl) or phenyl group; and $X_{41}$ represents an anion (e.g., chloride, bromide, iodide, perchlorate, methyl sulfonate, ethyl sulfate, p-toluenesulfonate).

The compound represented by the general formula (A) can be easily synthesized by condensing 1,2-di-substituted hydrazine with a malonic acid derivative as described in "Chemical Abstract" vol. 50, 8743e (1956).

The dye represented by the general formula (III) will be further described hereinafter.

Examples of the electrophilic group represented by X or Y include cyano group, carboxyl group, alkylcarbonyl group [preferably an alkylcarbonyl group containing 7 or less carbon atoms such as acetyl and propionyl, which may contain substituents such as halogen atom (e.g., chlorine)], arylcarbonyl group [preferred examples of aryl group include phenyl and naphthyl; the arylcarbonyl group may contain substituents such as sulfo group, carboxyl group, hydroxyl group, halogen atom (e.g., chlorine, bromine), cyano group, alkyl group (e.g., methyl, ethyl), alkoxy group (e.g., methoxy, ethoxy), carbamoyl group (e.g., methylcarbamoyl), sulfamoyl group (e.g., ethylsulfamoyl), nitro group, alkylsulfonyl group (e.g., methanesulfonyl), arylsulfonyl group (e.g., benzenesulfonyl), amino group (e.g., dimethylamino), acylamino group (e.g., acetylamino, trichloroacetylamino) and sulfonamide group (e.g., methanesulfonamide)], alkoxycarbonyl group (alkoxycarbonyl group which may be substituted and preferably contains 7 or less carbon atoms, such as ethoxycarbonyl and methoxyethoxycarbonyl), aryloxycarbonyl group (preferred examples of the aryl group contained in the aryloxycarbonyl group include phenyl group and naphthyl group; the aryloxycarbonyl group may contain substituents as described with reference to the arylcarbonyl group), carbamoyl group (carbamoyl group which may be substituted and preferably contains 7 or less carbon atoms, such as methylcarbamoyl, phenylcarbamoyl and 3-sulfophenylcarbamoyl), alkylsulfonyl group (alkylsulfonyl group which may be substituted, such as methanesulfonyl), arylsulfonyl group (arylsulfonyl group which may be substituted, such as phenylsulfonyl), and sulfamoyl group (sulfamoyl group which may be substituted, such as methylsulfamoyl and 4-chlorophenylsulfamoyl).

X and Y may be connected to each other to form a ring such as pyrazolone ring, pyrazolotriazole ring, oxyindole ring, isooxazolone ring, barbituric acid ring, thiobarbituric acid ring, indanedione ring and pyridone ring. Preferred among these rings is pyrazolone ring.

In the general formula (III), $R_{41}$ and $R_{42}$ each represents a hydrogen atom, halogen atom (e.g., chlorine, bromine), alkyl group (alkyl group which may be substituted and preferably contains 5 or less carbon atoms, such as methyl and ethyl), alkoxy group (alkoxy group which may be substituted and preferably contains 5 or less carbon atoms, such as methoxy, ethoxy and 2-chloroethoxy), hydroxyl group, carboxyl group, substituted amino group (e.g., acetylamino, methylamino, diethylamino, methanesulfonylamino), carbamoyl group (carbamoyl group which may be substituted, such as methylcarbamoyl), sulfamoyl group (sulfamoyl group which may be substituted, such as ethylsulfamoyl), alkoxycarbonyl group (e.g., methoxycarbonyl) or sulfo group.

$R_{43}$ and $R_{44}$ each represents a hydrogen atom, alkyl group (alkyl group which may be substituted and preferably contains 8 or less carbon atoms, such as methyl, ethyl, propyl and butyl; examples of the substituents to be contained in the substituted alkyl group include sulfo group, carboxyl group, halogen atom, hydroxyl group, cyano group, alkoxy group, alkylcarbonyl group, arylcarbonyl group, acyloxy group, acylamino group, carbamoyl group, sulfamoyl group, alkylamino group, dialkylamino group, alkoxycarbonyl group, aryloxycarbonyl group, alkylsulfonyl group, arylsulfonyl group, sulfonylamino group, ureide group, and aryl group), alkenyl group (alkenyl group which may be substituted, such as 3-hexenyl), aryl group (preferably phenyl group; the aryl group may contain substituents as described with reference to the arylcarbonyl group), acyl group (e.g., acetyl, benzoyl), and sulfonyl group (e.g., methanesulfonyl, phenylsulfonyl).

$R_{43}$ and $R_{44}$ may together form a 5- or 6-membered heterocyclic ring (e.g., piperidine ring, morpholine ring).

$R_{41}$ and $R_{43}$ or $R_{42}$ and $R_{44}$ may be connected to each other to form a 5- or 6-membered heterocyclic ring.

At least one of X, Y, $R_{41}$, $R_{42}$, $R_{43}$ and $R_{44}$ contains sulfo or carboxyl groups. The sulfo and carboxyl groups may take the form of free radical or salt (e.g., sodium salt, potassium salt, $(C_2H_5)_3NH$ salt, pyridinium salt, ammonium salt).

The methine group represented by $L_{11}$, $L_{12}$ and $L_{13}$ may contain substituents (e.g., methyl, ethyl, cyano, phenyl, chlorine, sulfoethyl).

The suffix k represents an integer 0 or 1.

Specific examples of the dye represented by the general formula (III) will be given below.

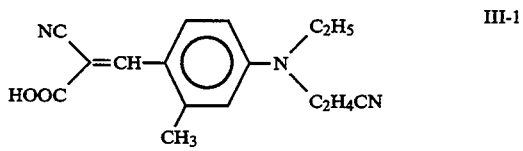

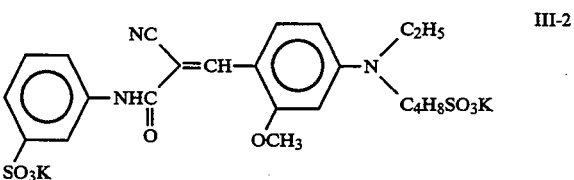

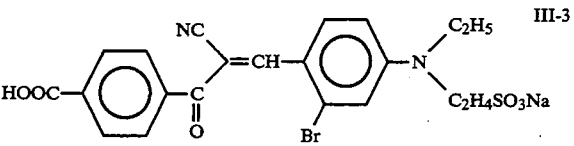

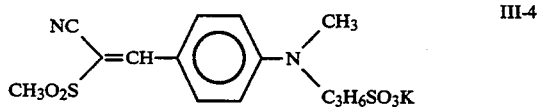

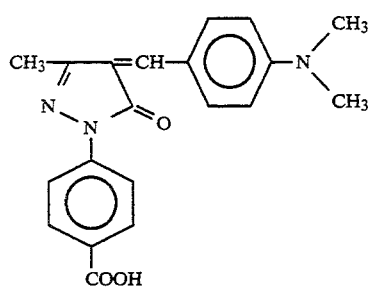
III-5

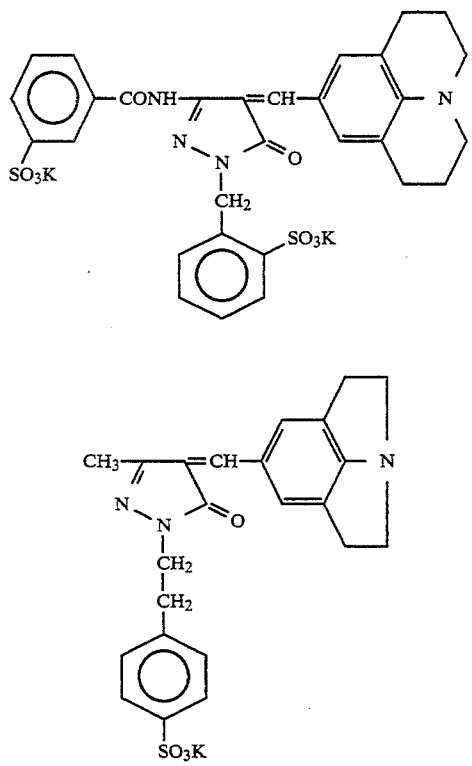
III-6

III-7

III-8

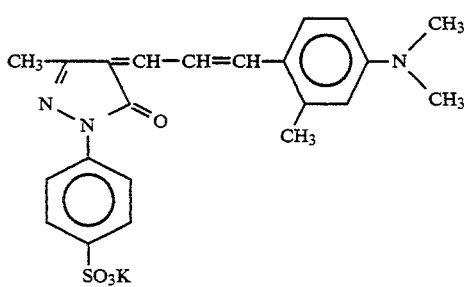
III-9

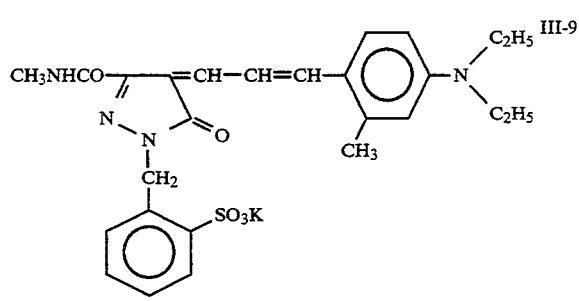

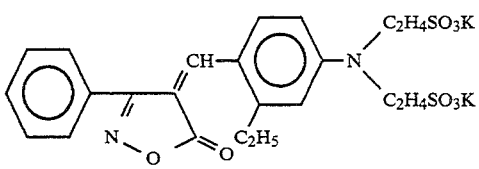
III-10

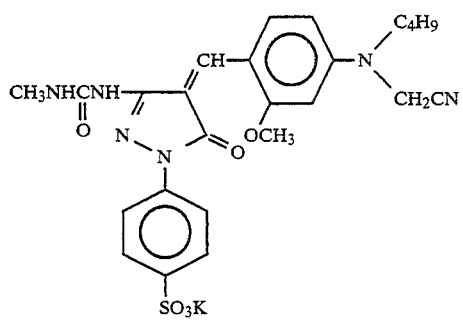
III-11

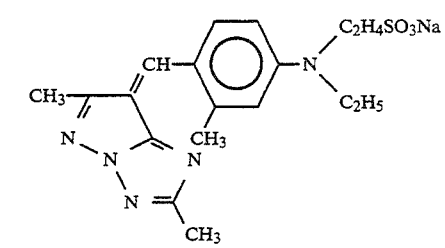
III-12

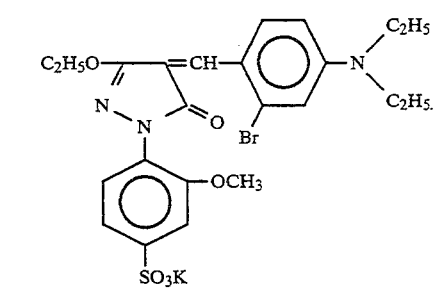
III-13

The represented by the general formula (III) can be easily synthesized by the method as disclosed in JP-A-51-3623.

The dye represented by the general formula (IV) will be further described hereinafter.

The aryl group represented by $Ar_1$ or $Ar_2$ is preferably a phenyl or naphthyl group which may contain substituents such as sulfonic group, carboxylic group, hydroxyl group, $C_{1-6}$ alkyl group (e.g., methyl, ethyl, n-propyl, isopropyl), $C_{1-6}$ alkoxy group (e.g., methoxy, ethoxy, butoxy), carbamoyl group, sulfamoyl group, halogen atom (e.g., F, Cl, Br), cyano group and nitro group.

The heterocyclic group represented by $Ar_1$ or $Ar_2$ is preferably a 5- or 6-membered nitrogen-containing heterocyclic group. Examples of such a heterocyclic group include 1-(4-sulfophenyl)-3-carboxy-5-hydroxy-4-pyrazolyl, 1-(4-sulfophenyl)-3-methyl-5-hydroxY-4-pyrazolyl, 1-(2,5-disulfophenyl)-3-carboxy-5-hydroxy-5-hydroxy-4-pyrazolyl, 1-carboxymethyl-3-carbamoyl-1,2-di-hydro-6-hydroxy-4-methyl-2-oxopyridine, and 1-(2-sulfoethyl)-3-cyano-1,2-dihydro-6-hydroxy-4-methyl-2-oxopyridine.

Specific examples of the dye represented by the general formula (IV) will be given below.

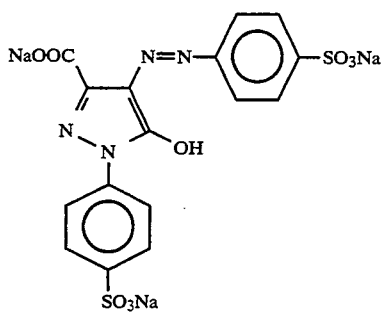
IV-1
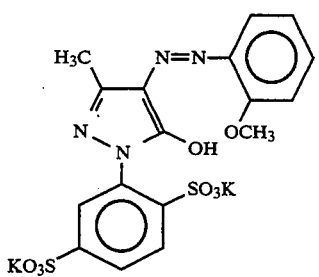
IV-2
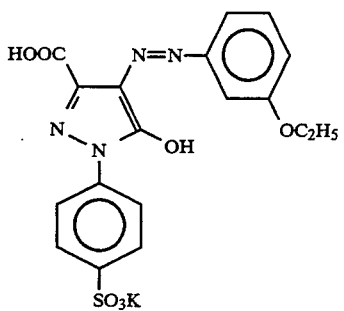
IV-3
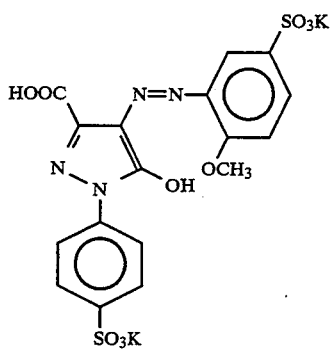
IV-4
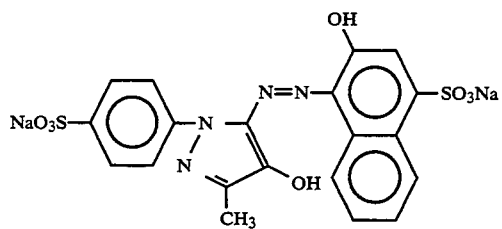
IV-5

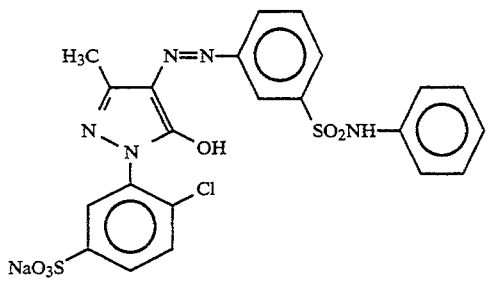
IV-6
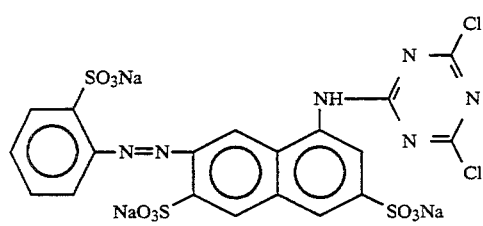
IV-7
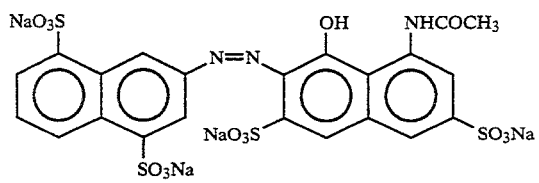
IV-8
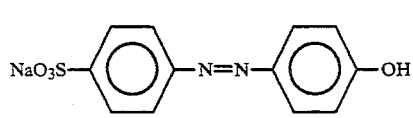
IV-9
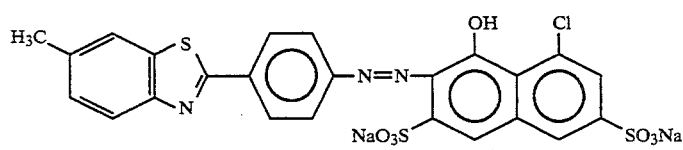
IV-10
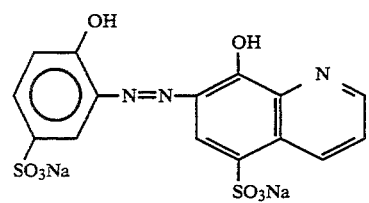
IV-11
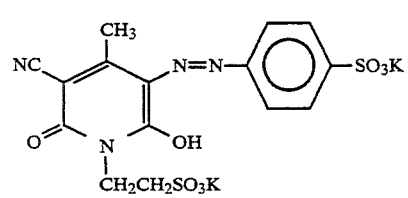
IV-12

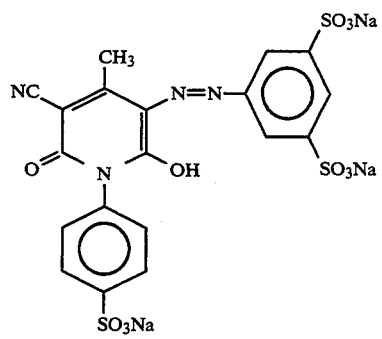

IV-13

The dye represented by the general formula (IV) can be easily synthesized by the method as disclosed in British Patents 575,691, 907,125, and 1,353,525.

Specific examples of the dye represented by the general formula (V) will be given below.

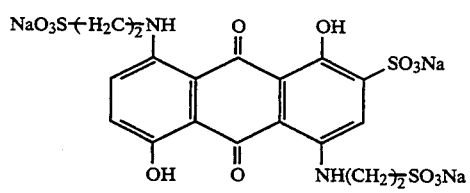

V-1

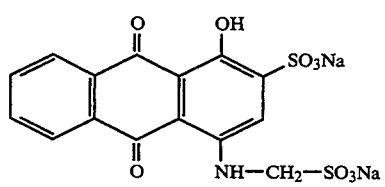

V-2

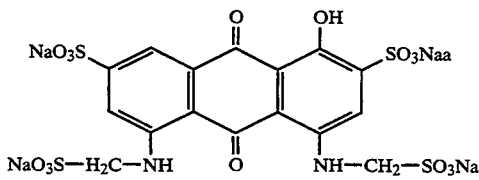

V-3

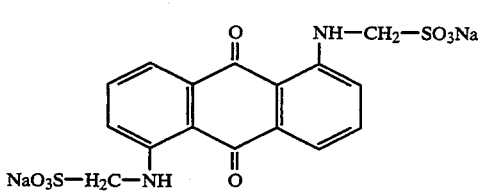

V-4

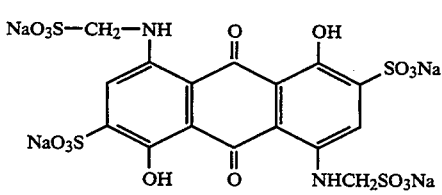

V-5

The dye represented by the general formula (V) can be synthesized by the method as disclosed in U.S. Pat. No. 2,865,752.

Specific examples of the dye represented by the general formula (VI) will be given below.

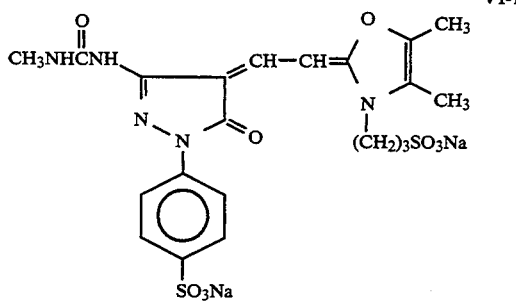

VI-1

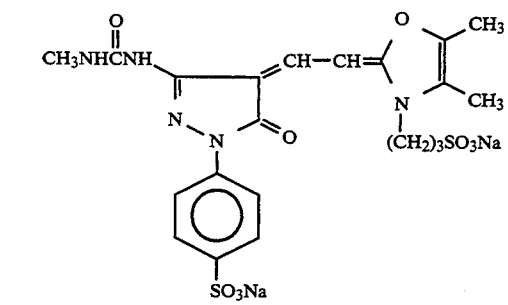

VI-2

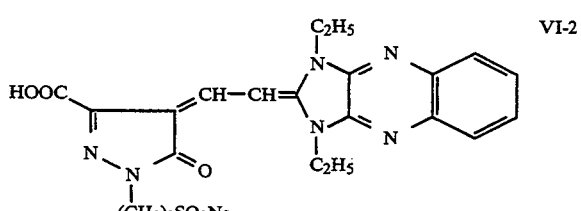

VI-3

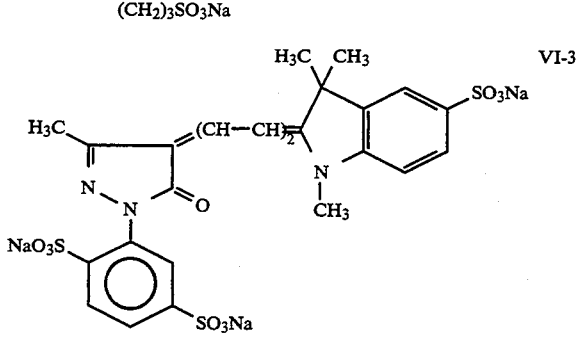

VI-4

-continued
VI-5 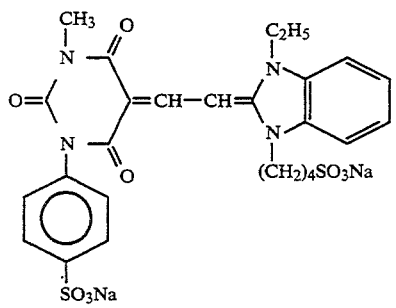
VI-6 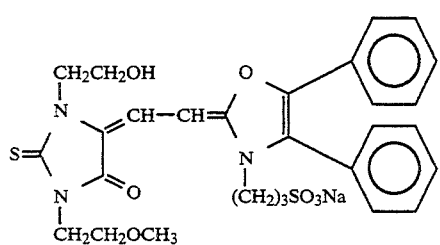
VI-7 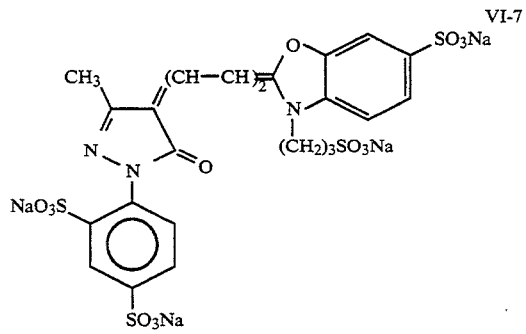
VI-8 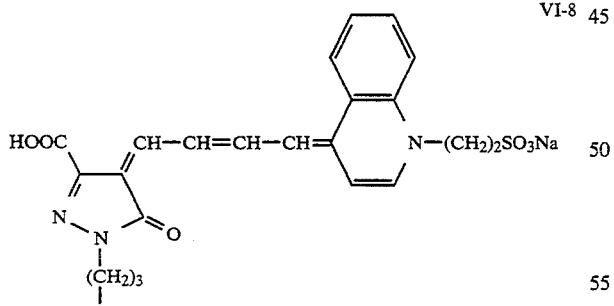
VI-9 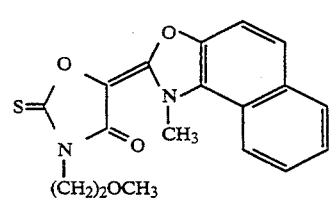
-continued
VI-10 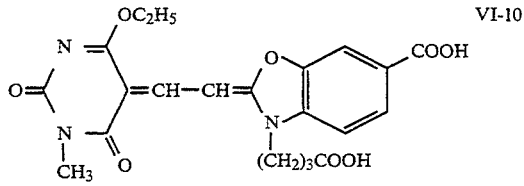
VI-11 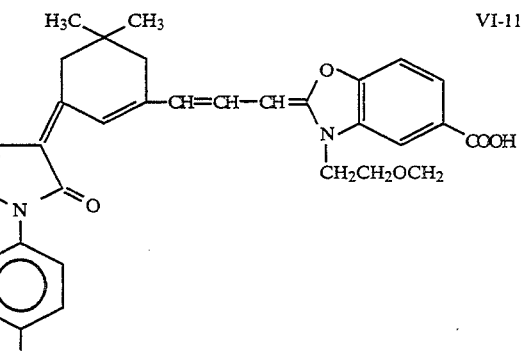
VI-12 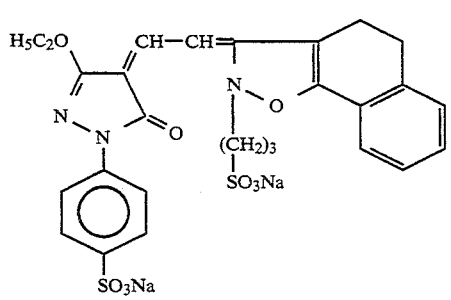
VI-13 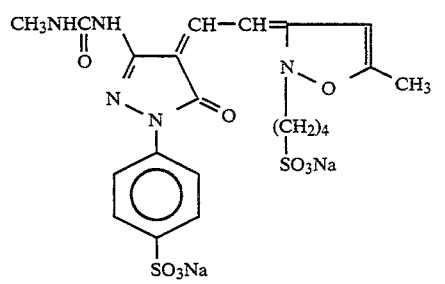
VI-14 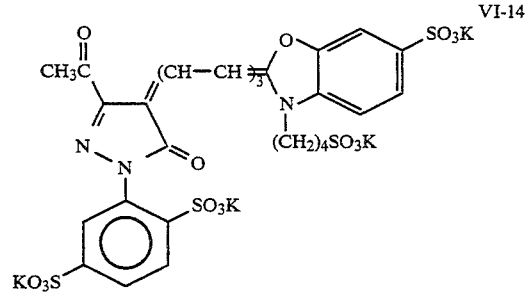
Specific examples of the dye represented by the general formula (VII) will be given below.

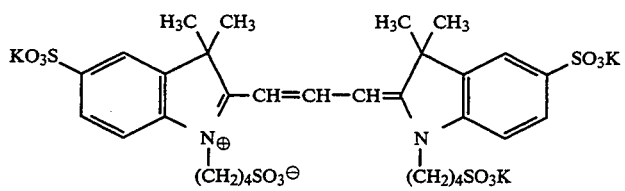
VII-1

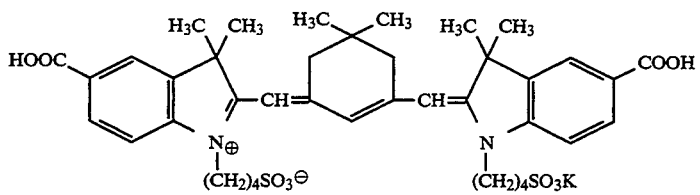
VII-2

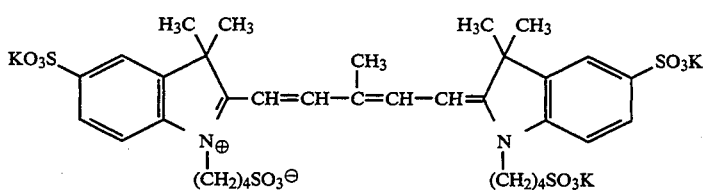
VII-3

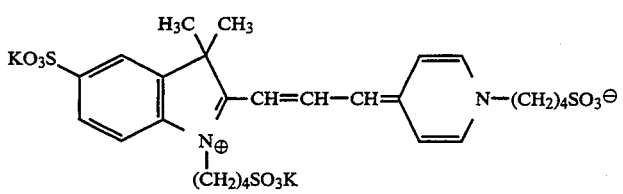
VII-4

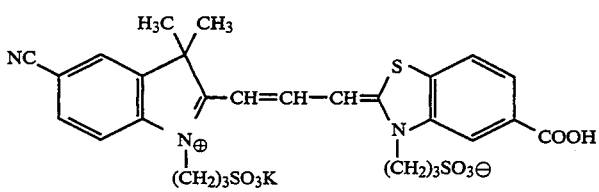
VII-5

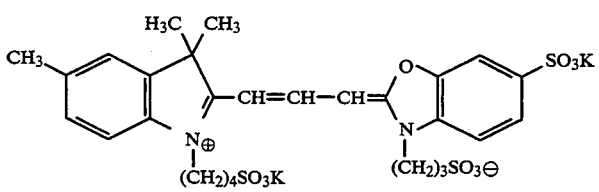
VII-6

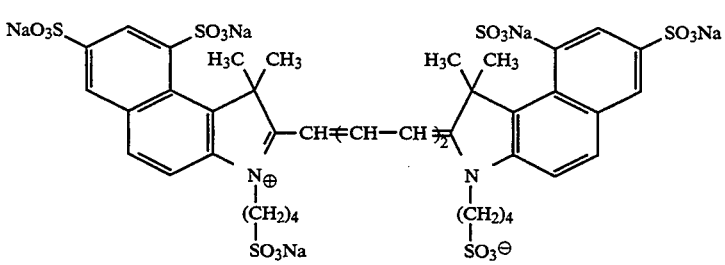
VII-7

The photographic emulsion to be used may be subjected to spectral sensitizaton with a methine dye or other dyes together with the methine compound of the present invention. Examples of a spectral sensitizing dye to be used in the present invention include cyanine dye, merocyanine dye, complex cyanine dye, complex merocyanine dye, holopolar cyanine dye, hemicyanine dye, styryl dye, and hemioxonol dye. Particularly useful among these dyes are cyanine dye, merocyanine dye, and complex merocyanine dye. Any of nuclei which are commonly used as basic heterocyclic nuclei for cyanine dyes can be applied to these dyes. Examples of suitable nuclei which can be applied to these dyes include pyrroline nucleus, oxazoline nucleus, thiazoline nucleus, pyrrole nucleus, oxazole nucleus, thiazole nucleus, selenzazole nucleus, imidazole nucleus, tetrazole nucleus, pyridine nucleus, and nuclei obtained by fusion of alicyclic hydrocarbon rings to these nucleus or nuclei obtained by fusion of aromatic hydrocarbon rings to these groups, e.g., indolenine nucleus, benzindolenine nucleus, indole nucleus, benzoxazole nucleus, naphthooxazole nucleus, benzothiazole nucleus, naphthothiazole nucleus, benzoselenazole nucleus, benzimidazole nucleus and quinoline nucleus. These nuclei may contain substituents on carbon atoms. Examples of suitable nuclei which can be applied to merocyanine dye or complex merocyanine dye include those having a ketomethylene structure such as 5- or 6-membered heterocyclic nucleus, e.g., pyrazoline-5-one nucleus, thiohydantoin nucleus, 2-thiooxazoline-2,4-di-one nucleus, rhodanine nucleus, and thiobarbituric acid nucleus.

Methine dyes of the present invention can be used singly or in combination. In particular, a combination of sensitizing dyes is often used for the purpose of supersensitization. Typical examples of such a combination are described in U.S. Pat. Nos. 2,688,545, 2,977,229, 3,397,060, 3,522,052, 3,527,641, 3,617,293, 3,628,964, 3,666,480, 3,672,898, 3,679,428, 3,037,377, 3,769,301, 3,814,609, 3,837,862, and 4,026,707, British Patents 1,344,281, and 1,507,803, JP-B-43-49336, and JP-B-53-12375, and JP-A-52-110618, and JP-A-52-109925.

In combination with the methine dye of the present invention, a dye which doesn't exhibit a spectral sensitizing effect itself or a substance which doesn't substantially absorb visible light but exhibits a supersensitizing effect can be incorporated in the emulsion.

The methine compound of the present invention may be added to the emulsion at any stage in the preparation of the emulsion which has heretofore been known useful. In general, it may be added between the completion of chemical sensitization and the coating. As described in U.S. Pat. Nos. 3,628,969, and 4,225,666, it may be added at the same time with the chemical sensitizer to effect spectral sensitization and chemical sensitization at the same time. Alternatively, as described in JP-A-58-113928, it may be added before the chemical sensitization or it may be added before the completion of the precipitation of silver halide grains to initiate the spectral sensitization. Further, as taught in U.S. Pat. No. 4,225,666, the above mentioned compound may be added batchwise, that is, part of the compound may be added before the chemical sensitization and the rest of the compound may be added after the chemical sensitization. As taught in U.S. Pat. No. 4,183,756, it may be added at any stage during the formation of silver halide grains.

The methine compound of the present invention can be used in an amount of $4 \times 10^{-6}$ to $8 \times 10^{-3}$ mole per mole of silver halide. If the grain size of silver halide grains is in a preferred range of 0.2 to 1.2 $\mu$m, the amount of the methine compound to be used is preferably in the range of about $5 \times 10^{-5}$ to $2 \times 10^{-3}$ mole.

The dye to be used in the present invention can be dispersed in an emulsion layer or other hydrophilic colloidal layer (e.g., interlayer, protective layer, antihalation layer, filter layer) by various known methods.

1) A method which comprises directly dissolving or dispersing the dye of the present invention in the emulsion layer or hydrophilic colloidal layer or a method which comprises dissolving or dispersing the dye of the present invention in an aqueous solution, and then incorporating the solution or dispersion in the emulsion layer or hydrophilic colloidal layer. The dye of the present invention may be added to the emulsion in the form of solution in a proper solvent such as methyl alcohol, ethyl alcohol, propyl alcohol, methyl cellosolve, halogenated alcohol as described in JP-A-48-9715, and U.S. Pat. No. 3,756,830, acetone, water and pyridine or a mixture thereof.

2) A method which comprises incorporating a hydrophilic polymer having a charge of a sign opposite to the dye ion as a mordant in a specific layer together with the dye of the present invention so that it interacts with the dye molecule to localize the dye in the specific layer.

Examples of the polymer mordant include polymer containing secondary or tertiary amino group, polymer containing a nitrogen-containing heterocyclic portion, and polymer containing quaternary cation group. Such a polymer mordant has a molecular weight of 5,000 or more, preferably 10,000 or more.

Examples of such a polymer mordant include vinylpyridine polymer and vinylpyridinium cation polymer as disclosed in U.S. Pat. No. 2,548,564, vinylimidazolium cation polymer as disclosed in U.S. Pat. No. 4,124,386, polymer mordant crosslinkable with gelatin or the like as disclosed in U.S. Pat. No. 3,625,694, aqueous sol type mordants as disclosed in U.S. Pat. No. 3,958,995, and JP-A-54-115228, water-insoluble mordants as disclosed in U.S. Pat. No. 3,898,088, reactive mordants capable of covalently bonding to a dye as disclosed in U.S. Pat. No. 4,168,976, polymer derived from an ethylenically unsaturated compound containing a dialkylamino alkyl ester as disclosed in British Patent 685,475, products of the reaction of polyvinyl alkyl ketone and amino quanidine as disclosed in British Patent 850,281, and polymer derived from 2-methyl-1-vinylimidazole as disclosed in U.S. Pat. No. 3,445,231.

3) A method which comprises dissolving the dye of the present invention in the presence of a surface active agent.

As a useful surface active agent there can be used an oligomer or polymer.

This polymer is further described in JP-A-60-158437-(filed on Jan. 26, 1984 to Fuji Photo Film Co., Ltd.), pp. 19 to 27.

To the hydrophilic colloidal dispersion thus obtained may be added a hydrosol of a lipophilic polymer as described in JP-B-51-39835.

The dispersion of the dye of present invention can be formed by a method which comprises precipitating the compound of the present invention in the form of fine solid dispersion and/or a method which comprises forming such a dispersion by means of a known grinding machine such as ball milling (e.g., ball mill, vibrating ball mill, planetary ball mill), sand milling, colloid milling, jet milling and roller milling in the presence of a dispersant, optionally with a solvent such as water and alcohol. Alternatively, to a solution of the compound of the present invention in a proper solvent may be added a poor solvent for the compound of the present invention so that microcrystalline grains are deposited. In this case, a dispersing surface active agent may be used. Still alternatively, such a dispersion may be formed by properly controlling the pH value of the system to dissolve the compound of the present invention, and then altering the pH value of the system to form microcrystalline grains. The average grain diameter of microcrystalline grains of the compound of the present invention in the dispersion is in the range of 10 $\mu$m or less, preferably 2 $\mu$m or less, particularly 0.5 $\mu$m or less, optionally 0.1 $\mu$m or less.

The silver halide emulsion to be used in the present invention may have any grain diameter distribution. The silver halide emulsion preferably has a grain diameter distribution such that the weight of silver halide grains in the range of ±20% around the maximum grain diameter (average) r is in the range of 60% or more, more preferably 80% or more of the total weight of silver halide grains.

The silver halide grains may be in the form of finely divided grains with a diameter of 0.1 μm or less or large size grains with a diameter of up to 10 μm as calculated in terms of projected area.

The silver halide to be used in the present invention is silver bromoiodide, silver chloroiodide or silver bromochloroiodide containing 0.1 to 30 mole% of silver iodide, particularly preferably silver bromo-iodide or silver bromochloroiodide containing from about 2 mole% to about 25 mole% of silver iodide.

The silver halide grains to be used in the present invention may have a regular crystal form such as cube, octahedron and tetradecahedron, an irregular crystal form such as sphere and tablet, an crystal form having crystal defects such as twinning plane, or composite thereof.

The preparation of silver halide emulsion to be used in the present invention can be accomplished by any suitable method as disclosed in *Research Disclosure* Nos. 17643 (December 1978), pp. 22 to 23, "I. Emulsion preparation and types", 18716 (November 1979), page 648, and 307105 (November 1989), pp. 863 to 865, P. Glafkides, "Chimie et Physique Photographique", Paul Montel, 1967, G. F. Duffin, "Photographic Emulsion Chemistry", Focal Press, 1966, and V. L. Zelikman et al., "Making and Coating Photographic Emulsion", Focal Press, 1964.

The monodisperse emulsions as disclosed in U.S. Pat. Nos. 3,574,628, and 3,655,394, and British Patent 1,413,748 may be preferably used.

Further, emulsions in which silver halide grains with an aspect ratio (ratio of diameter as calculated in terms of circle/thickness of silver halide grains) of about 3 or more are present in a proportion of 50% or more by area of all silver halide grains can be used. Tabular grains can be easily prepared by the methods as disclosed in Gutoff, "Photographic Science and Engineering", vol. 14, pp. 248–257 (1970), U.S. Pat. Nos. 4,434,226, 4,414,310, 4,433,048, and 4,439,520, and British Patent 2,112,157.

A silver halide emulsion comprising regular grains having a desired size can be obtained by allowing nucleation and grain growth by a double jet process while the pAg value of the system is kept constant to keep a supersaturation degree such that no renucleation occurs.

Moreover, the methods as disclosed in JP-A-54-48521 can be used. Preferred among these methods is a method which comprises adding an aqueous solution of potassium iodide and gelatin and an aqueous solution of an ammoniacal aqueous solution of silver nitride to an aqueous solution of gelatin containing silver halide grains at a rate varying as a function of time. In this method, the time function of adding rate, pH, pAg, temperature, etc. can be properly selected to obtain a silver halide emulsion having a high monodispersibility. This method is further described in *Photographic Science and Engineering*, vol. 6, pp. 159 to 165 (1962), *Journal of Photographic Science*, vol. 12, pp. 242 to 251 (1964), U.S. Pat. No. 3,655,394, and British Patent 1,413,748.

The individual silver halide crystals may have either a homogeneous structure or a heterogeneous structure composed of a core and an outer shell differing in halogen composition, or may hay a layered structure. These emulsin grains are disclosed in British Patent 1,027,146, U.S. Pat. Nos. 3,505,068, and 4,444,877, and Japanese Patent Application No. 58-248649. Further, the grains may have fused thereto a silver halide having a different halogen composition or a compound other than silver halide, e.g., silver thiocyanate, lead oxide, etc. by an epitaxial junction.

The silver halide emulsion of the present invention preferably has a distribution or structure concerning the halogen composition inside its grains. A typical example of such grains is a core-shell type or double-structure type grain having a halogen composition differing from the core to the shell thereof as disclosed in JP-B-43-13162, JP-A-61-215540, JP-A-60-222845, and JP-A-61-75337.

In addition to the double-structure grain, a triple-structure grain or higher multi-layer structure grain as disclosed in JP-A-60-222844 or a grain having a structure comprising a thin layer with a different silver halide composition coated on the surface of a double-layer (core-shell) structure grain can be used.

Such a structure can be provided inside the grain not only by surrounding the core as mentioned above but also by connecting grains. Examples of such a structure are disclosed in JP-A-59-133540, JP-A-58-108526, and JP-A-59-16254, EP 199290A, and JP-B-58-24772. Such a structure can be formed by connecting grains having a composition differing from that of a host crystal to the edge, corners or faces of the host crystal. In this case, the host crystal may be homogeneous in halogen composition or may have a core-shell structure.

Such a connection structure can be, of course, formed by the combination of silver halide grains. Such a connection structure can also be formed by the combination of silver halide grain with a silver salt compound other than rock salt, such as silver thiocyanate and silver carbonate. A nonsilver salt compound such as PbO, if it enables a connection structure, may be used.

In silver bromoiodide grains having these structures, e.g., core-shell structure, the core may have a high silver bromoiodide content while the shell may have a low silver bromoiodide content, and vice versa. Similarly in silver bromoiodide grains having a connection structure, the host crystal may have a high silver iodide content while the crystal to be connected thereto may have a relatively low silver iodide content, and vice versa.

In the grains having these structures, the portions having different halogen compositions have a definite interface or an indefinite interface developed by mixed crystal formed by different halogen compositions, or a positively continuous structure gradation.

The silver halide emulsion to be used in the present invention may be subjected to grain rounding treatment as disclosed in EP-0096727B1 and EP-0064412B1, or surface modification as disclosed in JP-A-60-221320.

The silver halide emulsion to be used in the present invention is preferably of the surface latent image type. As disclosed in JP-A-59-133542, an internal latent image type emulsion can be used depending on the kind of the developer or the developing conditions. Further, a shallow internal latent image type grain comprising a thin shell as disclosed in JP-A-63-264740 can be preferably used.

In order to accelerate ripening, a silver halide solvent can be effectively used. For example, it has been known that ripening can be accelerated by allowing excess amount of halogen ions to be present in the reaction vessel. Therefore, it is obvious that ripening can be accelerated only by introducing a halide solution into the reaction vessel. Other ripening agents can be used. These ripening agents can be entirely blended in the dispersant in the reaction vessel before the addition of silver salts and halides. Alternatively, these ripening agents can be introduced into the reaction vessel at the same time with the addition of one or more halides, silver salts or deflocculating agents. In another modified embodiment, the ripening agent can be introduced into the reaction vessel separately of halides and silver salts at the step of addition thereof.

As ripening agents other than halogen ion there can be used ammonia, amine compound, and thiocyanate such as thiocyanate of alkali metal, particularly sodium and potassium thiocyanate, and ammonium thiocyanate.

The chemical sensitization can be effected with an active gelatin as described in T. H. James, "The Theory of the Photographic Process", 4th ed., Macmillan, 1977, pp. 67 to 76. Alternatively, the chemical sensitization can be effected with sulfur, selenium, tellurium, gold, platinum, palladium, iridium or a combination of a plurality of such sensitizers at a pAg value of 5 to 10 and a pH value of 5 to 8 and a temperature of 30° to 80° C. as described in Research Disclosure Nos. 12008, vol. 120, April 1974, and 13452, vol. 34, June 1975, U.S. Pat. Nos. 2,642,361, 3,297,446, 3,772,031, 3,857,711, 3,901,714, 4,266,018, and 3,904,415, and British Patent 1,315,755. An optimum chemical sensitization can be effected in the presence of a gold compound or a thiocyanate compound or in the presence of a sulfur-containing compound as described in U.S. Pat. Nos. 3,857,711, 4,266,018, and 4,054,457, or sulfur-containing compound such as hypo, thiourea compound and rhodanine compound. The chemical sensitization can be effected in the presence of a chemical sensitization aid. As such a chemical sensitization aid there can be used a compound which is known to inhibit fog during chemical sensitization while increasing sensitivity, such as azaindene and azapyrimidine. Examples of chemical sensitization aid improvers are described in U.S. Pat. Nos. 2,131,038, 3,411,914, and 3,554,757, JP-A-58-126526, and the above cited G. F. Duffin, "Photographic Emulsion Chemistry", pp. 138 to 143.

The photographic emulsion to be used in the present invention can comprise various compounds for the purpose of inhibiting fogging during the preparation, storage or photographic processing of the light-sensitive material or stabilizing the photographic properties. In particular, there can be used many compounds known as fog inhibitors or stabilizers. Examples of these fog inhibitors or stabilizers include azoles such as benzothiazolium salt, nitroimidazoles, nitrobenzimidazoles, chlorobenzimidazoles, bromobenzimidazoles, mercaptothiazoles, mercaptobenzothiazoles, mercaptobenzimidazoles, mercaptothiazoles, aminotriazoles, benzotriazoles, nitrobenzotriazoles, and mercaptotetrazoles (particularly 1-phenyl-5-mercaptotetrazole), mercaptopyrimidines, mercaptotriazines, thioketo compounds such as oxazolinethione, azaindenes such as triazaindenes, tetraazaindenes (particularly 4-hydroxy-substituted (1,3,3a,7)tetraazaindenes), and pentaazaindenes. For example, those described in U.S. Pat. Nos. 3,954,474, and 3,982,947, and JP-B-52-28660 can be used.

In the light-sensitive material of the present invention, the above mentioned various additives can be used. In addition to these additives, other various additives can be used depending on the purpose.

These additives are further described in Research Disclosure Nos. 17643 (December 1978) and 18716 (November 1979) as tabulated below.

| Kind of additive | RD17643 | RD18716 |
|---|---|---|
| 1. Chemical sensitizer |  | p. 648, right column (RC) |
| 2. Sensitivity increasing agent |  | do. |
| 3. Spectral sensitizer and supersensitizer | pp. 23 to 24 | p.648, RC- p. 649, RC |
| 4. Brightening agent | p. 24 |  |
| 5. Antifoggant and stabilizer | pp. 24 to 25 | p. 649, RC |
| 6. Light absorbent, filter dye, and ultraviolet absorbent | pp. 25 to 26 | p. 649, RC- p. 650, (LC) left column |
| 7. Stain inhibitor | p. 25, RC | p. 650, LC-RC |
| 8. Dye image stabilizer | p. 25 | p. 650, LC |
| 9. Hardening agent | p. 26 | p. 651, LC |
| 10. Binder | p. 26 | do. |
| 11. Plasticizer and lubricant | p. 27 | p. 650, RC |
| 12. Coating aid and surface active agent | pp. 26 to 27 | do. |
| 13. Antistatic agent | p. 27 | do. |

Various color couplers can be used in the present invention. Specific examples of the color couplers are described in the patents described in the above cited Research Disclosure No. 17643, VII-C to G.

Preferred yellow couplers include those described in U.S. Pat. Nos. 3,933,501, 4,022,620, 4,326,024, and 4,401,752, JP-B-58-10739, and British Patents 1,425,020, and 1,476,760.

Preferred magenta couplers include 5-pyrazolone compounds and pyrazoloazole compounds. Particularly preferred are those described in U.S. Pat. Nos. 4,310,619, 4,351,897, 3,061,432, 3,725,067, 4,500,630, and 4,540,654, Research Disclosure Nos. 24220 (June 1984) and 24230 (June 1984), European Patent 73,636, and JP-A-60-33552, and JP-A-60-43659.

Cyan couplers include phenol and naphthol couplers. Preferred are those described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011, 4,327,173, 3,446,622, 4,333,999, 4,451,559, and 4,427,767, West German Patent (OLS) No. 3,329,729, and European Patents 121,365A, and 161,626A.

Colored couplers for correction of unnecessary absorptions of the developed color preferably include those described in Research Disclosure No. 17643, VII-G, U.S. Pat. Nos. 4,163,670, 4,004,929, and 4,138,258, JP-B-57-39413, and British Patent 1,146,368.

Couplers which form a dye having moderate diffusibility preferably include those described in U.S. Pat. No. 4,366,237, British Patent 2,125,570, European Patent 96,570, and West German Patent (OLS) No. 3,234,533.

Typical examples of polymerized dye-forming couplers are described in U.S. Pat. Nos. 3,451,820, 4,080,211, and 4,367,282, and British Patent 2,102,137.

Couplers capable of releasing a photographically useful residue upon coupling can also be used in the present invention. Preferred examples of DIR couplers which release a developing inhibitor are described in the patents cited in RD 17643, VII-F, and JP-A-57-151944, JP-A-57-154234, and JP-A-60-184248, and U.S. Pat. No. 4,248,962.

Couplers capable of imagewise releasing a nucleating agent or a developing accelerator at the time of development preferably include those described in British Patents 2,097,140, and 2,131,188, and JP-A-59-157638, and JP-A-59-170840.

In addition to the foregoing couplers, the photographic material according to the present invention can further comprise competing couplers as described in U.S. Pat. No. 4,130,427, polyequivalent couplers as described in U.S. Pat. Nos. 4,283,472, 4,338,393, and 4,310,618, DIR redox compounds or DIR coupler-releasing couplers or redoxes as described in JP-A-60-185950 and JP-A-62-24252, couplers capable of releasing a dye which returns to its original color after release as described in European Patent 173,302A, couplers capable of releasing a bleach accelerators as described in RD Nos. 11449 and 24241, and JP-A-61-201247, and couplers capable of releasing a ligand as described in U.S. Pat. No. 4,553,477.

The incorporation of these couplers in the light-sensitive material can be accomplished by any suitable known dispersion method.

Examples of high boiling solvents to be used in the oil-in-water dispersion process are described in U.S. Pat. No. 2,322,027.

Specific examples of high boiling organic solvents having a boiling point of 175° C. or higher at normal pressure which can be used in the oil-in-water dispersion process include phthalic esters (e.g., dibutyl phthalate, dicyclohexyl phthalate, di-2-ethylhexyl phthalate, decyl phthalate, bis(2,4-di-t-amylhenyl)-phthalate, bis(2,4-di-t-amylphenyl)isophthalate, bis-(1,1-diethylpropyl)phthalate), phosphoric or phosphonic esters (e.g., triphenyl phosphate, tricresyl phosphate, 2-ethylhexyl diphenyl phosphate, tricyclohexyl, tri-2ethylhexyl phosphate, tridecyl phosphate, tributoxyethyl phosphate, trichloropropyl phosphate, di-2-ethylhexylphenyl phosphonate), benzoic esters (e.g., 2-ethylhexyl benzoate, dodecyl benzoate, 2-ethylhexyl-p-hydroxy benzoate), amides (e.g., N,N-diethyldodecanamide, N,N-diethyllaurylamide, N-tetradecylpyrrolidone), alcohols or phenols (e.g., isostearyl alcohol, 2,4-di-tamylphenol), aliphatic carboxylic esters (e.g., bis(2-ethylhexyl)sebacate, dioctyl azerate, glycerol tributyrate, isostearyl lactate, trioctyl citrate), aniline derivatives (N,N-dibutyl-2-butoxy-5-tert-octylaniline), and hydrocarbons (e.g., paraffin, dodecylbenzene, diisopropylnaphthalene). As an auxiliary solvent there can be used an organic solvent having a boiling point of about 30° C. or higher, preferably 50° C. to about 160° C. Typical examples of such an organic solvent include ethyl acetate, butyl acetate, ethyl propionate, methyl ethyl ketone, cyclohexanone, 2-ethoxyethyl acetate, and dimethylformamide.

The process and effects of latex dispersion method and specific examples of latexes to be used in dipping are described in U.S. Pat. No. 4,199,363, and West German Patent (OLS) Nos. 2,541,274, and 2,541,230.

The present invention is applicable to various types of color light-sensitive materials, particularly preferably to color negative films for common use or motion picture, color reversal films for slide or television, color papers, color positive films and color reversal papers. The present invention can also be used for black-and-white photographic materials, X-ray photographic sensitive materials and printing light-sensitive materials to provide excellent results.

If the present invention is used for color light-sensitive material for picture taking, it can be applied to a light-sensitive material obtained by the combination of light-sensitive materials in various structures, layer structures and special coloring materials.

Typical examples of such a combination include a combination of coupling rate of color couplers, diffusibility and layer structures as disclosed in JP-B-47-49031, JP-B-49-3843, and JP-B-50-21248, and JP-A-59-58147, JP-A-59-60437, JP-A-60-227256, JP-A-61-4043, JP-A-61-43743, and JP-A-61-42657, a structure comprising two or more layers having the same color sensitivity as described in JP-B-49-15495, and U.S. Pat. No. 3,843,469, and a structure in which the location of high sensitivity layers, low sensitivity layers and layers having different color sensitivities is specified as described in JP-B-53-37017, and JP-B-53-37018, and JP-A-51-49027, JP-A-52-143016, JP-A-53-97424, JP-A-53-97831, JP-A-62-200350, and JP-A-59-177551.

Suitable supports which can be used in the present invention are described in the above cited RD Nos. 17643 (page 28) and 18716 (right column on page 647 to left column on page 648).

The color photographic light-sensitive material according to the present invention can be developed by ordinary methods as described in the above cited RD Nos. 17643 (pp. 28 to 29) and 18716 (left column to right column on page 651).

Color developers to be used for development processing of light-sensitive materials according to the present invention preferably include alkaline aqueous solutions containing as a main component an aromatic primary amine developing agent. Usable color developing agents include aminophenol compounds, and preferably p-phenylenediamine compounds. Typical examples of the latter are 3-methyl-4-amino—N,N-diethylaniline, 3-methyl-4-amino—N-ethyl-$\beta$-hydroxyethylaniline, 3-methyl-4-amino—N-ethyl-N-$\beta$-methanesulfonamidoethylaniline, 3-methyl-4-amino—N-ethyl—N-$\beta$-methoxyethylaniline, and sulfates, hydrochlorides or p-tolunesulfonates thereof. These compounds may be used in combination of two or more thereof according to the purpose.

The color developer generally contains pH buffers such as carbonates, borates or phosphates of alkali metals, and developing inhibitors or antifoggants, such as bromides, iodides, benzimidazoles, benzothiazoles, and mercapto compounds. If desired, the color developer may further contain various preservatives, e.g., hydroxylamines, diethylhydroxylamine, hydrazine sulfites, phenylsemicarbazides, triethanolamine, catecholsulfonic acids, and triethylenediamine (1,4-diazabicyclo[2,2,2]octane); organic solvents, e.g., ethylene glycol and diethylene glycol; development accelerators, e.g., benzyl alcohol, polyethylene glycol, quaternary ammonium salts, and amines; color-forming couplers; competing couplers; fogging agents, e.g., sodium boron hydride; auxiliary developing agents, e.g., 1-phenyl-3-pyrazolidone; viscosity-imparting agents; various chelating agents exemplified by aminopolycarboxylic acids, aminopolyphosphonic acids, alkylphosphonic acids, and phosphonocarboxylic acids, e.g., ethylenediaminetetraacetic acid, nitrilotriacetic acid, ethylenetriaminepentaacetic acid, cyclohexanediaminete-traacetic acid, hydroxyethyliminodiacetic acid, 1-hydroxyethylidene-1,1-diphosphonic acid, nitrilo-N,N,N-trimethylenephosphonic acid, ethylenediamine—N,N,N',N'-tetramethylenephosphonic acid, ethylenediaminedi(o-hydroxyphenylacetic acid), and salts thereof.

Reversal processing is usually carried out by black-and-white development followed by color development. Black-and-white developers to be used can contain one or more of known black-and-white developing agents, such as dihydroxybenzenes, e.g., hydroquinone, 3-pyrazolidones, e.g., 1-phenyl-3-pyrazolidone, and aminophenols, e.g., N-methyl-p-aminophenol.

The color developer or black-and-white developer usually has a pH of from 9 to 12. The replenishment rate of the developer is usually 3 l or less per $m^2$ of the light-sensitive material, though depending on the type of the color photographic material to be processed. The replenishment rate may be reduced to 500 $ml/m^2$ or less by decreasing the bromide ion concentration in the replenisher. When the replenishment rate is reduced, it is preferable to reduce the area of the liquid surface in contact with air in the processing tank to thereby prevent evaporation and air-oxidation of the liquid. The replenishment rate can also be reduced by a means for suppressing accumulation of the bromide ion in the developer.

The color development time is usually selected between 2 minutes and 5 minutes. By carrying out the color development at a high temperature and a high pH with a high concentration of a color developing agent, the development time can be further reduced.

The photographic emulsion layer which has been color-developed is usually subjected to bleach. Bleach may be effected simultaneously with fixation (i.e., blix), or these two steps may be carried out separately. For speeding up of processing, bleach may be followed by blix. Furthermore, any of an embodiment wherein two blix baths is preceded by fixation, and an embodiment wherein blix is followed by bleach may be selected arbitrarily according to the purpose. Bleaching agents to be used include compounds of polyvalent metals, e.g., iron (III), cobalt (III), chromium (VI), and copper (II), peracids, quinones, nitroso compounds, and the like. Typical examples of these bleaching agents are ferricyanides; bichromates; organic complex salts of iron (III) or cobalt (III), such as complex salts with aminopolycarboxylic acids, e.g., ethylenediaminetetraacetic acid, diethylenetriaminepentaacetic acid, cyclohexanediaminetetraacetic acid, methyliminodiacetic acid, 1,3-diaminopropanetetraacetic acid, and glycol ether diaminetetraacetic acid, or citric acid, tartaric acid, malic acid, etc.; persulfates; hydrobromic acid salts; permanganates; nitrobenzenes; and so on. Of these, aminopolycarboxylic acid-iron (III) complex salts such as (ethylenediaminetetraacetato)iron (III) complex salts and persulfates are preferred in view of speeding up of processing and conservation of the environment. In particular, (ethylenediaminetetraacetato)iron (III) complex salts are useful in both of a bleaching solution and a blix solution. The bleaching or blix solution usually has a pH of from 5.5 to 8. For speeding up of processing, it is possible to adopt a lower pH value.

The bleaching bath, blix bath or a pre-bath thereof can contain, if desired, a bleaching accelerator. Examples of useful bleaching accelerators are compounds having a mercapto group or a disulfide group as described in U.S. Pat. No. 3,893,858, West German Patents 1,290,812, and 2,059,988, JP-A-53-32736, JP-A-53-57831, JP-A-53-37418, JP-A-53-72623, JP-A-53-95630, JP-A-53-95631, JP-A-53-104232, JP-A-53-124424, JP-A-53-141623, and JP-A-53-28426, and Research Disclosure No. 17129 (July 1978), thiazolidine derivatives as described in JP-A-50-140129, thiourea derivatives as described in JP-B-45-8506, JP-A-52-20832, and JP-A-53-32735, and U.S. Pat. No. 3,706,561, iodides as described in West German Patent 1,127,715, and JP-A-58-16235, polyoxyethylene compounds as described in West German Patents 966,410, and 2,748,430, polyamine compounds as described in JP-B-45-8836, compounds as described in JP-A-49-42434, JP-A-49-59644, JP-A-53-94927, JP-A-54-35727, JP-A-55-26506, and JP-A-58-163940, and bromide ions. Preferred among them are compounds having a mercapto group or a disulfide group because of their great acceleratory effects. In particular, the compounds disclosed in U.S. Pat. No. 3,893,858, West German Patent 1,290,812, and JP-A-53-95630 are preferred. The compounds disclosed in U.S. Pat. No. 4,552,834 are also preferred. These bleaching accelerators may be incorporated into the light-sensitive material. These bleaching accelerators are particularly effective for blix of color light-sensitive materials for photographing.

Fixing agents to be used for fixation include thiosulfates, thiocyanates, thioethers, thioureas, and a large amount of iodides. The thiosulfates are usually employed, with ammonium thiosulfate being applicable most broadly. Sulfites, bisulfites or carbonyl bisulfite adducts are suitably used as preservatives of the blix bath.

It is usual that the thus desilvered silver halide color photographic materials of the present invention are subjected to washing and/or stabilization. The amount of water to be used in the washing can be selected from a broad range depending on the characteristics of the light-sensitive material (for example, the kind of couplers, etc.), the end use of the light-sensitive material, the temperature of washing water, the number of washing tanks (number of stages), the replenishment system (e.g., counter-flow system or forward-flow system), and other various factors. Of these factors, the relationship between the number of washing tanks and the amount of water in a multistage counter-flow system can be obtained according to the method described in *Journal of the Society of Motion Picture and Television Engineers*, vol. 64, pp. 248 to 253 (May 1955).

According to the multistage counter-flow system described in the above reference, although the requisite amount of water can be greatly reduced, bacteria would grow due to an increase of the retention time of water in the tank, and floating masses of bacteria stick to the light-sensitive material. In the present invention, in order to cope with this problem, the method of reducing calcium and magnesium ion concentrations described in JP-A-62-288838 can be used very effectively. Furthermore, it is also effective to use isothiazolone compounds or thiabenzazoles as described in JP-A-57-8542, chlorine type bactericides, e.g., chlorinated sodium isocyanurate, benzotriazole, and bactericides described in Hiroshi Horiguchi, *Bokinbobaizai no kagaku*, bobigijutsu, and Nippon Bokin Bobai Gakkai (ed.), *Bokin bobizai jiten*.

The washing water has a pH of from 4 to 9, preferably from 5 to 8. The temperature of the water and the washing time can be selected from broad ranges depending on the characteristics and end use of the light-sensitive material, but usually ranges from 15° to 45° C. in temperature and from 20 seconds to 10 minutes in time, preferably from 25° to 40° C. in temperature and from 30 seconds to 5 minutes in time. The light-sensitive material of the present invention may be directly processed with a stabilizer in place of th washing step. For the stabilization, any of the known techniques as described in JP-A-57-8543, JP-A-58-14834, and JP-A-60-220345 can be used.

The aforesaid washing step may be followed by stabilization in some cases. For example, a stabilizing bath containing formalin and a surface active agent as is used as a final bath for color light-sensitive materials for photographing is the case. This stabilizing bath may also contain various chelating agents or bactericides.

The overflow accompanying replenishment of the washing bath and/or stabilizing bath can be reused in other steps such as desilvering.

For the purpose of simplifying and speeding up the processing, the silver halide color photographic material of the present invention may comprise a color developing agent. Such a color developing agent is preferably used in the form of various precursors. Examples of such precursors include indoaniline compounds as described in U.S. Pat. No. 3,342,597, Schiff base type compounds as described in U.S. Pat. No. 3,342,599, and *Research Disclosure* Nos. 14850 and 15159, aldol compounds as described in *Research Disclosure* No. 13924, metal complexes as described in U.S. Pat. No. 3,719,492, and urethane compounds as described in JP-A-53-135628.

For the purpose of accelerating color development, the silver halide color light-sensitive material of the present invention may comprise various 1-phenyl-3-pyrazolidones. Typical examples of such compounds are described in JP-A-56-64339, JP-A-57-144547, and JP-A-58-115438.

The various processing solutions to be used in the present invention are used at a temperature of 10° to 50° C. The standard temperature range is from 33° C. to 38° C. However, a higher temperature range can be used to accelerate processing, thereby shortening the processing time. On the contrary, a lower temperature range can be used to improve the picture quality or the stability of the processing solutions. In order to save silver to be incorporated in the light-sensitive material, a processing utilizing cobalt intensification or hydrogen peroxide intensification described in West German Patent 2,226,770 or U.S. Pat. No. 3,674,499 can be effected.

The silver halide photographic material of the present invention can also be applied to heat-developable light-sensitive materials as described in U.S. Pat. No. 4,500,626, JP-A-60-133449, JP-A-59-218443, and JP-A-61-238056, and European Patent 210,660A2.

The present invention will be further described in the following examples, but the present invention should not be construed as being limited thereto.

EXAMPLE 1

Preparation of Specimen 101

Onto a 127-μm thick undercoated cellulose triacetate film support were coated the following various layer compositions to prepare a multi-layer color light-sensitive material as Specimen 101. The figure indicates the amount added in g per m². The actual effects of the compounds added are not limited to those described.

| 1st layer: antihalation layer | |
|---|---|
| Black colloidal silver | 0.20 g |
| Gelatin | 1.9 g |
| Ultraviolet absorbent U-1 | 0.1 g |
| Ultraviolet absorbent U-3 | 0.04 g |
| Ultraviolet absorbent U-4 | 0.1 g |
| High boiling organic solvent Oil-1 | 0.1 g |
| Solid dispersion of microcrystal of Dye E-1 | 0.1 g |
| 2nd layer: interlayer | |
| Gelatin | 0.40 g |
| Compound Cpd-C | 5 mg |
| Compound Cpd-J | 5 mg |
| Compound Cpd-K | 3 mg |
| High boiling organic solvent Oil-3 | 0.1 g |
| Dye D-4 | 0.4 mg |
| 3rd layer: interlayer | |
| Superficially and internally fogged fine emulsion of silver bromoiodide (average grain diameter: 0.06 μm; fluctuation coefficient: 18%; AgI content: 1 mole %) | 0.05 g as calculated in terms of silver |
| Gelatin | 0.4 g |
| 4th layer: low sensitivity red-sensitive emulsion layer | |
| Emulsion A | 0.1 g as calculated in terms of silver |
| Emulsion B | 0.4 g as calculated in terms of silver |
| Gelatin | 0.8 g |
| Coupler C-1 | 0.15 g |
| Coupler C-2 | 0.05 g |
| Coupler C-3 | 0.05 g |
| Coupler C-9 | 0.05 g |
| Compound Cpd-C | 10 mg |
| High boiling organic solvent Oil-2 | 0.1 g |
| Additive P-1 | 0.1 g |
| 5th layer: middle sensitivity red-sensitive emulsion layer | |
| Emulsion B | 0.2 g as calculated in terms of silver |
| Emulsion C | 0.3 g as calculated in terms of silver |
| Gelatin | 0.8 g |
| Coupler C-1 | 0.2 g |
| Coupler C-2 | 0.05 g |
| Coupler C-3 | 0.2 g |
| High boiling organic solvent Oil-2 | 0.1 g |
| Additive P-1 | 0.1 g |
| 6th layer: high sensitivity red-sensitive emulsion layer | |
| Emulsion D | 0.4 g as calculated in terms of silver |
| Gelatin | 1.1 g |
| Coupler C-1 | 0.3 g |
| Coupler C-2 | 0.1 g |
| Coupler C-3 | 0.7 g |
| Additive P-1 | 0.1 g |
| 7th layer: interlayer | |
| Gelatin | 0.6 g |
| Additive M-1 | 0.3 g |
| Color stain inhibitor Cpd-1 | 2.6 mg |
| Ultraviolet absrobent U-1 | 0.01 g |
| Ultraviolet absrobent U-2 | 0.002 g |
| Ultraviolet absrobent U-5 | 0.01 g |
| Dye D-1 | 0.02 g |
| Compound Cpd-C | 5 mg |
| Compound Cpd-J | 5 g |
| Compound Cpd-K | 5 g |
| High boiling organic solvent Oil-1 | 0.02 g |
| 8th layer: interlayer | |
| Superficially and internally fogged fine emulsion of silver bromoiodide (average grain diameter: 0.06 μm; fluctuation coefficient: 16%; AgI | 0.02 g as calculated in terms of silver |

| | |
|---|---|
| content: 0.3 mole %) | |
| Gelatin | 1.0 g |
| Additive P-1 | 0.2 g |
| Color stain inhibitor Cpd-A | 0.1 g |
| 9th layer: low sensitivity green-sensitive emulsion layer | |
| Emulsion E | 0.1 g as calculated in terms of silver |
| Emulsion F | 0.2 g as calculated in terms of silver |
| Emulsion G | 0.2 g as calculated in terms of silver |
| Gelatin | 0.5 g |
| Coupler C-4 | 0.1 g |
| Coupler C-7 | 0.05 g |
| Coupler C-8 | 0.20 g |
| Compound Cpd-B | 0.03 g |
| Compound Cpd-C | 10 mg |
| Compound Cpd-D | 0.02 g |
| Compound Cpd-E | 0.02 g |
| Compound Cpd-F | 0.02 g |
| Compound Cpd-G | 0.02 g |
| High boiling organic solvent Oil-1 | 0.1 g |
| High boiling organic solvent Oil-2 | 0.1 g |
| 10th layer: middle sensitivity green-sensitive emulsion layer | |
| Emulsion G | 0.3 g as calculated in terms of silver |
| Emulsion H | 0.1 g as calculated in terms of silver |
| Gelatin | 0.6 g |
| Coupler C-4 | 0.1 g |
| Coupler C-7 | 0.2 g |
| Coupler C-8 | 0.1 g |
| Compound Cpd-B | 0.03 g |
| Compound Cpd-D | 0.02 g |
| Compound Cpd-E | 0.02 g |
| Compound Cpd-F | 0.05 g |
| Compound Cpd-G | 0.05 g |
| High boiling organic solvent Oil-2 | 0.1 g |
| 11th layer: high sensitivity green-sensitive emulsion layer | |
| Emulsion I | 0.5 g as calculated in terms of silver |
| Gelatin | 1.0 g |
| Coupler C-4 | 0.3 g |
| Coupler C-7 | 0.1 g |
| Coupler C-8 | 0.1 g |
| Compound Cpd-B | 0.08 g |
| Compound Cpd-C | 5 mg |
| Compound Cpd-D | 0.02 g |
| Compound Cpd-E | 0.02 g |
| Compound Cpd-F | 0.02 g |
| Compound Cpd-G | 0.02 g |
| Compound Cpd-J | 5 mg |
| Compound Cpd-K | 5 mg |
| High boiling organic solvent Oil-1 | 0.02 g |
| High boiling organic solvent Oil-2 | 0.02 g |
| 12th layer: interlayer | |
| Gelatin | 0.6 g |
| 13th layer: yellow filter layer | |
| Yellow colloidal silver | 0.07 g as calculated in terms of silver |
| Gelatin | 1.1 g |
| Color stain inhibitor Cpd-A | 0.01 g |
| High boiling organic solvent Oil-1 | 0.01 g |
| Solid dispersion of microcrystal of Dye E-2 | 0.05 g |
| 14th layer: interlayer | |
| Gelatin | 0.6 g |
| 15th layer: low sensitivity blue-sensitive emulsion layer | |
| Emulsion J | 0.2 g as calculated in terms of silver |
| Emulsion K | 0.3 g as calculated in terms of silver |
| Emulsion L | 0.1 g as calculated in terms of silver |
| Gelatin | 0.8 g |
| Coupler C-5 | 0.2 g |
| Coupler C-6 | 0.1 g |
| Coupler C-10 | 0.4 g |
| 16th layer: middle sensitivity blue-sensitive emulsion layer | |
| Emulsion L | 0.1 g as calculated in terms of silver |
| Emulsion M | 0.4 g as calculated in terms of silver |
| Gelatin | 0.9 g |
| Coupler C-5 | 0.3 g |
| Coupler C-6 | 0.1 g |
| Coupler C-10 | 0.1 g |
| 17th layer: high sensitivity blue-sensitive emulsion layer | |
| Emulsion N | 0.4 g as calculated in terms of silver |
| Gelatin | 1.2 g |
| Coupler C-5 | 0.3 g |
| Coupler C-6 | 0.6 g |
| Coupler C-10 | 0.1 g |
| 18th layer: 1st protective layer | |
| Gelatin | 0.7 g |
| Ultraviolet absrobent U-1 | 0.2 g |
| Ultraviolet absorbent U-2 | 0.05 g |
| Ultraviolet absorbent U-5 | 0.3 g |
| Formalin scavenger Cpd-H | 0.4 g |
| Dye D-1 | 0.1 g |
| Dye D-2 | 0.05 g |
| Dye D-3 | 0.1 g |
| 19th layer: 2nd protective layer | |
| Colloidal silver | 0.1 mg as calculated in terms of silver |
| Fine emulsion of silver bromoiodide (average grain diameter: 0.06 μm; AgI content: 1 mole %) | 0.1 g as calculated in terms of silver |
| Gelatin | 0.4 g |
| 20th layer: 3rd protective layer | |
| Gelatin | 0.4 g |
| Polymethyl methacrylate (average grain diameter: 1.5 μm) | 0.1 g |
| 4:6 Copolymer of methyl methacrylate and acrylic acid (average grain diameter: 1.5 μm) | 0.1 g |
| Silicone oil | 0.03 g |
| Surface active agent W-1 | 3.0 mg |
| Surface active agent W-2 | 0.03 g |

In addition to the above mentioned compositions, additives F-1 to F-8 were incorporated in all these emulsion layers. Besides the above mentioned compositions, a gelatin hardener H-1 and coating and emulsifying surface active agents W-3, W-4, W-5 and W-6 were incorporated in each of the various layers.

Further, phenol, 1,2-benzisothiazoline-3-one, 2phenoxyethanol, and phenethyl alcohol were incorporated in these layers as preservatives or mildewproofing agents.

Silver bromoiodide emulsions used in Specimen 101 were as follows:

TABLE 1

| Emulsion | Feature of grain | Average grain diameter (μm) in terms of sphere | Fluctuation coefficient (%) | AgI content (%) |
| --- | --- | --- | --- | --- |
| A | Monodisperse tetradecahedral grain | 0.28 | 16 | 3.7 |
| B | Monodisperse cubic internal latent image type grain | 0.30 | 10 | 3.3 |
| C | Monodisperse tabular grain; average aspect ratio: 4.0 | 0.38 | 18 | 5.0 |
| D | Tabular grain; average aspect ratio: 8.0 | 0.68 | 25 | 2.0 |
| E | Monodisperse cubic grain | 0.20 | 17 | 4.0 |
| F | Monodisperse cubic grain | 0.23 | 16 | 4.0 |
| G | Monodisperse cubic internal latent image type grain | 0.28 | 11 | 3.5 |
| H | Monodisperse cubic internal latent image type grain | 0.32 | 9 | 3.5 |
| I | Tabular grain; average aspect ratio: 9.0 | 0.80 | 28 | 1.5 |
| J | Monodisperse tetradecahedral grain | 0.30 | 18 | 4.0 |
| K | Monodisperse tabular grain; average aspect ratio: 7.0 | 0.45 | 17 | 4.0 |
| L | Monodisperse cubic internal latent image type grain | 0.46 | 14 | 3.5 |
| M | Monodisperse tabular grain; average aspect ratio: 10.0 | 0.55 | 13 | 4.0 |
| N | Tabular grain; average aspect ratio: 12.0 | 1.00 | 33 | 1.3 |

TABLE 2

| (spectral sensitization of Emulsions A–N) | | |
| --- | --- | --- |
| Emulsion | Added sensitizing dye | Amount (g) added per mole of silver halide |
| A | S-1 | 0.285 |
| B | S-1 | 0.27 |
| C | S-1 | 0.28 |
| D | S-1 | 0.27 |
| E | S-3 | 0.5 |
|   | S-4 | 0.1 |
| F | S-3 | 0.3 |
|   | S-4 | 0.1 |
| G | S-3 | 0.25 |
|   | S-4 | 0.08 |
|   | S-8 | 0.05 |
| H | S-3 | 0.2 |
|   | S-4 | 0.06 |
|   | S-8 | 0.05 |
| I | S-3 | 0.3 |
|   | S-4 | 0.07 |
|   | S-8 | 0.1 |
| J | S-6 | 0.2 |
|   | S-5 | 0.05 |
| K | S-6 | 0.2 |
|   | S-5 | 0.05 |
| L | S-6 | 0.22 |
|   | S-5 | 0.06 |
| M | S-6 | 0.15 |
|   | S-5 | 0.04 |
| N | S-6 | 0.22 |
|   | S-5 | 0.06 |

C-1

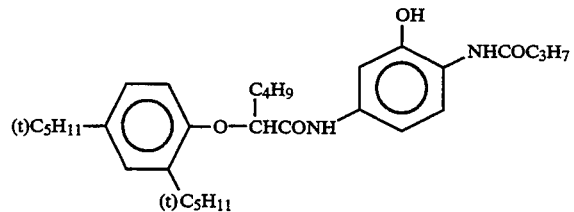

C-2

TABLE 2-continued
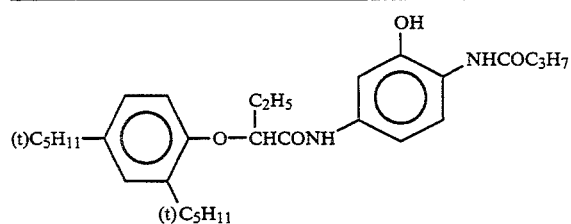
C-3
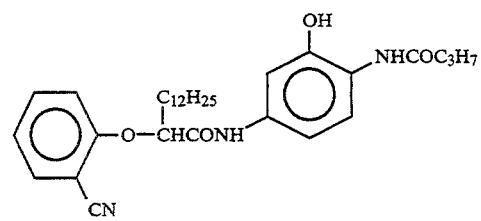
C-4
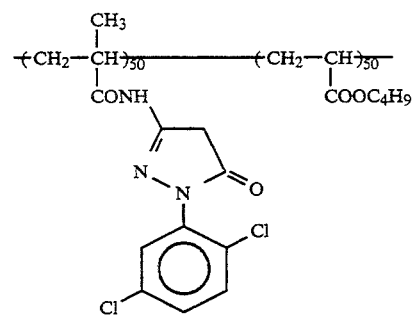
Figure indicates wt %
Average molecular weight: approx. 25,000
C-5
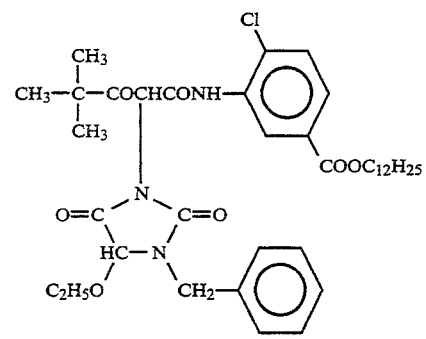
C-6
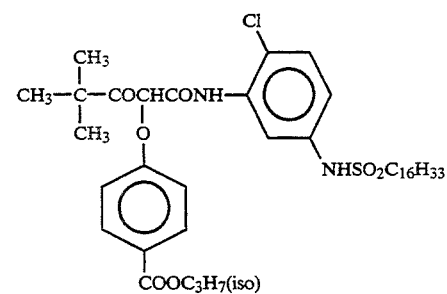
C-7

TABLE 2-continued
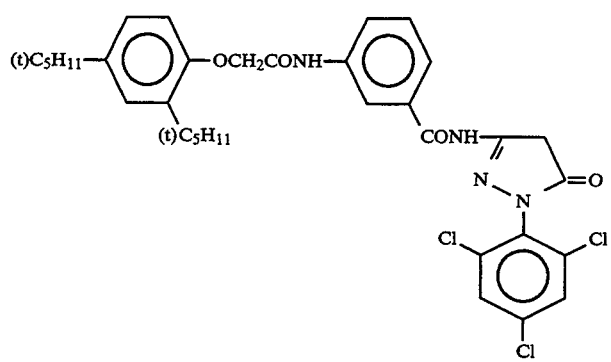
C-8
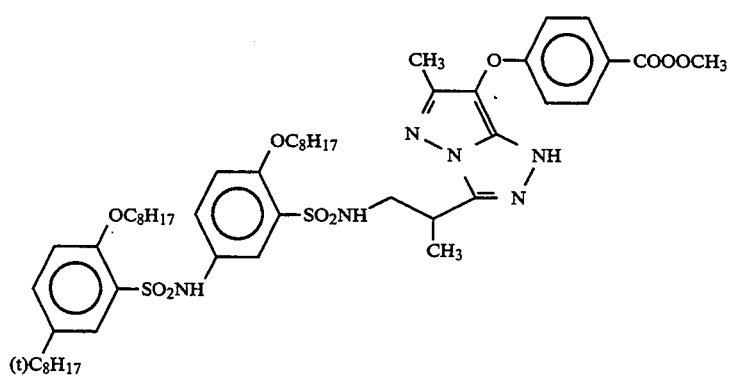
C-9
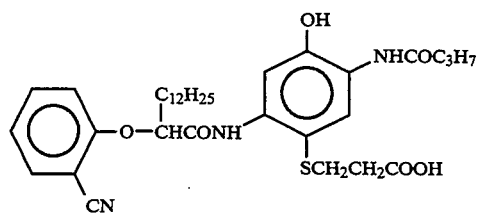
C-10
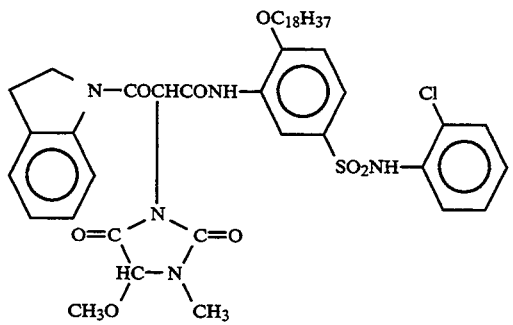
Oil-1: Dibutyl phthalate
Oil-2: Tricresyl phosphate
Oil-3
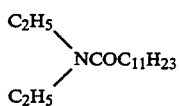
Cpd-A TABLE 2-continued
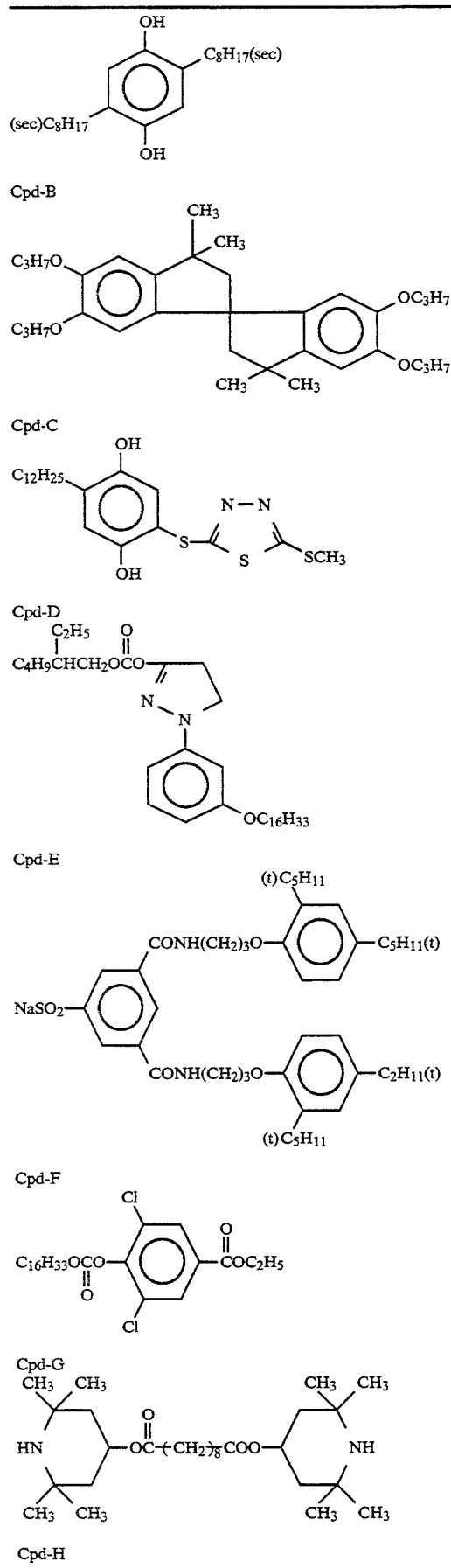

TABLE 2-continued
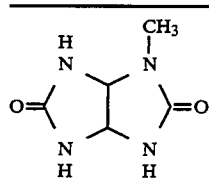
Cpd-I
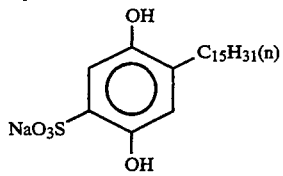
Cpd-J
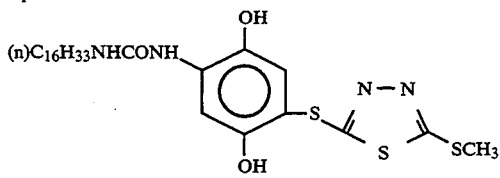
Cpd-K
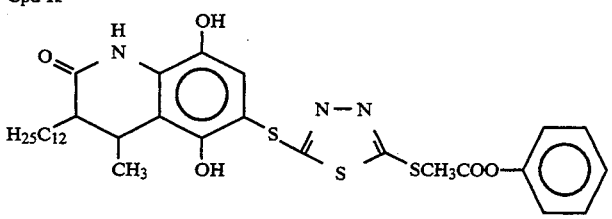
U-1
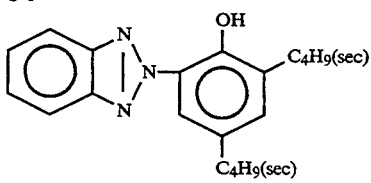
U-2
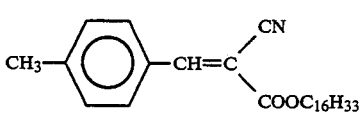
U-3
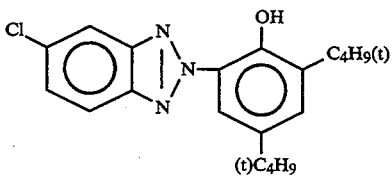
U-4
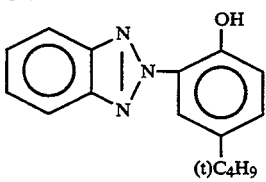
U-5

TABLE 2-continued
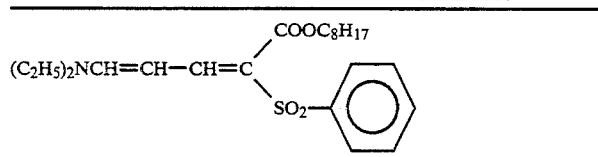
S-1
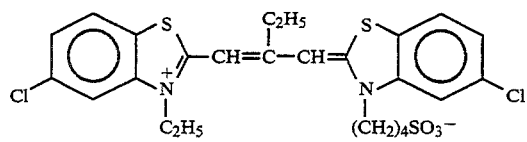
S-2
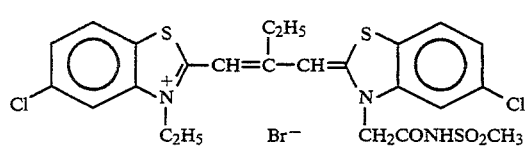
S-3
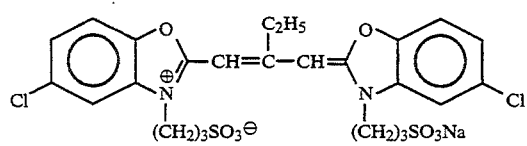
S-4
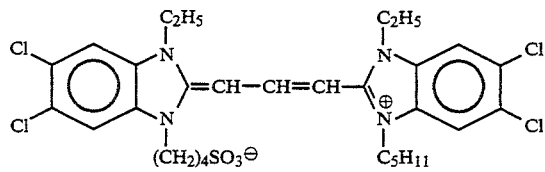
S-5
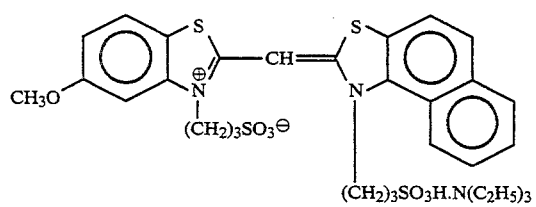
S-6
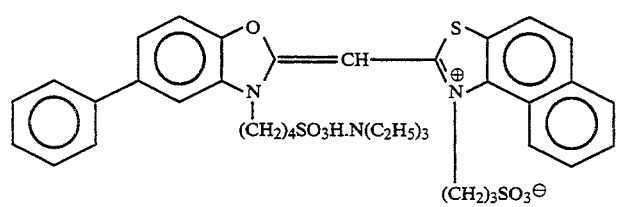
S-7
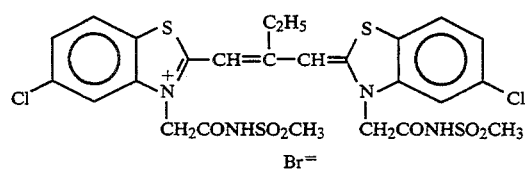
S-8

TABLE 2-continued
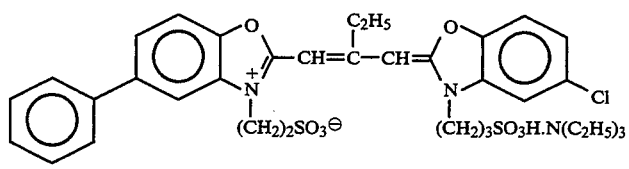
D-1
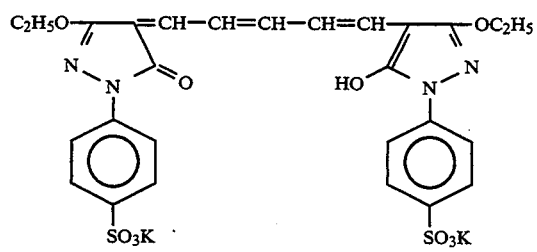
D-2
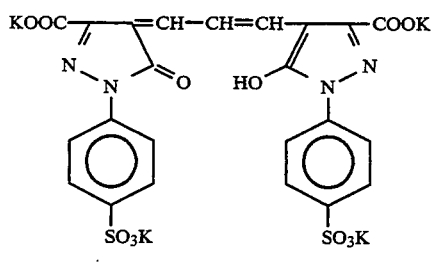
D-3
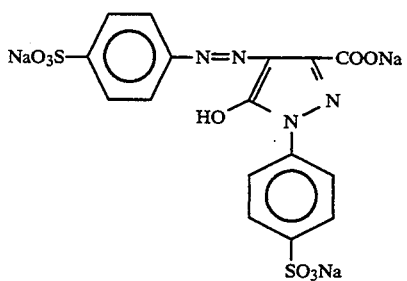
D-4
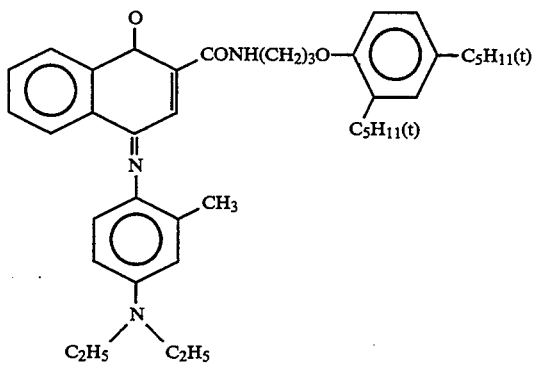
E-1

TABLE 2-continued
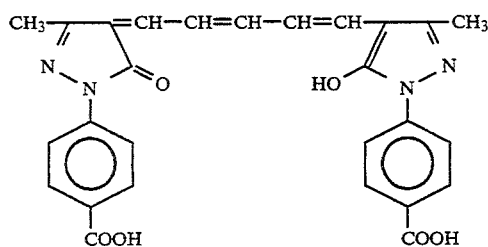
E-2
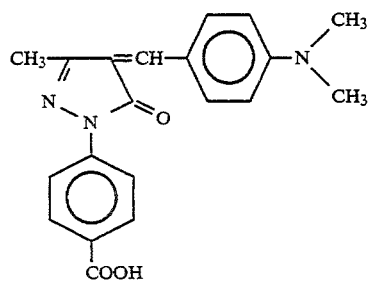
H-1
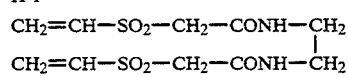
W-1
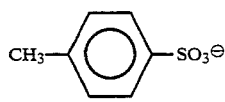
W-2
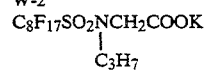
W-3
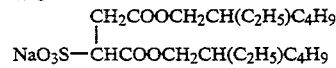
W-4
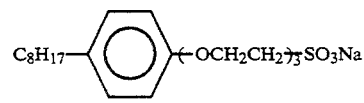
W-5
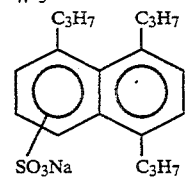
W-6
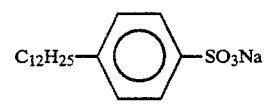
P-1
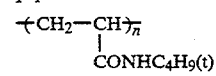
M-1

TABLE 2-continued
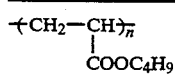
F-1
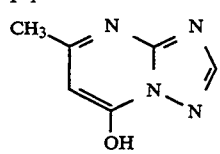
F-2
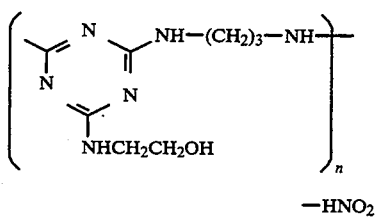
F-3
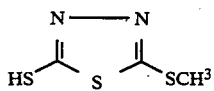
F-4
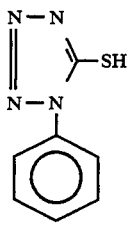
F-5
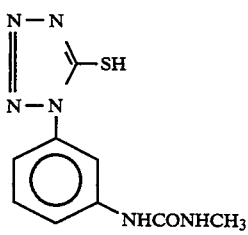
F-6
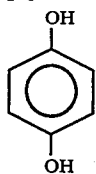
F-7
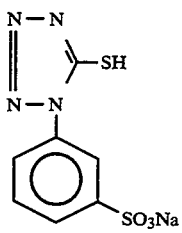
F-8

TABLE 2-continued

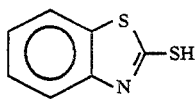

Preparation of Specimens 102–119

Specimens 102 to 119 were prepared in the same manner as Specimen 101 except that Emulsions A to D were replaced by the sensitizing dyes as set forth in Table 3, respectively.

These specimens were exposed to white light at an exposure of 20 CMS through a gray wedge for 1/100 seconds, processed according to the processing steps described below, and then subjected to sensitometry.

For the evaluation of color remaining, the magenta stain density of Specimen 119 (free of dyes) was subtracted from the magenta density on the stained portion of the specimens which had been processed.

TABLE 3

| Specimen No. | Emulsion A Sensitizing dye | Emulsion A Added amount (g/mole Ag) | Emulsions B and D Sensitizing dye | Emulsions B and D Added amount (g/mole Ag) | Emulsion C Sensitizing dye | Emulsion C Added amount (g/mole Ag) |
|---|---|---|---|---|---|---|
| 101 | S-1 | 0.285 | S-1 | 0.27 | S-1 | 0.28 |
| 102 | S-2 | " | S-2 | " | S-2 | " |
| 103 | S-7 | " | S-7 | " | S-2 | " |
| 104 | I-1 | " | I-1 | " | I-1 | " |
| 105 | I-3 | " | I-3 | " | I-3 | " |
| 106 | I-7 | " | I-7 | " | I-7 | " |
| 107 | I-8 | " | I-8 | " | I-8 | " |
| 108 | I-9 | " | I-9 | " | I-9 | " |

| Processing step | Time | Temperature |
|---|---|---|
| 1st development | 6 min. | 38° C. |
| Rinse | 2 min. | 38° C. |
| Reversal | 2 min. | 38° C. |
| Color development | 6 min. | 38° C. |
| Adjustment | 2 min. | 38° C. |
| Bleach | 6 min. | 38° C. |
| Fixing | 4 min. | 38° C. |
| Rinse | 4 min. | 38° C. |
| Stabilization | 1 min. | 25° C. |

The formulation of the various processing solutions were as follows:

| 1st developer | |
|---|---|
| Pentasodium nitrilo-N,N,N-trimethylene-phosphonate | 2.0 g |
| Sodium sulfite | 30 g |
| Potassium hydroquinone monosulfonate | 20 g |
| Potassium carbonate | 33 g |
| 1-Phenyl-4-methyl-4-hydroxymethyl-3-pyrazolidone | 2.0 g |
| Potassium bromide | 2.5 g |
| Potassium thiocyanate | 1.2 g |
| Potassium iodide | 2.0 mg |
| Water to make | 1,000 ml |
| pH (adjusted with hydrochloric acid or potassium hydroxide) | 9.60 |

| Reversing solution | |
|---|---|
| Pentasodium nitrilo-N,N,N-trimethylene-phosphonate | 3.0 g |
| Stannous chloride dihydrate | 1.0 g |
| p-Aminophenol | 0.1 g |
| Sodium hydroxide | 8 g |
| Glacial acetic acid | 15 ml |
| Water to make | 1,000 ml |
| pH (adjusted with hydrochloric acid or potassium hydroxide) | 6.00 |

| Color developer | |
|---|---|
| Pentasodium nitrilo-N,N,N-trimethylene-phosphonate | 2.0 g |
| Sodium sulfite | 7.0 g |
| Trisodium phosphate dodecahydrate | 36 g |
| Potassium bromide | 1.0 g |
| Potassium iodide | 90 mg |
| Sodium hydroxide | 3.0 g |
| Citrazinic acid | 1.5 g |
| N-Ethyl-(β-methanesulfonamidoethyl)-3-methyl-4-aminoaniline sulfate | 11 g |
| 3,6-Dithiaoctane-1,8-diol | 1.0 g |
| Water to make | 1,000 ml |
| pH (adjusted with hydrochloric acid or potassium hydroxide) | 11.80 |

| Adjusting solution | |
|---|---|
| Disodium ethylenediaminetetraacetate dihydrate | 8.0 g |
| Sodium sulfite | 12 g |
| 1-Thioglycerin | 0.4 ml |
| Water to make | 1,000 ml |
| pH (adjusted with hydrochloric acid or sodium hydroxide) | 6.20 |

| Bleaching solution | |
|---|---|
| Disodium ethylenediaminetetraacetate dihydrate | 2.0 g |
| Ferric ammonium ethylenediamine-tetraacetate dihydrate | 120 g |
| Potassium bromide | 100 g |
| Ammonium nitrate | 10 g |
| Water to make | 1,000 ml |
| pH (adjusted with hydrochloric acid or sodium hydroxide) | 5.70 |

| Fixing solution | |
|---|---|
| Ammonium thiosulfate | 80 g |
| Sodium sulfite | 5.0 g |
| Sodium bisulfite | 5.0 g |
| Water to make | 1,000 ml |
| pH (adjusted with hydrochloric acid or aqueous ammonia) | 6.60 |

| Stabilizing solution | |
|---|---|
| 37% Formalin | 5.0 ml |
| Polyoxyethylene-p-monononylphenyl ether (polymerization degree: 10) | 0.5 ml |
| Water to make | 1,000 ml |

-continued

| | |
|---|---|
| pH | not adjusted |

The results of sensitometry and color remaining are set forth in Table A. RL relative sensitivity is represented relative to the relative exposure which is 1.0 larger than the minimum density.

TABLE A

| Specimen No. | RL relative sensitivity | Magenta remaining density |
|---|---|---|
| 101 (comparative) | 105 | 0.073 |
| 102 (comparative) | 82 | 0.020 |
| 103 (comparative) | 80 | 0.009 |
| 104 (present invention) | 131 | 0.004 |
| 105 (present invention) | 129 | 0.004 |
| 106 (present invention) | 135 | 0.005 |
| 107 (present invention) | 130 | 0.005 |
| 108 (present invention) | 128 | 0.004 |

As can be seen in Table A, the use of the compounds and emulsions of the present invention provides a light-sensitive material which provides improvements in both color remaining and sensitivity.

It is thus obvious that the use of the constitution of the present invention provides a high sensitivity and inhibits color remaining.

EXAMPLE 2

Onto an undercoated cellulose triacetate film support were coated the following layer compositions to prepare a multi-layer color light-sensitive material as Specimen 201.

(Formulation of light-sensitive layer)

The coated amount of silver halide and colloidal silver is represented in g/m² as calculated in terms of silver. The coated amount of coupler, additive and gelatin is represented in g/m². The coated amount of sensitizing dye is represented in the molar amount thereof per mole of silver halide contained in the same layer.

| | |
|---|---|
| 1st layer: antihalation layer | |
| Black colloidal silver | 0.15 |
| Gelatin | 1.90 |
| ExM-1 | $5.0 \times 10^{-3}$ |
| 2nd layer: interlayer | |
| Gelatin | 2.10 |
| UV-1 | $3.0 \times 10^{-2}$ |
| UV-2 | $6.0 \times 10^{-2}$ |
| UV-3 | $7.0 \times 10^{-2}$ |
| ExF-1 | $4.0 \times 10^{-3}$ |
| Solv-2 | $7.0 \times 10^{-2}$ |
| 3rd layer: low sensitivity red-sensitive emulsion layer | |
| Silver bromoiodide emulsion (AgI content: 2 mole %; internal high AgI content type; diameter in terms of sphere: 0.3 μm; fluctuation coefficient in terms of sphere: 29%; mixture of regular crystal and twinning; diameter/thickness ratio: 2.5) | 0.50 |
| Gelatin | 1.50 |
| S-1 | $4.1 \times 10^{-4}$ |
| ExC-1 | 0.11 |
| ExC-3 | 0.11 |
| ExC-4 | $3.0 \times 10^{-2}$ |
| ExC-7 | $1.0 \times 10^{-2}$ |
| Solv-1 | $7.0 \times 10^{-3}$ |
| 4th layer: middle sensitivity red-sensitive emulsion layer | |
| Silver bromoiodide emulsion (AgI content: 4 mole %; internal high AgI content type; diameter in terms of sphere: 0.55 μm; fluctuation coefficient in terms of sphere: 20%; mixture of regular crystal and twinning; diameter/thickness ratio: 1.0) | 0.85 |
| Gelatin | 2.00 |
| S-1 | $4.1 \times 10^{-4}$ |
| ExC-1 | 0.16 |
| ExC-2 | $8.0 \times 10^{-2}$ |
| ExC-3 | 0.17 |
| ExC-7 | $1.5 \times 10^{-2}$ |
| ExY-1 | $2.0 \times 10^{-2}$ |
| ExY-2 | $1.0 \times 10^{-2}$ |
| Cpd-10 | $1.0 \times 10^{-2}$ |
| Solv-1 | 0.10 |
| 5th layer: high sensitivity red-sensitive emulsion layer | |
| Silver bromoiodide emulsion (AgI content: 10 mole %; internal high AgI content type; diameter in terms of sphere: 0.7 μm; fluctuation coefficient in terms of sphere: 30%; mixture of regular crystal and twinning; diameter/thickness ratio: 2.0) | 0.70 |
| Gelatin | 1.60 |
| S-1 | $4.1 \times 10^{-4}$ |
| ExC-5 | $7.0 \times 10^{-2}$ |
| ExC-6 | $8.0 \times 10^{-2}$ |
| ExC-7 | $1.5 \times 10^{-2}$ |
| Solv-1 | 0.15 |
| Solv-2 | $8.0 \times 10^{-2}$ |
| 6th layer: interlayer | |
| Gelatin | 1.10 |
| P-2 | 0.17 |
| Cpd-1 | 0.10 |
| Cpd-4 | 0.17 |
| Solv-1 | $5.0 \times 10^{-2}$ |
| 7th layer: low sensitivity green-sensitive emulsion layer | |
| Silver bromoiodide emulsion (AgI content: 2 mole %; internal high AgI content type; diameter in terms of sphere: 0.3 μm; fluctuation coefficient in terms of sphere: 28%; mixture of regular crystal and twinning; diameter/thickness ratio: 2.5) | 0.30 |
| Gelatin | 0.50 |
| ExS-4 | $5.0 \times 10^{-4}$ |
| ExS-5 | $2.0 \times 10^{-4}$ |
| ExS-6 | $0.3 \times 10^{-4}$ |
| ExM-1 | $3.0 \times 10^{-2}$ |
| ExM-2 | 0.20 |
| ExY-1 | $3.0 \times 10^{-2}$ |
| Cpd-11 | $7.0 \times 10^{-3}$ |
| Solv-1 | 0.20 |
| 8th layer: middle sensitivity green-sensitive emulsion layer | |
| Silver bromoiodide emulsion (AgI content: 4 mole %; internal high AgI content type; diameter in terms of sphere: 0.55 μm; fluctuation coefficient in terms of sphere: 20%; mixture of regular crystal and twinning; diameter/thickness ratio: 4.0) | 0.70 |
| Gelatin | 1.00 |
| ExS-4 | $5.0 \times 10^{-4}$ |
| ExS-5 | $2.0 \times 10^{-4}$ |
| ExS-6 | $3.0 \times 10^{-5}$ |
| ExM-1 | $3.0 \times 10^{-2}$ |
| ExM-2 | 0.25 |
| ExM-3 | $1.5 \times 10^{-2}$ |
| ExY-1 | $4.0 \times 10^{-2}$ |
| Cpd-11 | $9.0 \times 10^{-3}$ |
| Solv-1 | 0.20 |
| 9th layer: high sensitivity green-sensitive emulsion layer | |
| Silver bromoiodide emulsion (AgI content: 10 mole %; internal high AgI content type; diameter in terms of sphere: 0.7 μm; Fluctuation coefficient in terms of sphere: 30%; mixture of regular crystal and twinning; diameter/thickness ratio: 2.0) | 0.50 |

| | |
|---|---|
| Gelatin | 0.90 |
| ExS-4 | $2.0 \times 10^{-4}$ |
| ExS-5 | $2.0 \times 10^{-4}$ |
| ExS-6 | $2.0 \times 10^{-5}$ |
| ExS-7 | $3.0 \times 10^{-4}$ |
| ExM-1 | $1.0 \times 10^{-2}$ |
| ExM-4 | $3.9 \times 10^{-2}$ |
| ExM-5 | $2.6 \times 10^{-2}$ |
| Cpd-2 | $1.0 \times 10^{-2}$ |
| Cpd-9 | $2.0 \times 10^{-4}$ |
| Cpd-10 | $2.0 \times 10^{-4}$ |
| Solv-1 | 0.20 |
| Solv-2 | $5.0 \times 10^{-2}$ |
| 10th layer: yellow filter layer | |
| Gelatin | 0.90 |
| Yellow colloid | $5.0 \times 10^{-2}$ |
| Cpd-1 | 0.20 |
| Solv-1 | 0.15 |
| 11th layer: low sensitivity blue-sensitive emulsion layer | |
| Silver bromoiodide emulsion (AgI content: 4 mole %; internal high AgI content type; diameter in terms of sphere: 0.55 μm; fluctuation coefficient in terms of sphere: 15%; octahedral grain) | 0.40 |
| Gelatin | 1.00 |
| ExS-8 | $2.0 \times 10^{-4}$ |
| ExY-1 | $9.0 \times 10^{-2}$ |
| ExY-3 | 0.90 |
| Cpd-2 | $1.0 \times 10^{-2}$ |
| Solv-1 | 0.30 |
| 12th layer: high sensitivity blue-sensitive emulsion layer | |
| Silver bromoiodide emulsion (AgI content: 10 mole %; internal high AgI content type; diameter in terms of sphere: 1.3 μm; fluctuation coefficient in terms of sphere: 25%; mixture of regular crystal and twinning; diameter/thickness ratio: 4.5) | 0.50 |
| Gelatin | 0.60 |
| ExS-8 | $1.0 \times 10^{-4}$ |
| ExY-3 | 0.12 |
| Cpd-2 | $1.0 \times 10^{-3}$ |
| Solv-1 | $4.0 \times 10^{-2}$ |
| 13th layer: 1st protective layer | |
| Finely divided silver bromoiodide grains (average grain diameter: 0.07 μm; AgI content: 1 mole %) | 0.20 |
| Gelatin | 0.80 |
| UV-2 | 0.10 |
| UV-3 | 0.10 |
| UV-4 | 0.20 |
| Solv-3 | $4.0 \times 10^{-2}$ |
| P-2 | $9.0 \times 10^{-2}$ |
| 14th layer: 2nd protective layer | |
| Gelatin | 0.90 |
| B-1 (diameter: 1.5 μm) | 0.10 |
| B-2 (diameter: 1.5 μm) | 0.10 |
| B-3 | $2.0 \times 10^{-2}$ |
| H-1 | 0.40 |

Further, in order to improve preservability, processability, pressure resistance, mildew resistance, bacteria resistance, antistatic properties, and coating properties, Cpd-3, Cpd-5, Cpd-6, Cpd-7, Cpd-8, P-1, W-1, W-2, and W-3 as set forth below were incorporated in these layers.

In addition to these additives, n-butyl-p-hydroxybenzoate was incorporated in these layers. Moreover, B-4, F-1, F-4, F-5, F-6, F-7, F-8, F-9, F-10, F-11, iron salt, lead salt, gold salt, platinum salt, iridium salt, and rhodium salt were incorporated in these layers.

The chemical structure and chemical name of the compounds used in the present invention will be given below.

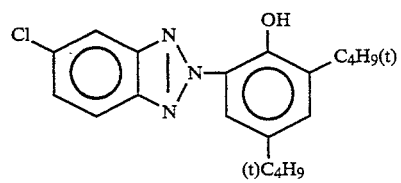

UV-1

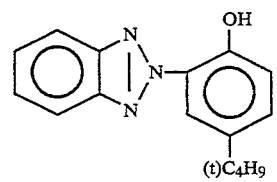

UV-2

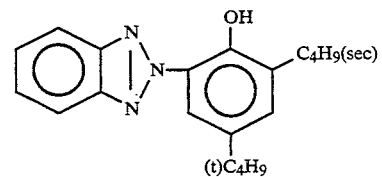

UV-3

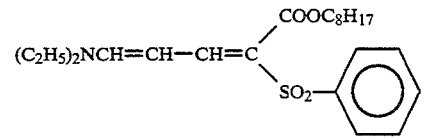

UV-4

Solv-1: Tricresyl phosphate

Solv-2: Dibutyl phthalate

Solv-3: Tri(2-ethylhexyl) phosphate

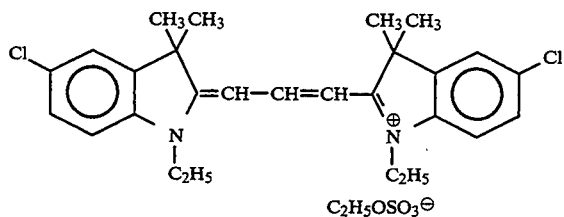
ExF-1
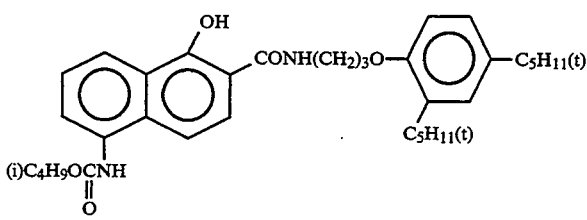
ExC-1
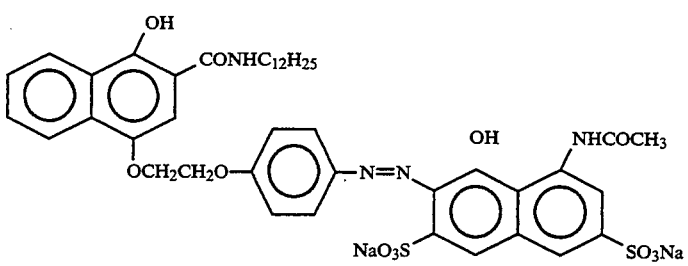
ExC-2
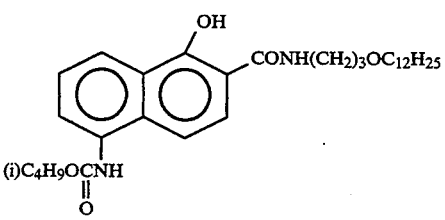
ExC-3
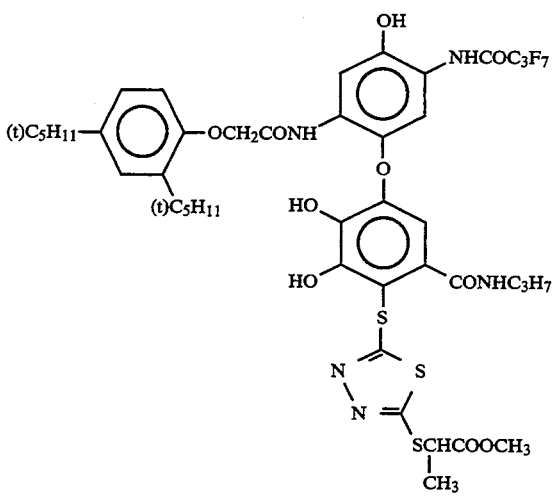
ExC-4
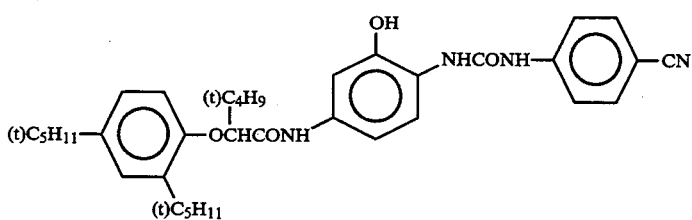
ExC-5

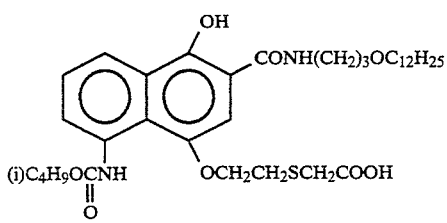
ExC-6
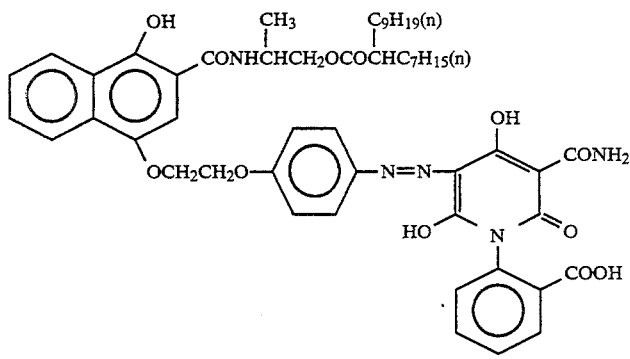
ExC-7
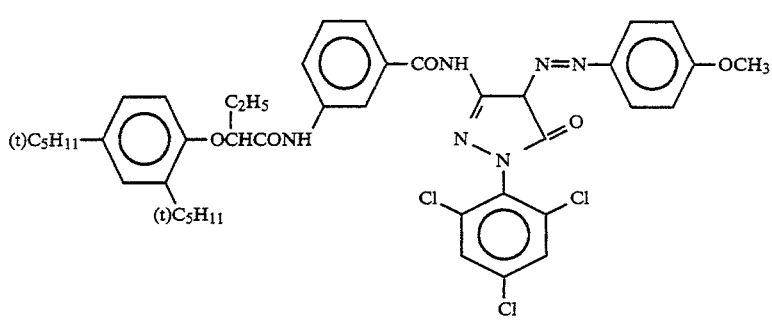
ExM-1
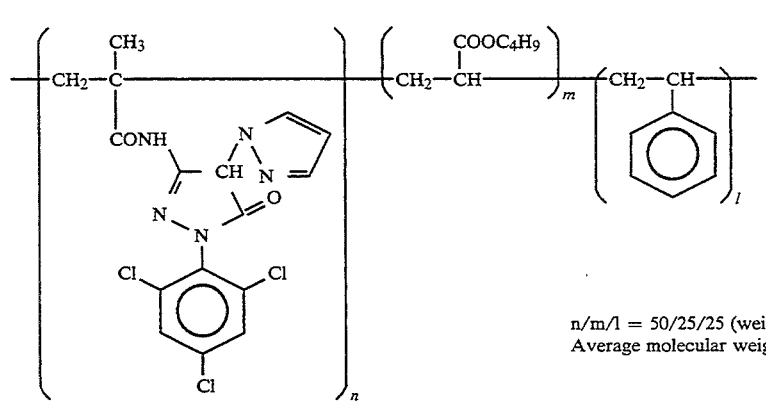
n/m/l = 50/25/25 (weight ratio)
Average molecular weight: 20,000
ExM-2
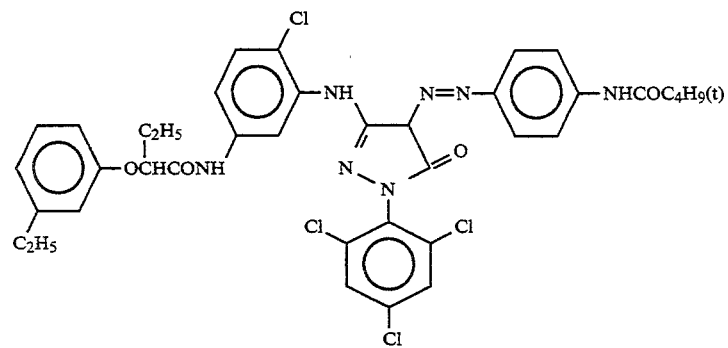
ExM-3

-continued
ExM-4
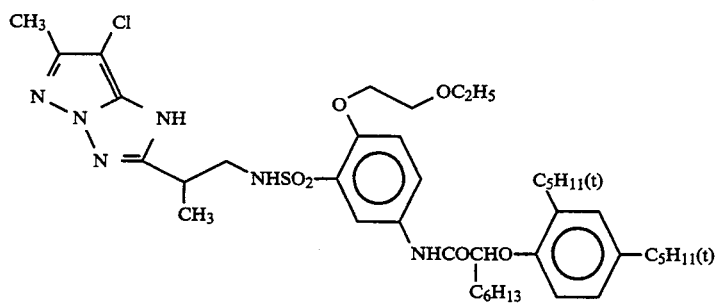
ExM-5
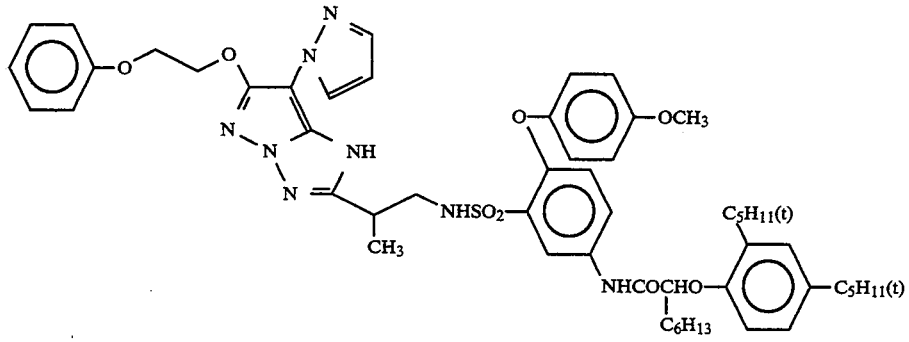
ExY-1
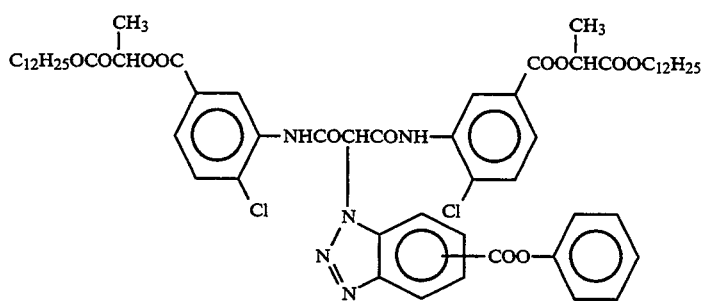
ExY-2
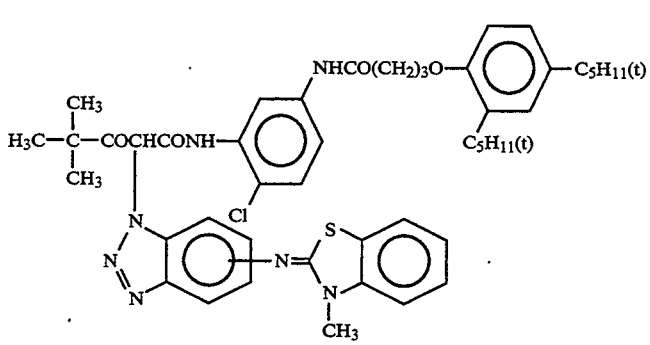
ExY-3
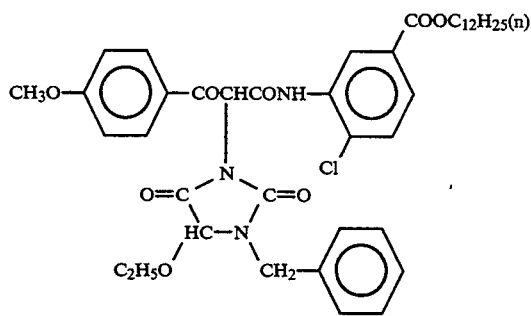

-continued
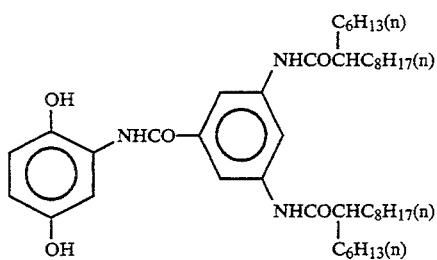
Cpd-1
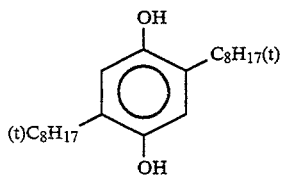
Cpd-2
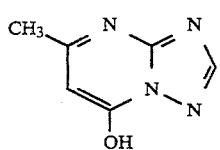
Cpd-3
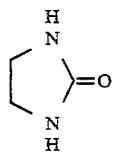
Cpd-4
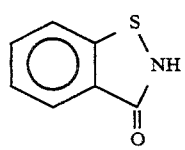
Cpd-5
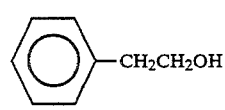
Cpd-6
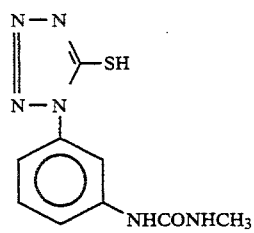
Cpd-7
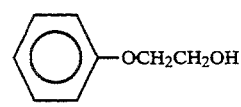
Cpd-8
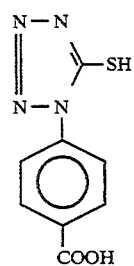
Cpd-9

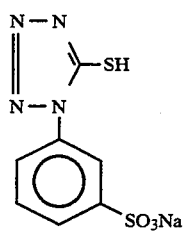
Cpd-10
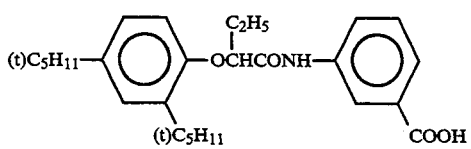
Cpd-11
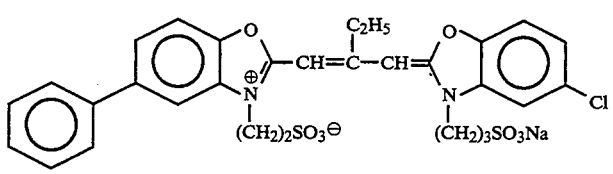
ExS-4
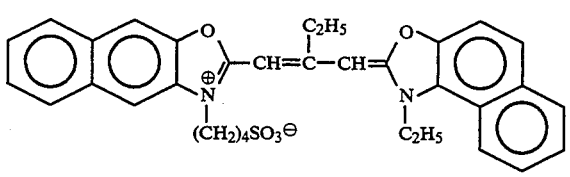
ExS-5
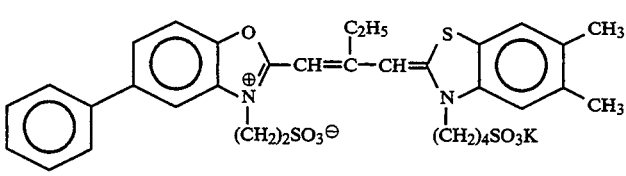
ExS-6
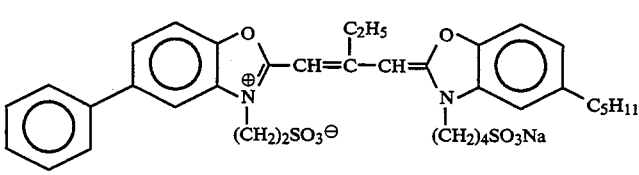
ExS-7
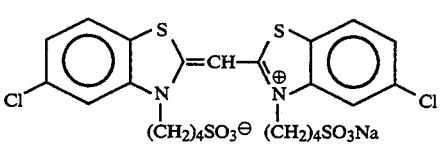
ExS-8
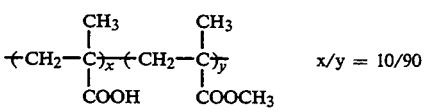
B-1
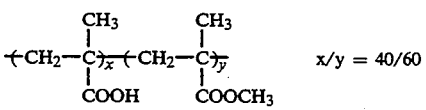
B-2

-continued
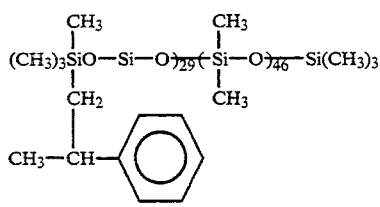
B-3
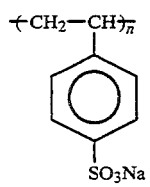
B-4
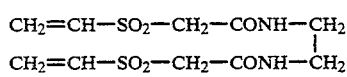
H-1
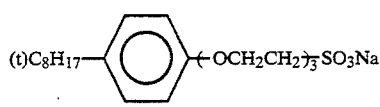
W-1
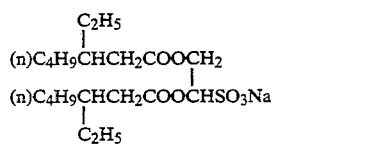
W-2
C$_8$F$_{17}$SO$_2$N(C$_3$H$_7$)CH$_2$COOK  W-3
P-1: 70:30 (weight ratio) copolymer of vinyl pyrrolidone and vinyl alcohol
P-2: Polyethyl acrylate
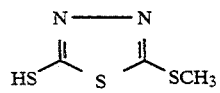
F-1
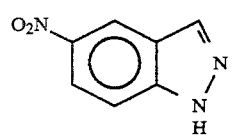
F-4
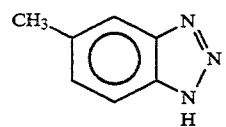
F-5
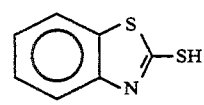
F-6
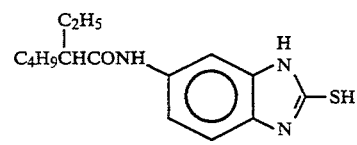
F-7
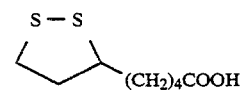
F-8

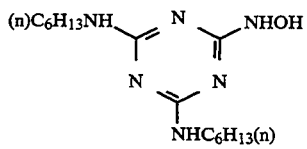

F-9

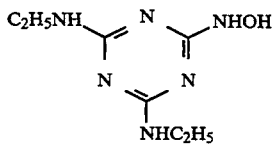

F-10

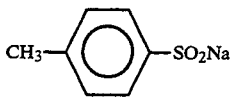

F-11

Preparation of Specimens 202 to 209

Specimens 202 to 208 were prepared in the same manner as Specimen 201 except that S-1 was replaced by the sensitizing dyes as set forth in Table B, respectively. Further, a specimen free of dyes was prepared as Specimen 209 in the same manner as in Example 1.

TABLE B

| Specimen No. | Sensitizing dye |
|---|---|
| 201 (comparative) | S-1 |
| 202 (comparative) | S-2 |
| 203 (comparative) | S-7 |
| 204 (present invention) | I-1 |
| 205 (present invention) | I-3 |
| 206 (present invention) | I-7 |
| 207 (present invention) | I-8 |
| 208 (present invention | I-9 |
| 209 (type) | Blank |

Specimens 201 to 208 thus obtained were exposed to white light at an exposure of 50 CMS through a wedge for 1/100 seconds, subjected to the following processing, and then subjected to sensitometry.

For the evaluation of color remaining, the difference in the magenta stain density from the dey-free specimen which had been processed was determined. The results are set forth in Table B.

The results show that the present invention provides improvements in both sensitivity and color remaining.

| (Processing method) | | | | |
|---|---|---|---|---|
| Step | Processing Time | Processing temperature | Replenishment rate* | Tank capacity |
| Color development | 3 min. 15 sec. | 37.8° C. | 25 ml | 10 l |
| Bleach | 45 sec. | 38° C. | 5 ml | 4 l |
| Blix (1) | 45 sec. | 38° C. | — | 4 l |
| Blix (2) | 45 sec. | 38° C. | 30 ml | 4 l |
| Rinse (1) | 20 sec. | 38° C. | — | 2 l |
| Rinse (2) | 20 sec. | 38° C. | 30 ml | 2 l |
| Stabilization | 20 sec. | 38° C. | 20 ml | 2 l |
| Drying | 1 min. | 55° C. | | |

*per m of 35-mm wide light-sensitive material

The blix and rinse steps were effected in a counterflow system wherein the solution flows backward from the tank (2) to the tank (1). The overflow from the bleach bath was all introduced into the blix bath (2).

The amount of the blix solution brought over to the rinse step was 2 ml per m of a 35-mm wide light-sensitive material.

The formulation of the various processing solutions were as follows:

| | Running solution (g) | Replenisher (g) |
|---|---|---|
| Color Developer | | |
| Diethylenetriaminepentaacetic acid | 5.0 | 6.0 |
| Sodium sulfite | 4.0 | 5.0 |
| Potassium carbonate | 30.0 | 37.0 |
| Potassium bromide | 1.3 | 0.5 |
| Potassium iodide | 1.2 mg | — |
| Hydroxylamine sulfate | 2.0 | 3.6 |
| 4-[N-Ethyl-N-β-hydroxyethylamino]-2-methylaniline sulfate | 4.7 | 6.2 |
| Water to make | 1.0 l | 1.0 l |
| pH | 10.00 | 10.15 |
| Bleaching solution | | |
| Ferric ammonium 1,3-diaminopropanetetraacetate monohydrate | 144.0 | 206.0 |
| 1,3-Diaminopropanetetraacetic acid | 2.8 | 4.0 |
| Ammonium bromide | 84.0 | 25.0 |
| 27% Aqueous ammonia | 10.0 | 1.8 |
| 98% Acetic acid | 51.1 | 73.0 |
| Water to make | 1.0 l | 1.0 l |
| pH | 4.3 | 3.4 |
| Blix solution | | |
| Ferric ammonium ethylenediaminetetraacetate dihydrate | 50.0 | — |
| Disodium ethylenediaminetetraacetate | 5.0 | 25.0 |
| Ammonium sulfite | 12.0 | 20.0 |
| Aqueous solution of ammonium thiosulfate (700 g/l) | 290.0 ml | 320.0 ml |
| 27% Aqueous ammonia | 6.0 ml | 1.0 ml |
| Water to make | 1.0 l | 1.0 l |
| pH | 6.8 | 8.0 |

Rinsing solution (common to both running solution and replenisher)

Tap water was passed through a mixed bed column filled with an H type strongly acidic cation exchange resin (Amberlite IR-120B produced by Rohm & Haas) and an OH type anion exchange resin (Amberlite IR-400) so that the calcium and magnesium ion concentrations were each reduced to 3 mg/l or less. To the solution were then added 20 mg/l of dichlorinated sodium isocyanurate and 150 mg/l of sodium sulfate. The pH range of the solution was from 6.5 to 7.5.

| Stabilizing solution (common to both running solution and replenisher) | |
|---|---|
| 37% Formalin | 1.2 ml |
| Surface active agent [$C_{10}H_{21}$—O—($CH_2CH_2$)$_{10}$—H] | 0.4 g |
| Ethylene glycol | 1.0 g |
| Water to make | 1.0 l |
| pH | 5.0–7.0 |

EXAMPLE 3

Preparation of Specimen 301

Onto a polyethylene-double-laminated paper support were coated the following 1st to 12th layers to prepare a color photographic light-sensitive material. The 1st layer side of the polyethylene contained 15% by weight of an anatase type titanium oxide as a white pigment and a slight amount of ultramarine as a bluish dye.

(Formulation of light-sensitive material)

The components used and their coated amounts in g/m² will be set forth below. The coated amount of silver halide is represented as calculated in terms of silver.

| 1st layer: gelatin layer | |
|---|---|
| Gelatin | 1.30 |
| 2nd layer: antihalation layer | |
| Black colloidal silver | 0.10 |
| Gelatin | 0.70 |
| 3rd layer: low sensitivity red-sensitive layer | |
| Silver bromochloroiodide spectrally sensitized with a red-sensitizing dye (S-1) (silver chloride content: 1 mole %; silver iodide content: 4 mole %; average grain size: 0.3 μm; grain size distribution: 10%; cubic iodine core type core-shell grain) | 0.06 |
| Silver bromoiodide spectrally sensitized with a red-sensitizing dye (S-1) (silver iodide content: 4 mole %; average grain size: 0.5 μm; grain size distribution: 15%; cubic grain) | 0.10 |
| Gelatin | 1.00 |
| Cyan coupler (ExC-1) | 0.14 |
| Cyan coupler (ExC-2) | 0.07 |
| Discoloration inhibitor (Cpd-2, 3, 4: same amount) | 0.12 |
| Coupler dispersant (Cpd-6) | 0.03 |
| Coupler solvent (Solv-1, 2, 3: same amount) | 0.06 |
| Development accelerator (Cpd-13) | 0.05 |
| 4th layer: high sensitivity red-sensitive layer | |
| Silver bromoiodide spectrally sensitized with a red-sensitizing dye (S-1) (silver iodide content: 6 mole %; average grain size: 0.8 μm; grain size distribution: 20%; tabular grain (aspect ratio: 8); iodine core) | 0.15 |
| Gelatin | 1.00 |
| Cyan coupler (ExC-1) | 0.20 |
| Cyan coupler (ExC-2) | 0.10 |
| Discoloration inhibitor (Cpd-2, 3, 4: same amount) | 0.15 |
| Coupler dispersant (Cpd-6) | 0.03 |
| Coupler solvent (Solv-1, 2, 3: same amount) | 0.10 |
| 5th layer: interlayer | |
| Magenta colloidal silver | 0.02 |
| Gelatin | 1.00 |
| Color stain inhibitor (Cpd-7, 16) | 0.08 |
| Color stain inhibitor solvent (Solv-4, 5) | 0.16 |
| Polymer latex (Cpd-8) | 0.10 |
| 6th layer: low sensitivity green-sensitive layer | |
| Silver bromochloroiodide spectrally sensitized with a green-sensitizing dye (ExS-3, 4) (silver chloride content: 1 mole %; silver iodide content: 2.5 mole %; average grain size: 0.28 μm; grain size distribution: 8%; cubic iodine core type core-shell grain) | 0.04 |
| Silver bromoiodide spectrally sensitized with a green-sensitizing dye (ExS-3, 4) (silver iodide content: 2.5 mole %; average grain size: 0.48 μm; grain size distribution: 12%; cubic grain) | 0.06 |
| Gelatin | 0.80 |
| Magenta coupler (ExM-1, 2: same amount) | 0.10 |
| Discoloration inhibitor (Cpd-9) | 0.10 |
| Stain inhibitor (Cpd-10, 11: same amount) | 0.01 |
| Stain inhibitor (Cpd-5) | 0.001 |
| Stain inhibitor (Cpd-12) | 0.01 |
| Coupler dispersant (Cpd-6) | 0.05 |
| Coupler solvent (Solv-4, 6) | 0.15 |
| 7th layer: high sensitivity green-sensitive layer | |
| Silver bromoiodide spectrally sensitized with a green-sensitizing dye (ExS-3, 4) (silver iodide content: 3.5 mole %; average grain size: 1.0 μm; grain size distribution: 21%; tabular grain (aspect ratio: 9); uniform iodine type) | 0.10 |
| Gelatin | 0.80 |
| Magenta coupler (ExM-1, 2: same amount) | 0.10 |
| Discoloration inhibitor (Cpd-9) | 0.10 |
| Stain inhibitor (Cpd-10, 11, 22: same amount) | 0.01 |
| Stain inhibitor (Cpd-5) | 0.001 |
| Stain inhibitor (Cpd-12) | 0.01 |
| Coupler dispersant (Cpd-6) | 0.05 |
| Coupler solvent (Solv-4, 6) | 0.15 |
| 8th layer: yellow filter layer | |
| Yellow colloidal silver | 0.20 |
| Gelatin | 1.00 |
| Color stain inhibitor (Cpd-7) | 0.06 |
| Color stain inhibitor solvent (Solv-4, 5) | 0.15 |
| Polymer latex (Cpd-8) | 0.10 |
| 9th layer: low sensitivity blue-sensitive layer | |
| Silver bromochloroiodide spectrally sensitized with a blue-sensitizing dye (ExS-5, 6) (silver chloride content: 2 mole %; silver iodide content: 2.5 mole %; average grain size: 0.38 μm; grain size distribution: 8%; cubic iodine core type core-shell grain) | 0.07 |
| Silver bromoiodide spectrally sensitized with a blue-sensitizing dye (ExS-5, 6) (silver iodide content: 2.5 mole %; average grain size: 0.55 μm; grain size distribution: 11%; cubic grain) | 0.10 |
| Gelatin | 0.50 |
| Yellow coupler (ExY-1, 2: same amount) | 0.20 |
| Stain inhibitor (Cpd-5) | 0.001 |
| Discoloration inhibitor (Cpd-14) | 0.10 |
| Coupler dispersant (Cpd-6) | 0.05 |
| Coupler solvent (Solv-2) | 0.05 |
| 10th layer: high sensitivity blue-sensitive layer | |
| Silver bromoiodide spectrally sensitized with a blue-sensitizing dye (ExS-5, 6) (silver iodide content: 2.5 mole %; average grain size: 1.4 μm; grain size distribution: 21%; tabular grain (aspect ratio: 14)) | 0.25 |
| Gelatin | 1.00 |
| Yellow coupler (ExY-1, 2: same amount) | 0.40 |
| Stain inhibitor (Cpd-5) | 0.002 |
| Discoloration inhibitor (Cpd-14) | 0.10 |
| Coupler dispersant (Cpd-6) | 0.15 |

| -continued | |
|---|---|
| Coupler solvent (Solv-2) | 0.10 |
| 11th layer: ultraviolet absorbing layer | |
| Gelatin | 1.50 |
| Ultraviolet absorbent (Cpd-1, 2, 4, 15: same amount) | 1.00 |
| Color stain inhibitor (Cpd-7, 16) | 0.06 |
| Dispersant (Cpd-6) | 0.05 |
| Ultraviolet absorbent solvent (Solv-1, 2) | 0.15 |
| Irradiation inhibiting dye (Cpd-17, 18) | 0.02 |
| Irradiation inhibiting dye (Cpd-19, 20) | 0.02 |
| 12th layer: protective layer | |
| Finely divided silver bromochloride grains (silver chloride content: 97 mole %; average size: 0.2 μm) | 0.07 |

| -continued | |
|---|---|
| Modified POVAL | 0.02 |
| Gelatin | 1.50 |
| Gelatin hardener (H-1, 2: same amount) | 0.17 |

To each of these layers were further added Alkanol XC (Dupont) and sodium alkylbenzenesulfonate as emulsion dispersion aids and succinic ester and Magefac F-120 (produced by Dainippon Ink And Chemicals, Incorporated) as coating aids. To the silver halide or colloidal silver-containing layer were added stabilizers (Cpd-21, 22, 23). The chemical structure of the compounds used in the present example will be set forth below.

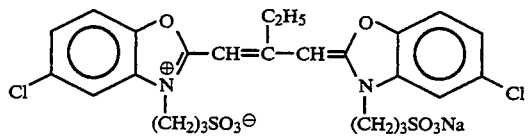

ExS-3

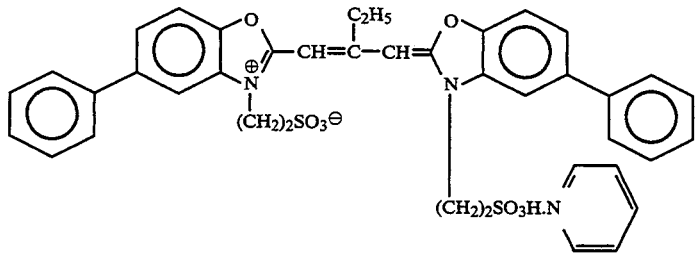

ExS-4

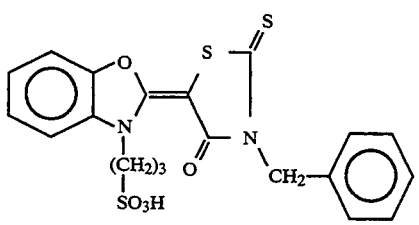

ExS-5

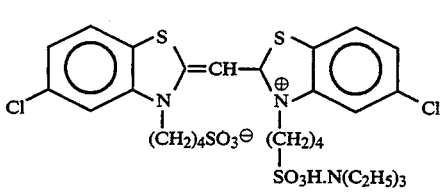

ExS-6

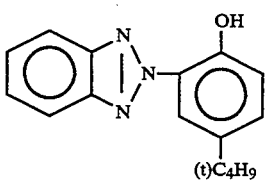

Cpd-1

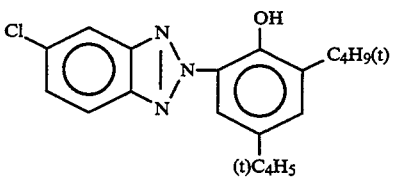

Cpd-2

Solv-3: Di(3-methylhexyl) phthalate
Solv-4: Tricresyl phosphate
Solv-5: Dibutyl phthalate
Solv-6: Trioctyl phosphate H-1: 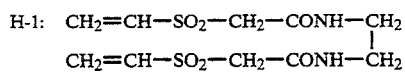
H-2: Sodium salt of 4,6-dichloro-2-hydroxy-1,3,5-triazine
ExY-1
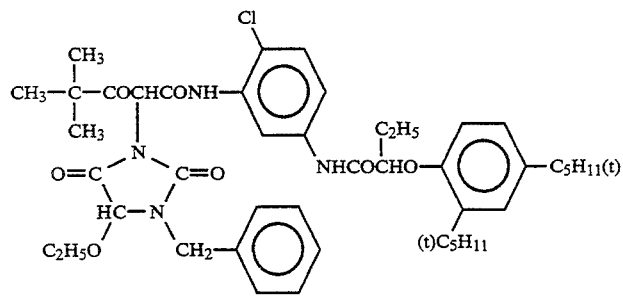
ExY-2
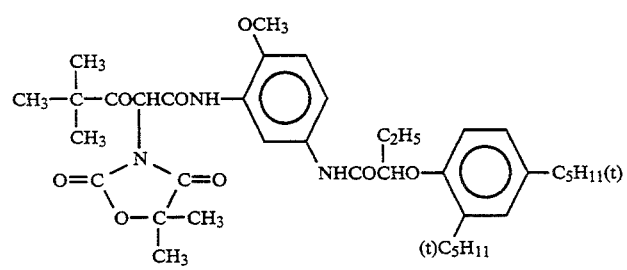
Solv-1: Di(2-ethylhexyl) phthalate
Solv-2: Trinonyl phosphate
ExC-2
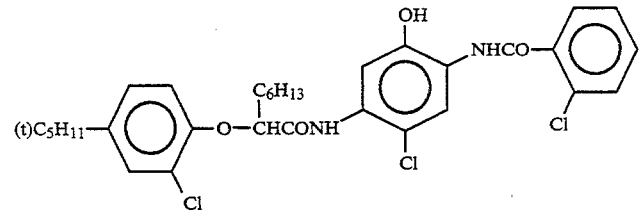
ExM-1
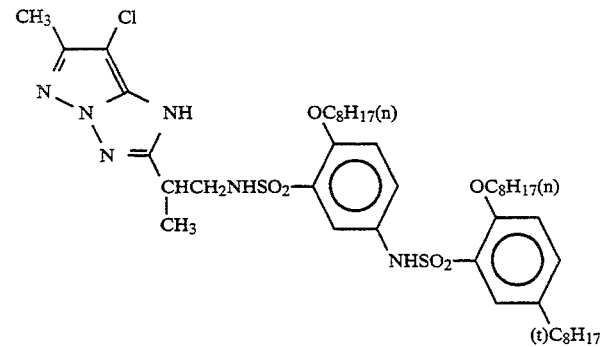
ExM-2
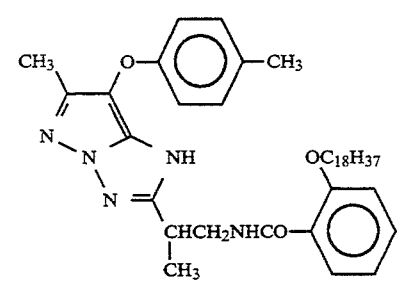

-continued
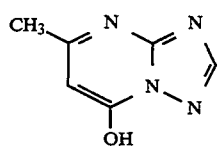
Cpd-21
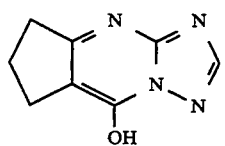
Cpd-22
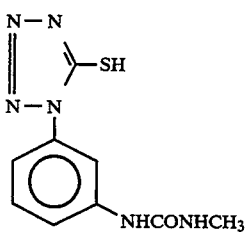
Cpd-23
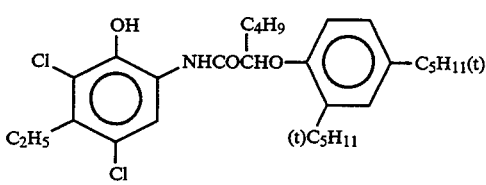
ExC-1
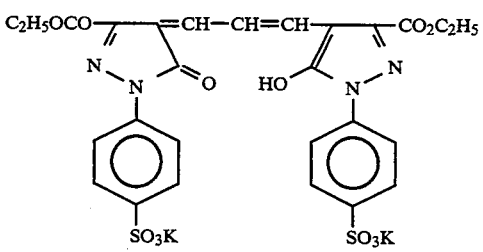
Cpd-17
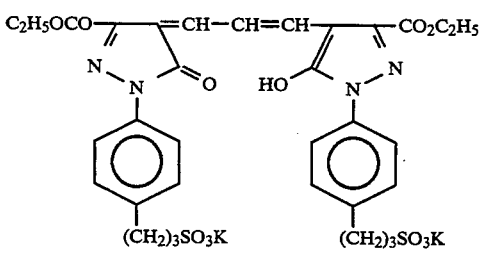
Cpd-18
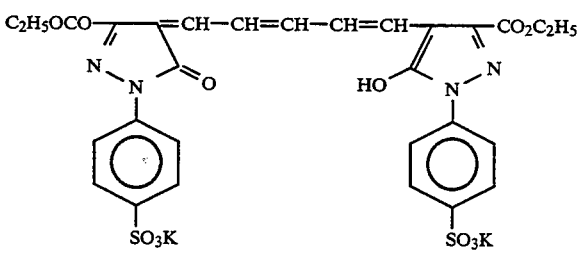
Cpd-19

-continued
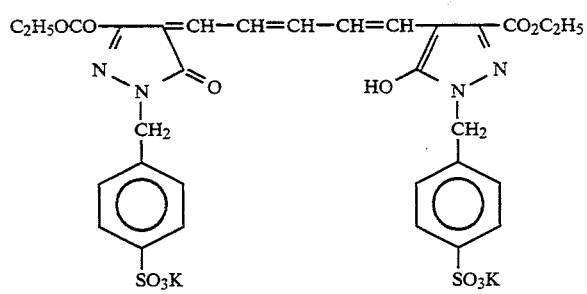
Cpd-20
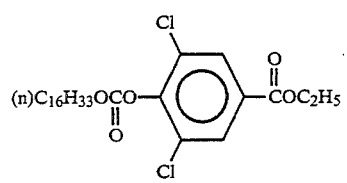
Cpd-12
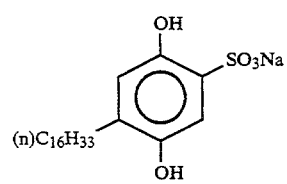
Cpd-13
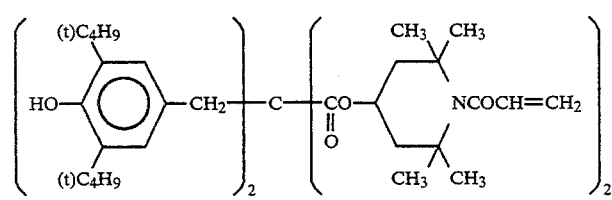
Cpd-14
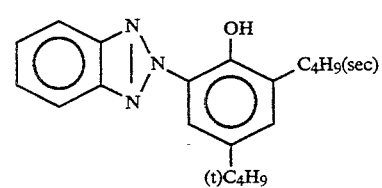
Cpd-15
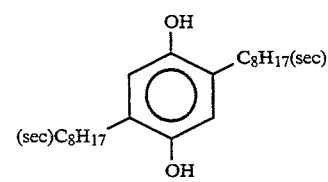
Cpd-16
Cpd-8: Polyethyle acrylate (MW: 10,000–100,000)
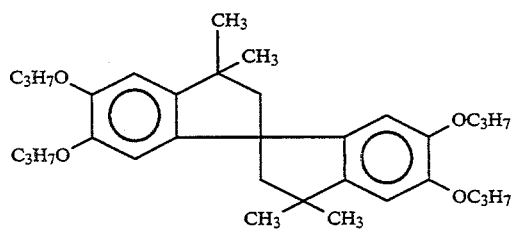
Cpd-9

-continued

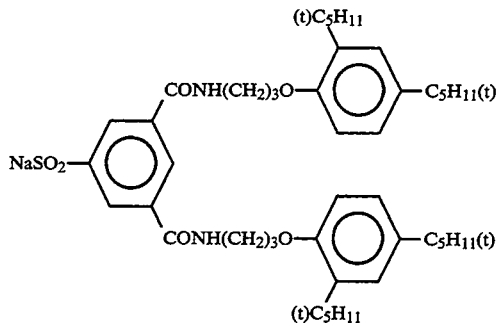
Cpd-10

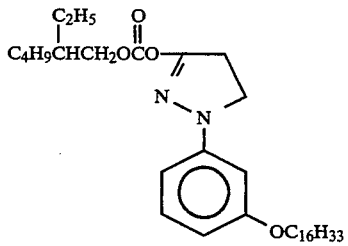
Cpd-11

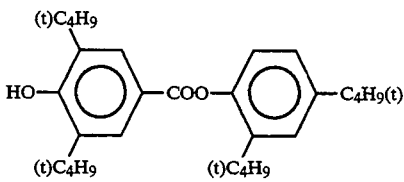
Cpd-3

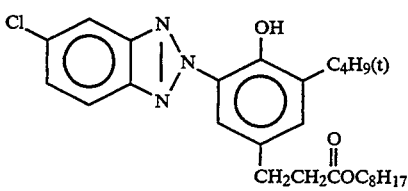
Cpd-4

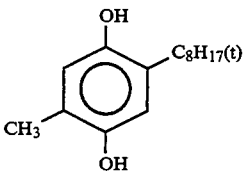
Cpd-5

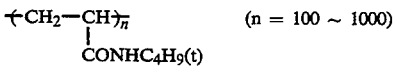
(n = 100 ~ 1000)

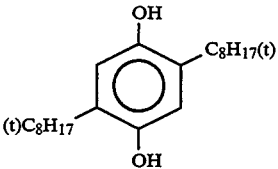
Cpd-7

Specimens were prepared in the same manner as Specimen 301 except that the sensitizing dye S-1 was replaced by each of the same sensitizing dyes as used in Example 2, respectively. These specimens were exposed to white light through a wedge, subjected to the following processing, and then evaluated in the same manner as in Examples 1 and 2.

The results show that the same effects as obtained in Examples 1 and 2 can be provided.

| Processing step | Temperature | Time |
|---|---|---|
| 1st development (black-and-white development) | 38° C. | 75 sec. |
| Rinse | 38° C. | 90 sec. |
| Reversal exposure | 100 lux or higher | 60 sec. or more |
| Color development | 38° C. | 135 sec. |
| Rinse | 38° C. | 45 sec. |
| Blix | 38° C. | 120 sec. |
| Rinse | 38° C. | 135 sec. |

-continued

| Processing step | Temperature | Time |
|---|---|---|
| Drying | | |

The formulation of the various processing solutions were as follows:

| 1st developer | |
|---|---|
| Pentasodium nitrilo-N,N,N-trimethylene-phosphonate | 0.6 g |
| Pentasodium diethylenetriaminepenta-cetate | 4.0 g |
| Potassium sulfite | 30.0 g |
| Potassium thiocyanate | 1.2 g |
| Potassium carbonate | 35.0 g |
| Potassium hydroquinone monosulfonate | 25.0 g |
| Diethylene glycol | 15.0 ml |
| 1-Phenyl-4-hydroxymethyl-4-methyl-3-pyrazolidone | 2.0 g |
| Potassium bromide | 0.5 g |
| Potassium iodide | 5.0 mg |
| Water to make | 1 l |
| pH | 9.70 |
| Color developer | |
| Benzyl alcohol | 15.0 ml |
| Diethylene glycol | 12.0 ml |
| 3,6-Dithia-1,8-octanediol | 0.2 g |
| Pentasodium nitrilo-N,N,N-trimethylene-phosphonate | 0.5 g |
| Pentasodium diethylenetriaminepenta-acetate | 2.0 g |
| Sodium sulfite | 2.0 g |
| Potassium carbonate | 25.0 g |
| Hydroxylamine sulfate | 3.0 g |
| N-Ethyl-N-(β-methanesulfonamidoethyl)-3-methyl-4-aminoaniline sulfate | 5.0 g |
| Potassium bromide | 0.5 g |
| Potassium iodide | 1.0 mg |
| Water to make | 1 l |
| pH | 10.40 |
| Blix solution | |
| 2-Mercapto-1,3,4-triazole | 1.0 g |
| Disodium ethylenediaminetetraacetate dihydrate | 5.0 g |
| Ferric ammonium ethylenediamine-tetraacetate monohydrate | 80.0 g |
| Sodium sulfite | 15.0 g |
| Sodium thiosulfate (700 g/l) | 160.0 ml |
| Glacial acetic acid | 5.0 ml |
| Water to make | 1 l |
| pH | 6.50 |

EXAMPLE 4

Onto a 127-μm thick undercoated cellulose triacetate film support were coated the following layer compositions to prepare a multi-layer color light-sensitive material as Specimen 401. The figures indicate the coated amount of components per m² of light-sensitive material. The actual effects of the compounds added are not limited to those described.

| 1st layer: antihalation layer | |
|---|---|
| Black colloidal silver | 0.20 g |
| Gelatin | 1.9 g |
| Ultraviolet absorbent U-1 | 0.1 g |
| Ultraviolet absorbent U-3 | 0.04 g |
| Ultraviolet absorbent U-4 | 0.1 g |
| High boiling organic solvent Oil-1 | 0.1 g |
| Solid dispersion of microcrystal of Dye A (see Table 6) | 0.1 g |
| 2nd layer: interlayer | |
| Gelatin | 0.40 g |
| Compound Cpd-C | 5 mg |
| Compound Cpd-J | 5 mg |
| Compound Cpd-K | 3 mg |
| High boiling organic solvent Oil-3 | 0.1 g |
| Dye D-4 | 0.4 mg |
| 3rd layer: interlayer | |
| Superficially and internally fogged fine emulsion of silver bromoiodide (average grain diameter: 0.06 μm; fluctuation coefficient: 18%; AgI content: 1 mole %) | 0.05 g as calculated in terms of silver |
| Gelatin | 0.4 g |
| 4th layer: low sensitivity red-sensitive emulsion layer | |
| Emulsion A' | 0.1 g as calculated in terms of silver |
| Emulsion B' | 0.4 g as calculated in terms of silver |
| Gelatin | 0.8 g |
| Coupler C-1 | 0.15 g |
| Coupler C-2 | 0.05 g |
| Coupler C-3 | 0.05 g |
| Coupler C-9 | 0.05 g |
| Compound Cpd-C | 10 mg |
| High boiling organic solvent Oil-2 | 0.1 g |
| Additive P-1 | 0.1 g |
| 5th layer: middle sensitivity red-sensitive emulsion layer | |
| Emulsion B' | 0.2 g as calculated in terms of silver |
| Emulsion C' | 0.3 g as calculated in terms of silver |
| Gelatin | 0.8 g |
| Coupler C-1 | 0.2 g |
| Coupler C-2 | 0.05 g |
| Coupler C-3 | 0.2 g |
| High boiling organic solvent Oil-2 | 0.1 g |
| Additive P-1 | 0.1 g |
| 6th layer: high low sensitivity red-sensitive emulsion layer | |
| Emulsion D' | 0.4 g as calculated in terms of silver |
| Gelatin | 1.1 g |
| Coupler C-1 | 0.3 g |
| Coupler C-2 | 0.1 g |
| Coupler C-3 | 0.7 g |
| Additive P-1 | 0.1 g |
| 7th layer: interlayer | |
| Gelatin | 0.6 g |
| Additive M-1 | 0.3 |
| Color stain inhibitor Cpd-I | 2.6 mg |
| Ultraviolet absorbent U-1 | 0.01 g |
| Ultraviolet absorbent U-2 | 0.002 g |
| Ultraviolet absorbent U-5 | 0.01 g |
| Dye B (see Table 6) | 0.02 g |
| Compound Cpd-C | 5 mg |
| Compound Cpd-J | 5 g |
| Compound Cpd-K | 5 g |
| High boiling organic solvent Oil-1 | 0.02 g |
| 8th layer: interlayer | |
| Superficially and internally fogged fine emulsion of silver bromoiodide (average grain diameter: 0.06 μm; fluctuation coefficient: 16%; AgI content: 0.3 mole %) | 0.02 g as calculated in terms of silver |
| Gelatin | 1.0 g |
| Additive P-1 | 0.2 g |
| Color stain inhibitor Cpd-A | 0.1 g |
| 9th layer: low sensitivity green-sensitive emulsion layer | |
| Emulsion E' | 0.1 g as calculated in terms of |

| | |
|---|---|
| Emulsion F' | 0.2 g as calculated in terms of silver |
| Emulsion G' | 0.2 g as calculated in terms of silver |
| Gelatin | 0.5 g |
| Coupler C-4 | 0.1 g |
| Coupler C-7 | 0.05 g |
| Coupler C-8 | 0.20 g |
| Compound Cpd-B | 0.03 g |
| Compound Cpd-C | 10 mg |
| Compound Cpd-D | 0.02 g |
| Compound Cpd-E | 0.02 g |
| Compound Cpd-F | 0.02 g |
| Compound Cpd-G | 0.02 g |
| High boiling organic solvent Oil-1 | 0.1 g |
| High boiling organic solvent Oil-2 | 0.1 g |
| 10th layer: middle sensitivity green-sensitive emulsion layer | |
| Emulsion G' | 0.3 g as calculated in terms of silver |
| Emulsion H' | 0.1 g as calculated in terms of silver |
| Gelatin | 0.6 g |
| Coupler C-4 | 0.1 g |
| Coupler C-7 | 0.2 g |
| Coupler C-8 | 0.1 g |
| Compound Cpd-B | 0.03 g |
| Compound Cpd-D | 0.02 g |
| Compound Cpd-E | 0.02 g |
| Compound Cpd-F | 0.05 g |
| Compound Cpd-G | 0.05 g |
| High boiling organic solvent Oil-2 | 0.1 g |
| 11th layer: high sensitivity green-sensitive emulsion layer | |
| Emulsion I' | 0.5 g as calculated in terms of silver |
| Gelatin | 1.0 g |
| Coupler C-4 | 0.3 g |
| Coupler C-7 | 0.1 g |
| Coupler C-8 | 0.1 g |
| Compound Cpd-B | 0.08 g |
| Compound Cpd-C | 5 mg |
| Compound Cpd-D | 0.02 g |
| Compound Cpd-E | 0.02 g |
| Compound Cpd-F | 0.02 g |
| Compound Cpd-G | 0.02 g |
| Compound Cpd-J | 5 mg |
| Compound Cpd-K | 5 mg |
| High boiling organic solvent Oil-1 | 0.02 g |
| High boiling organic solvent Oil-2 | 0.02 g |
| 12th layer: interlayer | |
| Gelatin | 0.6 g |
| 13th layer: yellow filter layer | |
| Yellow colloidal silver | 0.07 as calculated in terms of silver |
| Gelatin | 1.1 g |
| Color stain inhibitor Cpd-A | 0.01 g |
| High boiling organic solvent Oil-1 | 0.01 g |
| Solid dispersion of microcrystal of Dye E-2 | 0.05 g |
| 14th layer: interlayer | |
| Gelatin | 0.6 g |
| 15th layer: low sensitivity blue-sensitive emulsion layer | |
| Emulsion J' | 0.2 g as calculated in terms of silver |
| Emulsion K' | 0.3 g as calculated in terms of silver |
| Emulsion L' | 0.1 g as calculated in terms of silver |
| Gelatin | 0.8 g |
| Coupler C-5 | 0.2 g |
| Coupler C-6 | 0.1 g |
| Coupler C-10 | 0.4 g |
| 16th layer: middle sensitivity blue-sensitive emulsion layer | |
| Emulsion L' | 0.1 g as calculated in terms of silver |
| Emulsion M' | 0.4 g as calculated in terms of silver |
| Gelatin | 0.9 g |
| Coupler C-5 | 0.3 g |
| Coupler C-6 | 0.1 g |
| Coupler C-10 | 0.1 g |
| 17th layer: high sensitivity blue-sensitive emulsion layer | |
| Emulsion N' | 0.4 g as calculated in terms of silver |
| Gelatin | 1.2 g |
| Coupler C-5 | 0.3 g |
| Coupler C-6 | 0.6 g |
| Coupler C-10 | 0.1 g |
| 18th layer: 1st protective layer | |
| Gelatin | 0.7 g |
| Ultraviolet absorbent U-1 | 0.2 g |
| Ultraviolet absorbent U-2 | 0.05 g |
| Ultraviolet absorbent U-5 | 0.3 g |
| Formalin scavenger Cpd-H | 0.4 g |
| Dye D-2 | 0.1 g |
| Dye D-3 | 0.05 g |
| Dye D-4 | 0.1 g |
| 19th layer: 2nd protective layer | |
| Colloidal silver | 0.1 mg as calculated in terms of silver |
| Finely divided silver bromoiodide grains (average grain diameter: 0.06 μm; AgI content: 1 mole %) | 0.1 mg as calculated in terms of silver |
| Gelatin | 0.4 g |
| 20th layer: 3rd protective layer | |
| Gelatin | 0.4 g |
| Polymethyl methacrylate (average grain diameter: 1.5 μm) | 0.1 g |
| 4:6 Copolymer of methyl methacrylate and acrylic acid (average grain diameter: 1.5 μm) | 0.1 g |
| Silicone oil | 0.03 g |
| Surface active agent W-1 | 3.0 mg |
| Surface active agent W-2 | 0.03 g |

In addition to the above mentioned compositions, additives F-1 to F-8 were incorporated in all these emulsion layers. Besides the above mentioned compositions, a gelatin hardener H-1 and coating and emulsifying surface active agents W-3, W-4, W-5 and W-6 were incorporated in each of the various layers.

Further, phenol, 1,2-benzisothiazoline-3-one, 2-phenoxyethanol, and phenethyl alcohol were incorporated in these layers as preservatives or mildew-proofing agents.

Silver bromoiodide emulsions used in Specimen 401 were as follows:

TABLE 4

| Emulsion | Feature of grain | Average grain diameter (μm) in terms of sphere | Fluctuation coefficient (%) | AgI content (%) |
|---|---|---|---|---|
| A' | Monodisperse tetradecahedral grain | 0.28 | 16 | 3.7 |
| B' | Monodisperse cubic internal latent image type grain | 0.30 | 10 | 3.3 |
| C' | Monodisperse tabular grain; average aspect ratio: 4.0 | 0.38 | 18 | 5.0 |
| D' | Tabular grain; average aspect ratio: 8.0 | 0.68 | 25 | 2.0 |
| E' | Monodisperse cubic grain | 0.20 | 17 | 4.0 |
| F' | Monodisperse cubic grain | 0.23 | 16 | 4.0 |
| G' | Monodisperse cubic internal latent image type grain | 0.28 | 11 | 3.5 |
| H' | Monodisperse cubic internal latent image type grain | 0.32 | 9 | 3.5 |
| I' | Tabular grain; average aspect ratio: 9.0 | 0.80 | 28 | 1.5 |
| J' | Monodisperse tetradecahedral grain | 0.30 | 18 | 4.0 |
| K' | Monodisperse tabular grain; average aspect ratio: 7.0 | 0.45 | 17 | 4.0 |
| L' | Monodisperse cubic internal latent image type grain | 0.46 | 14 | 3.5 |
| M' | Monodisperse tabular grain; average aspect ratio: 10.0 | 0.55 | 13 | 4.0 |
| N' | Tabular grain; average aspect ratio: 12.0 | 1.00 | 33 | 1.3 |

TABLE 5

| Emulsion | Added sensitizing dye | Amount (g) added per mole of silver halide |
|---|---|---|
| \multicolumn{3}{c}{(spectral sensitization of Emulsions A'-N')} | | |
| A' | S-9 | 0.25 |
| B' | S-9 | 0.25 |
| C' | S-9 | 0.25 |
| D' | S-9 | 0.10 |
| E' | S-4 | 0.5 |
|  | S-5 | 0.1 |
| F' | S-4 | 0.3 |
|  | S-5 | 0.1 |
| G' | S-4 | 0.25 |
|  | S-5 | 0.08 |
|  | S-8 | 0.05 |
| H' | S-4 | 0.2 |
|  | S-5 | 0.06 |
|  | S-8 | 0.05 |
| I' | S-4 | 0.3 |
|  | S-5 | 0.07 |
|  | S-8 | 0.1 |
| J' | S-8 | 0.2 |
|  | S-6 | 0.05 |
| K' | S-8 | 0.2 |
|  | S-4 | 0.05 |
| L' | S-8 | 0.22 |
|  | S-4 | 0.06 |
| M' | S-8 | 0.15 |
|  | S-4 | 0.04 |
| N' | S-8 | 0.22 |
|  | S-4 | 0.06 |

S-9

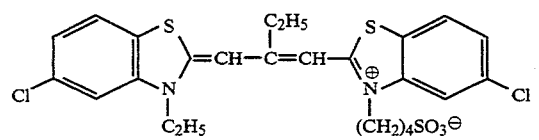

Comparative dyes

A.

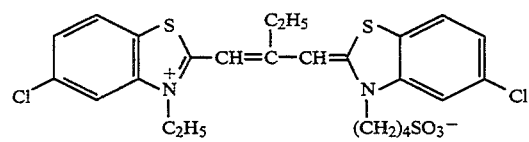

B.

TABLE 5-continued
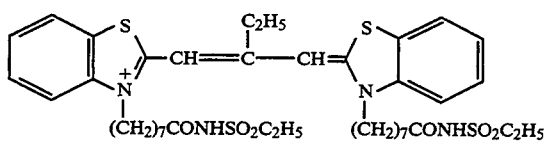
C.
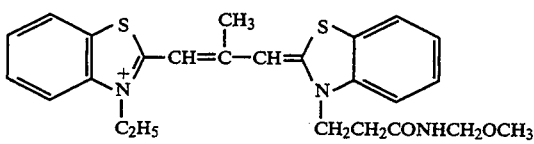
D.
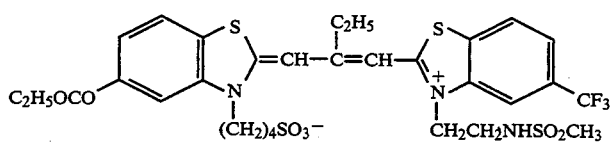
E.
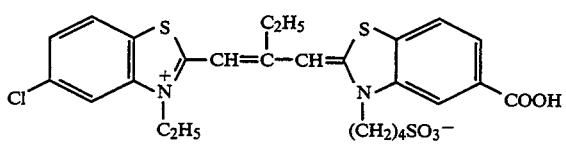
F.
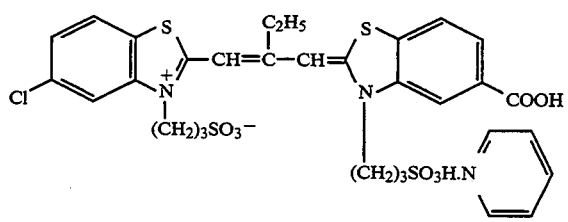
ExS-1
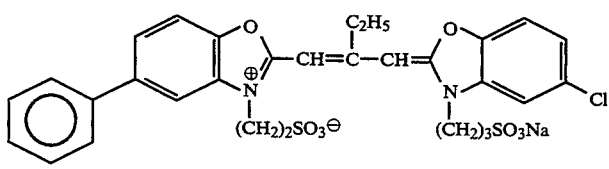
ExS-2
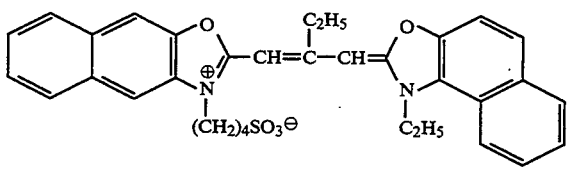
ExS-3
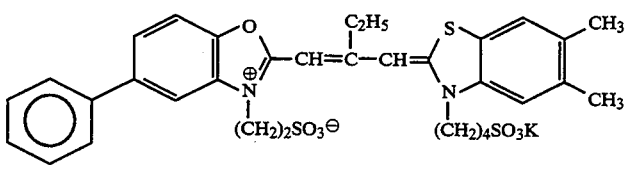
ExS-4

TABLE 5-continued

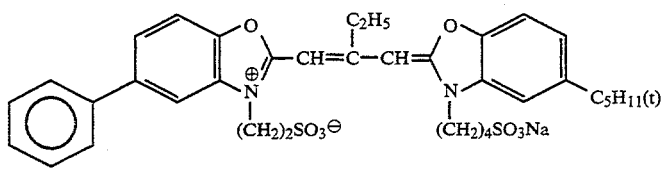

ExS-5

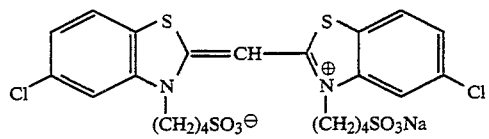

Preparation of Specimens 402 to 418

Specimens 402 to 418 were prepared in the same manner as Specimen 401 except that the sensitizing dyes to be incorporated in Emulsions A' to D' and Dyes A and B were replaced as set forth in Table 6, respectively.

These specimens were exposed to white light at an exposure of 20 CMS through a gray wedge for 1/100 seconds, processed according to the processing steps described below, and then subjected to sensitometry.

For the evaluation of color remaining, the magenta stain density of Specimen 418 (free of dyes) was subtracted from the magenta density on the stained portion of the specimens which had been processed.

TABLE 6

| Specimen No. | Sensitizing dye for Emulsions A', B', C', D' | Dye A | Dye B | Remarks |
|---|---|---|---|---|
| 401 | Comparative dye A | — | — | Comparative |
| 402 | Comparative dye B | — | — | Comparative |
| 403 | Comparative dye E | — | — | Comparative |
| 404 | Comparative dye F | — | — | Comparative |
| 405 | Comparative dye A | II-a-31 | II-a-40 | Comparative |
| 406 | Comparative dye B | II-a-31 | II-a-40 | Comparative |
| 407 | Comparative dye E | II-a-31 | II-a-40 | Comparative |
| 408 | Comparative dye F | II-a-31 | II-a-40 | Comparative |
| 409 | I-1 | — | — | Present invention |
| 410 | I-5 | — | — | Present invention |
| 411 | I-8 | — | — | Present invention |
| 412 | I-12 | — | — | Present invention |
| 413 | I-1 | II-a-31 | II-a-40 | Present invention |
| 414 | I-5 | II-a-31 | II-a-40 | Present invention |
| 415 | I-8 | II-a-31 | II-a-40 | Present invention |
| 416 | I-12 | II-a-31 | II-a-40 | Present invention |
| 417 | I-1 | ExF-1 | ExF-1 | Present invention |
| 418 | — | — | — | Blank |

| Processing step | Time | Temperature |
|---|---|---|
| 1st development | 6 min. | 38° C. |
| Rinse | 2 min. | 38° C. |
| Reversal | 2 min. | 38° C. |
| Color development | 6 min. | 38° C. |
| Adjustment | 2 min. | 38° C. |
| Bleach | 6 min. | 38° C. |
| Fixing | 4 min. | 38° C. |
| Rinse | 4 min. | 38° C. |
| Stabilization | 1 min. | 25° C. |

The formulation of the various processing solutions were as follows:

| 1st developer | |
|---|---|
| Pentasodium nitrilo-N,N,N-trimethylene-phosphonate | 2.0 g |
| Sodium sulfite | 30 g |
| Potassium hydroquinone monosulfonate | 20 g |
| Potassium carbonate | 33 g |
| 1-Phenyl-4-methyl-4-hydroxymethyl-3-pyrazolidone | 2.0 g |
| Potassium bromide | 2.5 g |
| Potassium thiocyanate | 1.2 g |
| Potassium iodide | 2.0 mg |
| Water to make | 1,000 ml |
| pH (adjusted with hydrochloric acid or potassium hydroxide) | 9.60 |
| Reversing solution | |
| Pentasodium nitrilo-N,N,N-trimethylene-phosphonate | 3.0 g |
| Stannous chloride dihydrate | 1.0 g |
| p-Aminophenol | 0.1 g |
| Sodium hydroxide | 8 g |
| Glacial acetic acid | 15 ml |
| Water to make | 1,000 ml |
| pH (adjusted with hydrochloric acid or potassium hydroxide) | 6.00 |
| Color developer | |
| Pentasodium nitrilo-N,N,N-trimethylene-phosphonate | 2.0 g |
| Sodium sulfite | 7.0 g |
| Trisodium phosphate dodecahydrate | 36 g |
| Potassium bromide | 1.0 g |
| Potassium iodide | 90 mg |
| Sodium hydroxide | 3.0 g |
| Citrazinic acid | 1.5 g |
| N-Ethyl-($\beta$-methanesulfonamidoethyl)-3-methyl-4-aminoaniline sulfate | 11 g |
| 3,6-Dithiaoctane-1,8-diol | 1.0 g |
| Water to make | 1,000 ml |
| pH (adjusted with hydrochloric acid or potassium hydroxide) | 11.80 |
| Adjusting solution | |
| Disodium ethylenediaminetetraacetate dihydrate | 8.0 g |
| Sodium sulfite | 12 g |
| 1-Thioglycerin | 0.4 ml |
| Water to make | 1,000 ml |
| pH (adjusted with hydrochloric acid or sodium hydroxide) | 6.20 |
| Bleaching solution | |
| Disodium ethylenediaminetetraacetate dihydrate | 2.0 g |
| Ferric ammonium ethylenediamine-tetraacetate dihydrate | 120 g |
| Potassium bromide | 100 g |
| Ammonium nitrate | 10 g |
| Water to make | 1,000 ml |
| pH (adjusted with hydrochloric acid or sodium hydroxide) | 5.70 |
| Fixing solution | |

-continued

| | | |
|---|---|---|
| Ammonium thiosulfate | 80 g | |
| Sodium sulfite | 5.0 g | |
| Sodium bisulfite | 5.0 g | |
| Water to make | 1,000 ml | |
| pH (adjusted with hydrochloric acid or aqueous ammonia) | 6.60 | |
| Stabilizing solution | | |
| 37% Formalin | 5.0 ml | |
| Polyoxyethylene-p-monononylphenyl ether (polymerization degree: 10) | 0.5 ml | |
| Water to make | 1,000 ml | |
| pH | not adjusted | |

The results of sensitometry and color remaining are set forth in Table C. RL relative sensitivity is represented relative to the relative exposure which is 1.0 larger than the minimum density.

TABLE C

| Specimen No. | Magenta remaining density | Remarks |
|---|---|---|
| 401 | 0.070 | Comparative |
| 402 | 0.023 | " |
| 403 | 0.042 | " |
| 404 | 0.042 | " |
| 404 | 0.030 | " |
| 405 | 0.073 | " |
| 406 | 0.025 | " |
| 407 | 0.045 | " |
| 408 | 0.030 | " |
| 409 | 0.10 | Present invention |
| 410 | 0.009 | " |
| 411 | 0.015 | " |
| 412 | 0.015 | " |
| 413 | 0.003 | " |
| 414 | 0.004 | " |
| 415 | 0.006 | " |
| 416 | 0.006 | " |
| 417 | 0.040 | |

As can be seen in Table C, the use of the methine compounds and water-soluble dyes of the present invention provides light-sensitive material which provides improvements in both color remaining and sensitivity.

EXAMPLE 5

Preparation of Specimen 501

Onto a polyethylene-double-laminated paper support were coated the following 1st to 12th layers to prepare a color photographic light-sensitive material. The 1st layer side of the polyethylene contained 15% by weight of an anatase type titanium oxide as a white pigment and a slight amount of ultramarine as a bluish dye.

(Formulation of light-sensitive material)

The components used and their coated amounts in g/m$^2$ will be set forth below. The coated amount of silver halide is represented as calculated in terms of silver.

| | |
|---|---|
| 1st layer: gelatin layer | |
| Gelatin | 1.30 |
| 2nd layer: antihalation layer | |
| Black colloidal silver | 0.10 |
| Gelatin | 0.70 |
| 3rd layer: low sensitivity red-sensitive layer | |
| Silver bromochloroiodide spectrally sensitized with a red-sensitizing dye F (silver chloride content: 1 mole %; silver iodide content: 4 mole %; average grain size: 0.3 μm; grain size distribution: 10%; cubic iodine core type core-shell grain) | 0.06 |
| Silver bromoiodide spectrally sensitized with a red-sensitizing dye F (silver iodide content: 4 mole %; average grain size: 0.5 μm; grain size distribution: 15%; cubic grain) | 0.10 |
| Gelatin | 1.00 |
| Cyan coupler (ExC-1) | 0.14 |
| Cyan coupler (ExC-2) | 0.07 |
| Discoloration inhibitor (Cpd-2, 3, 4: same amount) | 0.12 |
| Coupler dispersant (Cpd-6) | 0.03 |
| Coupler solvent (Solv-1, 2, 3: same amount) | 0.06 |
| Development accelerator (Cpd-13) | 0.05 |
| 4th layer: high sensitivity red-sensitive layer | |
| Silver bromoiodide spectrally sensitized with a red-sensitizing dye F (silver iodide content: 6 mole %; average grain size: 0.8 μm; grain size distribution: 20%; tabular grain (aspect ratio: 8); iodine core) | 0.15 |
| Gelatin | 1.00 |
| Cyan coupler (ExC-1) | 0.20 |
| Cyan coupler (ExC-2) | 0.10 |
| Discoloration inhibitor (Cpd-2, 3, 4: same amount) | 0.15 |
| Coupler dispersant (Cpd-6) | 0.03 |
| Coupler solvent (Solv-1, 2, 3: same amount) | 0.10 |
| 5th layer: interlayer | |
| Magenta colloidal silver | 0.02 |
| Gelatin | 1.00 |
| Color stain inhibitor (Cpd-7, 16) | 0.08 |
| Color stain inhibitor solvent (Solv-4, 5) | 0.16 |
| Polymer latex (Cpd-8) | 0.10 |
| 6th layer: low sensitivity green-sensitive layer | |
| Silver bromochloroiodide spectrally sensitized with a green-sensitizing dye (ExS-3, 4) (silver chloride content: 1 mole %; silver iodide content: 2.5 mole %; average grain size: 0.28 μm; grain size distribution: 8%; cubic iodine core type core-shell grain) | 0.04 |
| Silver bromoiodide spectrally sensitized with a green-sensitizing dye (ExS-3,4) (silver iodide content: 2.5 mole %; average grain size: 0.48 μm; grain size distribution: 12%; cubic grain) | 0.06 |
| Gelatin | 0.80 |
| Magenta coupler (ExM-1, 2: same amount) | 0.10 |
| Discoloration inhibitor (Cpd-9) | 0.10 |
| Stain inhibitor (Cpd-10, 11: same amount) | 0.01 |
| Stain inhibitor (Cpd-5) | 0.001 |
| Stain inhibitor (Cpd-12) | 0.01 |
| Coupler dispersant (Cpd-6) | 0.05 |
| Coupler solvent (Solv-4, 6) | 0.15 |
| 7th layer: high sensitivity green-sensitive layer | |
| Silver bromoiodide spectrally sensitized with a green-sensitizing dye (ExS-3, 4) (silver iodide content: 3.5 mole %; average grain size: 1.0 μm; grain size distribution: 21%; tabular grain (aspect ratio: 9); uniform iodine type) | 0.10 |
| Gelatin | 0.80 |
| Magenta coupler (ExM-1, 2: same amount) | 0.10 |
| Discoloration inhibitor (Cpd-9) | 0.10 |
| Stain inhibitor (Cpd-10, 11, 22: same amount) | 0.01 |
| Stain inhibitor (Cpd-5) | 0.001 |
| Stain inhibitor (Cpd-12) | 0.01 |
| Coupler dispersant (Cpd-6) | 0.05 |
| Coupler solvent (Solv-4, 6) | 0.15 |
| 8th layer: yellow filter layer | |
| Yellow colloidal silver | 0.20 |
| Gelatin | 1.00 |
| Color stain inhibitor (Cpd-7) | 0.06 |
| Color stain inhibitor solvent (Solv-4, 5) | 0.15 |

-continued

| | |
|---|---|
| Polymer latex (Cpd-8) | 0.10 |
| 9th layer: low sensitivity blue-sensitive layer | |
| Silver bromochloroiodide spectrally sensitized with a blue-sensitizing dye (ExS-5,6) (silver chloride content: 2 mole %; silver iodide content: 2.5 mole %; average grain size: 0.38 μm; grain size distribution: 8%; cubic iodine core type core-shell grain) | 0.07 |
| Silver bromoiodide spectrally sensitized with a blue-sensitizing dye (ExS-5, 6) (silver iodide content: 2.5 mole %; average grain size: 0.55 μm; grain size distribution: 11%; cubic grain) | 0.10 |
| Gelatin | 0.50 |
| Yellow coupler (ExY-1, 2: same amount) | 0.20 |
| Stain inhibitor (Cpd-5) | 0.001 |
| Discoloration inhibitor (Cpd-14) | 0.10 |
| Coupler dispersant (Cpd-6) | 0.05 |
| Coupler solvent (Solv-2) | 0.05 |
| 10th layer: high sensitivity blue-sensitive layer | |
| Silver bromoiodide spectrally sensitized with a blue-sensitizing dye (ExS-5, 6) (silver iodide content: 2.5 mole %; average grain size: 1.4 μm; grain size distribution: 21%; tabular grain (aspect ratio: 14) | 0.25 |
| Gelatin | 1.00 |
| Yellow coupler (ExY-1, 2: same amount) | 0.40 |
| Stain inhibitor (Cpd-5) | 0.002 |
| Discoloration inhibitor (Cpd-14) | 0.10 |
| Coupler dispersant (Cpd-6) | 0.15 |
| Coupler solvent (Solv-2) | 0.10 |
| 11th layer: ultraviolet absorbing layer | |
| Gelatin | 1.50 |
| Ultraviolet absorbent (Cpd-1, 2, 4, 15: same amount) | 1.00 |
| Color stain inhibitor (Cpd-7, 16) | 0.06 |
| Dispersant (Cpd-6) | 0.05 |
| Ultraviolet absorbent solvent (Solv-1, 2) | 0.15 |
| Irradiation inhibiting dye A, B | 0.02 |
| Irradiation inhibiting dye C, D | 0.02 |
| 12th layer: protective layer | |
| Finely divided silver bromochloride grains (silver chloride content: 97 mole %; average size: 0.2 μm) | 0.07 |
| Modified POVAL | 0.02 |
| Gelatin | 1.50 |
| Gelatin hardener (H-1, 2: same amount) | 0.17 |

To each of these layers were further added Alkanol XC (Dupont) and sodium alkylbenzenesulfonate as emulsion dispersion aids and succinic ester and Magefac F-120 (produced by Dainippon Ink And Chemicals, Incorporated) as coating aids. To the silver halide or colloidal silver-containing layer were added stabilizers (Cpd-21, 22, 23).

TABLE D

| Specimen No. | Sensitizing dye | Dye A | Dye B | Dye C | Dye D | Remarks |
|---|---|---|---|---|---|---|
| 501 | F | II-a-12 | II-a-15 | II-a-11 | II-a-17 | Comparative |
| 502 | " | — | — | — | — | " |
| 503 | I-1 | II-a-12 | II-a-15 | II-a-11 | II-a-17 | Present invention |
| 504 | " | — | — | — | — | Comparative |
| 505 | " | ExF-1 | ExF-1 | ExF-1 | ExF-1 | " |

Comparative specimens were prepared in the same manner as Specimen 501 except that the sensitizing dye F and the irradiation inhibiting dye were replaced as set forth in Table D. These specimens were exposed to white light through a wedge, subjected to the following processing, and then evaluated in the same manner as in Example 4.

The results show that the same effects as obtained in Example 4 can be provided.

| Processing step | Temperature | Time |
|---|---|---|
| 1st development (black-and-white development) | 38° C. | 75 sec. |
| Rinse | 38° C. | 90 sec. |
| Reversal exposure | 100 lux or higher | 60 sec. or more |
| Color development | 38° C. | 135 sec. |
| Rinse | 38° C. | 45 sec. |
| Blix | 38° C. | 120 sec. |
| Rinse | 38° C. | 135 sec. |
| Drying | | |

The formulation of the various processing solutions were as follows:

| 1st developer | |
|---|---|
| Pentasodium nitrilo-N,N,N-trimethylenephosphonate | 0.6 g |
| Pentasodium diethylenetriaminepentaacetate | 4.0 g |
| Potassium sulfite | 30.0 g |
| Potassium thiocyanate | 1.2 g |
| Potassium carbonate | 35.0 g |
| Potassium hydroquinone monosulfonate | 25.0 g |
| Diethylene glycol | 15.0 ml |
| 1-Phenyl-4-hydroxymethyl-4-methyl-3-pyrazolidone | 2.0 g |
| Potassium bromide | 0.5 g |
| Potassium iodide | 5.0 mg |
| Water to make | 1 l |
| pH | 9.70 |
| Color developer | |
| Benzyl alcohol | 15.0 ml |
| Diethylene glycol | 12.0 ml |
| 3,6-Dithia-1,8-octanediol | 0.2 g |
| Pentasodium nitrilo-N,N,N-trimethylenephosphonate | 0.5 g |
| Pentasodium diethylenetriaminepentaacetate | 2.0 g |
| Sodium sulfite | 2.0 g |
| Potassium carbonate | 25.0 g |
| Hydroxylamine sulfate | 3.0 g |
| N-Ethyl-N-(β-methanesulfonamidoethyl)-3-methyl-4-aminoaniline sulfate | 5.0 g |
| Potassium bromide | 0.5 g |
| Potassium iodide | 1.0 mg |
| Water to make | 1 l |
| pH | 10.40 |
| Blix solution | |
| 2-Mercapto-1,3,4-triazole | 1.0 g |
| Disodium ethylenediaminetetraacetate dihydrate | 5.0 g |
| Ferric ammonium ethylenediaminetetraacetate monohydrate | 80.0 g |
| Sodium sulfite | 15.0 g |
| Sodium thiosulfate (700 g/l) | 160.0 ml |
| Glacial acetic acid | 5.0 ml |
| Water to make | 1 l |
| pH | 6.50 |

While the invention has been described in detail and with reference to specific embodiments thereof, it will be apparent to one skilled in the art that various changes and modifications can be made therein without departing from the spirit and scope thereof.

What is claimed is:

1. A silver halide photographic material comprising at least one methine compound represented by the following general formula (I):

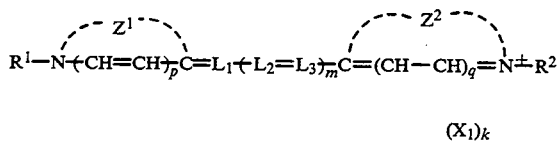

(X₁)$_k$ wherein R¹ represents —(CH$_2$)$_r$—CONHSO$_2$—R³, —(CH$_2$)$_s$—SO$_2$NHCO—R⁴, —(CH$_2$)$_t$—CONHCO—R⁵ or —(CH$_2$)$_u$—SO$_2$NHSO$_2$—R⁶ in which R³, R⁴, R⁵ and R⁶ each represents an alkyl group, alkoxy group or amino group, r, s, t and u each represents an integer 1 to 5, and R² represents a 2-sulfoethyl group, a 3-sulfopropyl group, a 4-sulfobutyl group or a 3-sulfobutyl group; Z¹ and Z² each represents a nonmetallic atom group required to form a benzothiazole nucleus or a benzoselenazole nucleus; p and q each represents an integer 0 or 1; L$_1$, L$_2$ and L$_3$ each represents a methine group; m represents an integer 0 to 2; X represents an anion; and k represents an integer required to adjust the charge in the molecule to 0.

2. A silver halide photographic material as in claim 1, wherein R² represents a 2-sulfoethyl group.

3. A silver halide photographic material as in claim 1, wherein R² represents a 3-sulfopropyl group.

4. A silver halide photographic material as in claim 1, wherein R² represents a 4-sulfobutyl group.

5. A silver halide photographic material as in claim 1, wherein R² represents a 3-sulfobutyl group.

6. A silver halide photographic material comprising at least one water-soluble dye and at least one methine compound represented by the following general formula (I):

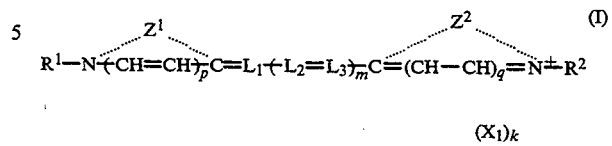

(X₁)$_k$ wherein R¹ represents —(CH$_2$)$_r$—CONHSO$_2$—R³, —(CH$_2$)$_s$—SO$_2$NHCO—R⁴, —(CH$_2$)$_t$—CONHCO—R⁵ or —(CH$_2$)$_u$—SO$_2$NHSO$_2$—R⁶ in which R³, R⁴, R⁵ and R⁶ each represents an alkyl group, alkoxy group or amino group, r, s, t and u each represents an integer 1 to 5, and R² represents a 2-sulfoethyl group, a 3-sulfopropyl group, a 4-sulfobutyl group or a 3-sulfobutyl group; Z¹ and Z² each represents a nonmetallic atom group required to form a benzothiazole nucleus or a benzoselenazole nucleus; p and q each represents an integer 0 or 1; L$_1$, L$_2$ and L$_3$ each represents a methine group; m represents an integer 0 to 2; X represents an anion; and k represents an integer required to adjust the charge in the molecule to 0.

7. A silver halide photographic material as in claim 6, wherein R² represents a 2-sulfoethyl group.

8. A silver halide photographic material as in claim 6, wherein R² represents a 3-sulfopropyl group.

9. A silver halide photographic material as in claim 6, wherein R² represents a 4-sulfobutyl group.

10. A silver halide photographic material as in claim 6, wherein R² represents a 3-sulfobutyl group.

* * * * *